United States Patent
Nemet et al.

(10) Patent No.: US 11,238,323 B2
(45) Date of Patent: Feb. 1, 2022

(54) SYSTEM AND METHOD FOR QUALITY MANAGEMENT UTILIZING BARCODE INDICATORS

(71) Applicant: Varcode Ltd., Rosh Ha'ayin (IL)

(72) Inventors: Yaron Nemet, Kedumim (IL); Ephraim Brand, Givataim (IL); Ahmed M. Tafesh, Acre (IL)

(73) Assignee: Varcode Ltd., Rosh Ha'ayin (IL)

( * ) Notice: Subject to any disclaimer, the term of this patent is extended or adjusted under 35 U.S.C. 154(b) by 0 days.

(21) Appl. No.: 17/000,078

(22) Filed: Aug. 21, 2020

(65) Prior Publication Data
US 2021/0042594 A1 Feb. 11, 2021

Related U.S. Application Data

(63) Continuation of application No. 16/409,209, filed on May 10, 2019, now Pat. No. 10,776,680, which is a
(Continued)

(51) Int. Cl.
*G06K 19/06* (2006.01)
*G06Q 30/06* (2012.01)
(Continued)

(52) U.S. Cl.
CPC ......... *G06K 19/06046* (2013.01); *G01D 7/00* (2013.01); *G01D 7/005* (2013.01);
(Continued)

(58) Field of Classification Search
CPC .......... G06K 19/06046; G06K 7/1413; G06K 7/1417; G06K 19/06028; G06K 19/06037;
(Continued)

(56) References Cited

U.S. PATENT DOCUMENTS

| 4,057,029 A | 11/1977 | Seiter |
| 4,059,407 A | 11/1977 | Hochstrasser |

(Continued)

FOREIGN PATENT DOCUMENTS

| CN | 1720180 | 1/2006 |
| CN | 1914621 | 2/2007 |

(Continued)

OTHER PUBLICATIONS

A Notice of Allowance dated Apr. 17, 2009, which issued during the prosecution of U.S. Appl. No. 11/852,911.
(Continued)

*Primary Examiner* — Daniel A Hess
(74) *Attorney, Agent, or Firm* — Fish & Richardson P.C.

(57) ABSTRACT

A quality management system for products including a multiplicity of barcoded quality indicators, a barcode indicator reader and a product type responsive indication interpreter, each of the barcoded quality indicators including a first barcode including at least one first colorable area, the first barcode being machine-readable before exceedance of the at least one time and temperature threshold, at least a second barcode including at least one second colorable area, the second barcode not being machine-readable before exceedance of the at least one time and temperature threshold, a coloring agent located at a first location on the indicator and a coloring agent pathway operative to allow the coloring agent to move, from the first location to the first and second colorable areas simultaneously thereby causing the first barcode to become unreadable and at the same time causing the second barcode to become machine-readable.

8 Claims, 35 Drawing Sheets

Related U.S. Application Data continuation of application No. 15/978,759, filed on May 14, 2018, now Pat. No. 10,303,992, which is a continuation of application No. 15/486,906, filed on Apr. 13, 2017, now Pat. No. 9,996,783, which is a continuation of application No. 15/183,465, filed on Jun. 15, 2016, now Pat. No. 9,626,610, which is a continuation of application No. 14/595,954, filed on Jan. 13, 2015, now Pat. No. 9,396,423, which is a continuation of application No. 13/323,906, filed on Dec. 13, 2011, now Pat. No. 8,960,534, which is a continuation of application No. 12/469,309, filed on May 20, 2009, now Pat. No. 8,091,776, which is a continuation of application No. PCT/IL2008/001494, filed on Nov. 13, 2008, which is a continuation of application No. PCT/IL2008/001495, filed on Nov. 13, 2008.

(60) Provisional application No. 61/131,644, filed on Jun. 10, 2008.

(51) Int. Cl.
  *G01K 3/10* (2006.01)
  *G01K 11/14* (2006.01)
  *G01D 7/00* (2006.01)
  *G06Q 10/08* (2012.01)
  *G06K 7/14* (2006.01)

(52) U.S. Cl.
  CPC .............. *G01K 3/10* (2013.01); *G01K 11/14* (2013.01); *G06K 7/1413* (2013.01); *G06K 7/1417* (2013.01); *G06K 19/0614* (2013.01); *G06K 19/0615* (2013.01); *G06K 19/06028* (2013.01); *G06K 19/06037* (2013.01); *G06Q 10/087* (2013.01); *G06Q 30/06* (2013.01)

(58) Field of Classification Search
  CPC .. G06K 19/0614; G06K 19/0615; G01D 7/00; G01D 7/005; G01K 3/10; G01K 11/14; G06Q 10/087; G06Q 30/06
  USPC ......................................... 235/376, 383, 385
  See application file for complete search history.

(56) References Cited

U.S. PATENT DOCUMENTS

| | | |
|---|---|---|
| RE31,586 E | 5/1984 | Magnussen |
| 4,674,065 A | 6/1987 | Lange et al. |
| 5,053,339 A | 10/1991 | Patel |
| 5,084,143 A | 1/1992 | Smith |
| 5,085,802 A | 2/1992 | Jalinski |
| 5,146,405 A | 9/1992 | Church et al. |
| 5,202,677 A | 4/1993 | Parker |
| 5,254,473 A | 10/1993 | Patel |
| 5,369,577 A | 11/1994 | Kadashevich et al. |
| 5,451,932 A | 9/1995 | Wunderlich |
| 5,485,372 A | 1/1996 | Golding et al. |
| 5,499,597 A | 3/1996 | Kronberg |
| 5,591,952 A | 1/1997 | Krichever |
| 5,600,119 A | 2/1997 | Dvorkis |
| 5,617,488 A | 4/1997 | Hong et al. |
| 5,634,195 A | 5/1997 | Sawyer |
| 5,659,771 A | 8/1997 | Golding |
| 5,752,227 A | 5/1998 | Lyberg |
| 5,805,245 A | 9/1998 | Davis |
| 5,822,728 A | 10/1998 | Applebaum et al. |
| 5,828,991 A | 10/1998 | Skiena et al. |
| 5,841,285 A | 11/1998 | Bailey |
| 5,882,116 A | 3/1999 | Backus |
| 5,895,075 A | 4/1999 | Edwards |
| 5,899,973 A | 5/1999 | Bandara et al. |
| 5,902,982 A | 5/1999 | Lappe |
| 5,907,839 A | 5/1999 | Roth |
| 5,936,508 A | 8/1999 | Parker |
| 5,956,739 A | 9/1999 | Golding et al. |
| 6,006,221 A | 12/1999 | Liddy et al. |
| 6,009,400 A | 12/1999 | Blackman |
| 6,036,092 A | 3/2000 | Lappe |
| 6,085,206 A | 7/2000 | Domini et al. |
| 6,098,034 A | 8/2000 | Razin et al. |
| 6,154,722 A | 11/2000 | Bellegarda |
| 6,173,261 B1 | 1/2001 | Arai et al. |
| 6,190,610 B1 | 2/2001 | Goldsmith et al. |
| 6,214,623 B1 | 4/2001 | Simons et al. |
| 6,272,242 B1 | 8/2001 | Saitoh et al. |
| 6,314,400 B1 | 11/2001 | Klakow |
| 6,335,922 B1 | 1/2002 | Tiedemann et al. |
| 6,366,759 B1 | 4/2002 | Burstein et al. |
| 6,424,983 B1 | 7/2002 | Schabes et al. |
| 6,456,972 B1 | 9/2002 | Gladstein et al. |
| 6,479,016 B1 | 11/2002 | Goldsmith |
| 6,495,368 B1 | 12/2002 | Wallach |
| 6,544,925 B1 | 4/2003 | Prusik et al. |
| 6,685,094 B2 | 2/2004 | Cameron |
| 6,751,584 B2 | 6/2004 | Bangalore |
| 6,758,397 B2 | 7/2004 | Catan |
| 6,920,420 B2 | 7/2005 | Lin |
| 6,982,640 B2 | 1/2006 | Lindsay |
| 7,017,806 B2 | 3/2006 | Peterson |
| 7,020,338 B1 | 3/2006 | Cumbee |
| 7,030,863 B2 | 4/2006 | Longe et al. |
| 7,053,777 B2 | 5/2006 | Allen |
| 7,054,293 B2 | 5/2006 | Tiedemann et al. |
| 7,057,495 B2 | 6/2006 | Debord |
| RE39,226 E | 8/2006 | Lappe |
| 7,092,567 B2 | 8/2006 | Ma et al. |
| RE39,266 E | 9/2006 | Lohray et al. |
| 7,117,144 B2 | 10/2006 | Goodman et al. |
| 7,156,597 B2 | 1/2007 | Goldsmith et al. |
| 7,157,048 B2 | 1/2007 | Goldsmith et al. |
| 7,165,019 B1 | 1/2007 | Lee et al. |
| 7,166,345 B2 | 1/2007 | Myers |
| 7,184,950 B2 | 2/2007 | Weise |
| 7,224,346 B2 | 5/2007 | Sheng |
| 7,262,792 B2 | 8/2007 | Shniberg |
| 7,277,088 B2 | 10/2007 | Robinson et al. |
| 7,295,965 B2 | 11/2007 | Haigh et al. |
| 7,295,968 B2 | 11/2007 | Bietrix et al. |
| 7,296,019 B1 | 11/2007 | Chandrasekar et al. |
| 7,340,388 B2 | 3/2008 | Soricut |
| 7,386,442 B2 | 6/2008 | Dehlinger et al. |
| 7,457,808 B2 | 11/2008 | Gaussier |
| 7,475,015 B2 | 1/2009 | Epstein et al. |
| 7,558,725 B2 | 7/2009 | Greenwald et al. |
| 7,562,811 B2 * | 7/2009 | Nemet ............ G06Q 10/06395 235/375 |
| 7,584,093 B2 | 9/2009 | Potter et al. |
| 7,587,217 B1 | 9/2009 | Laakso et al. |
| 7,590,626 B2 | 9/2009 | Li et al. |
| 7,702,680 B2 | 4/2010 | Yih et al. |
| 7,747,427 B2 | 6/2010 | Lee et al. |
| 7,813,916 B2 | 10/2010 | Bean |
| 7,917,355 B2 | 3/2011 | Wu et al. |
| 8,005,664 B2 | 8/2011 | Hanumanthappa |
| 8,091,776 B2 * | 1/2012 | Nemet ................. G06Q 10/087 235/376 |
| 8,196,821 B2 * | 6/2012 | Nemet ............. G06K 19/06037 235/383 |
| 8,271,266 B2 | 9/2012 | Gallagher et al. |
| 8,321,786 B2 | 11/2012 | Lunati |
| 8,341,520 B2 | 12/2012 | Iakobashvili et al. |
| 8,365,070 B2 | 1/2013 | Song et al. |
| 8,473,278 B2 | 6/2013 | Futagi et al. |
| 8,500,014 B2 * | 8/2013 | Nemet ..................... G01D 7/00 235/383 |
| 8,528,808 B2 | 9/2013 | Nemet |
| 8,540,156 B2 | 9/2013 | Nemet |
| 8,579,193 B2 * | 11/2013 | Nemet ............. G06K 19/06028 235/383 |
| 8,626,786 B2 | 1/2014 | Halcrow et al. |

(56) References Cited

U.S. PATENT DOCUMENTS

| | | | |
|---|---|---|---|
| 8,807,422 B2 | 8/2014 | Nemet | |
| 8,950,664 B2 | 2/2015 | Nemet et al. | |
| 8,960,534 B2* | 2/2015 | Nemet | G06Q 30/06 235/376 |
| 8,967,467 B2* | 3/2015 | Nemet | G01N 33/84 235/383 |
| 9,122,963 B2 | 9/2015 | Nemet | |
| 9,135,544 B2* | 9/2015 | Nemet | G06K 19/0615 |
| 9,317,794 B2* | 4/2016 | Nemet | G01K 3/10 |
| 9,349,086 B2* | 5/2016 | Nemet | G01K 11/12 |
| 9,373,100 B2 | 6/2016 | Nemet et al. | |
| 9,384,435 B2* | 7/2016 | Nemet | G01K 11/14 |
| 9,396,423 B2* | 7/2016 | Nemet | G06K 19/06028 |
| 9,400,952 B2 | 7/2016 | Nemet | |
| 9,558,439 B2* | 1/2017 | Nemet | G06K 19/06046 |
| 9,626,610 B2* | 4/2017 | Nemet | G01D 7/005 |
| 9,646,237 B2* | 5/2017 | Nemet | G06K 19/0615 |
| 9,646,277 B2* | 5/2017 | Nemet | G06Q 10/087 |
| 9,710,743 B2* | 7/2017 | Nemet | G01K 3/10 |
| 9,836,678 B2* | 12/2017 | Nemet | G01D 7/005 |
| 9,996,783 B2* | 6/2018 | Nemet | G01K 3/10 |
| 10,037,507 B2* | 7/2018 | Nemet | G06K 19/06046 |
| 10,089,566 B2* | 10/2018 | Nemet | G06K 7/1417 |
| 10,262,251 B2* | 4/2019 | Nemet | G06Q 10/087 |
| 10,303,992 B2* | 5/2019 | Nemet | G06K 19/0614 |
| 10,417,543 B2* | 9/2019 | Nemet | G01D 7/005 |
| 10,445,678 B2* | 10/2019 | Nemet | G01N 33/02 |
| 10,572,785 B2* | 2/2020 | Nemet | G06Q 30/06 |
| 10,719,749 B2* | 7/2020 | Nemet | G01D 7/005 |
| 10,726,375 B2* | 7/2020 | Nemet | G06K 19/06037 |
| 10,776,680 B2* | 9/2020 | Nemet | G01D 7/005 |
| 10,789,520 B2* | 9/2020 | Nemet | G06K 7/1413 |
| 10,885,414 B2* | 1/2021 | Nemet | G06K 7/1413 |
| 2002/0012332 A1 | 1/2002 | Tiedemann et al. | |
| 2002/0032564 A1 | 3/2002 | Eshani et al. | |
| 2002/0056756 A1 | 5/2002 | Cameron et al. | |
| 2002/0128821 A1 | 9/2002 | Ehsani | |
| 2002/0169595 A1 | 11/2002 | Agichtein et al. | |
| 2003/0187632 A1 | 10/2003 | Menich | |
| 2003/0204569 A1 | 10/2003 | Andrews et al. | |
| 2003/0210249 A1 | 11/2003 | Simske | |
| 2003/0227392 A1 | 12/2003 | Ebert | |
| 2003/0233222 A1 | 12/2003 | Soricut et al. | |
| 2004/0002849 A1 | 1/2004 | Zhou | |
| 2004/0018641 A1 | 1/2004 | Goldsmith et al. | |
| 2004/0030540 A1 | 2/2004 | Ovil et al. | |
| 2004/0093567 A1 | 5/2004 | Schabes et al. | |
| 2004/0138869 A1 | 7/2004 | Heinecke | |
| 2004/0215514 A1 | 10/2004 | Devlin | |
| 2004/0260543 A1 | 12/2004 | Horowitz | |
| 2005/0043940 A1 | 2/2005 | Elder | |
| 2005/0044495 A1 | 2/2005 | Lee et al. | |
| 2005/0053900 A1 | 3/2005 | Kaufmann | |
| 2005/0091030 A1 | 4/2005 | Jessee et al. | |
| 2005/0091088 A1 | 4/2005 | Peterson | |
| 2005/0108001 A1 | 5/2005 | Aarskog | |
| 2005/0120002 A1 | 6/2005 | Behbehani | |
| 2005/0139686 A1 | 6/2005 | Helmer et al. | |
| 2005/0143971 A1 | 6/2005 | Burstein | |
| 2005/0162274 A1 | 7/2005 | Shniberg et al. | |
| 2005/0209844 A1 | 9/2005 | Wu et al. | |
| 2005/0257146 A1 | 11/2005 | Ashcraft et al. | |
| 2006/0003297 A1 | 1/2006 | Wiig et al. | |
| 2006/0032427 A1 | 2/2006 | Ishii et al. | |
| 2006/0048055 A1 | 3/2006 | Wu et al. | |
| 2006/0057022 A1 | 3/2006 | Williams | |
| 2006/0074655 A1 | 4/2006 | Bejar et al. | |
| 2006/0081711 A1 | 4/2006 | Zhao et al. | |
| 2006/0110714 A1 | 5/2006 | Symmes | |
| 2006/0129381 A1 | 6/2006 | Wakita | |
| 2006/0247914 A1 | 11/2006 | Brener et al. | |
| 2006/0260958 A1 | 11/2006 | Brunner | |
| 2007/0067177 A1 | 3/2007 | Martin | |
| 2007/0094024 A1 | 4/2007 | Kristensson et al. | |
| 2007/0106937 A1 | 5/2007 | Cucerzan et al. | |
| 2007/0141544 A1 | 6/2007 | Nakane | |
| 2007/0238084 A1 | 10/2007 | Maguire et al. | |
| 2007/0265831 A1 | 11/2007 | Dinur et al. | |
| 2007/0271089 A1 | 11/2007 | Bates et al. | |
| 2008/0059151 A1 | 3/2008 | Chen | |
| 2008/0077859 A1 | 3/2008 | Schabes et al. | |
| 2008/0154600 A1 | 6/2008 | Tian et al. | |
| 2008/0167858 A1 | 7/2008 | Christie et al. | |
| 2008/0173712 A1 | 7/2008 | Nemet | |
| 2008/0189106 A1 | 8/2008 | Low et al. | |
| 2008/0195940 A1 | 8/2008 | Gail et al. | |
| 2008/0208567 A1 | 8/2008 | Brockett et al. | |
| 2008/0208582 A1 | 8/2008 | Gallino | |
| 2008/0249773 A1 | 10/2008 | Bejar et al. | |
| 2008/0270897 A1 | 10/2008 | Jawerth et al. | |
| 2009/0083028 A1 | 3/2009 | Davtchev et al. | |
| 2009/0198671 A1 | 8/2009 | Zhang | |
| 2009/0228467 A1 | 9/2009 | Asanuma | |
| 2009/0230182 A1 | 9/2009 | Nemet et al. | |
| 2009/0302102 A1 | 12/2009 | Nemet et al. | |
| 2009/0319257 A1 | 12/2009 | Blume et al. | |
| 2010/0020970 A1 | 1/2010 | Liu | |
| 2010/0050074 A1 | 2/2010 | Nachmani et al. | |
| 2010/0219235 A1 | 9/2010 | Nemet et al. | |
| 2010/0275118 A1 | 10/2010 | Iakobashvili et al. | |
| 2010/0286979 A1 | 11/2010 | Zangvil et al. | |
| 2011/0006109 A1 | 1/2011 | Nemet | |
| 2011/0006115 A1 | 1/2011 | Nemet | |
| 2011/0093268 A1 | 4/2011 | Gorin et al. | |
| 2011/0184720 A1 | 7/2011 | Zangvil | |
| 2012/0104105 A1 | 5/2012 | Nemet | |
| 2012/0104106 A1 | 5/2012 | Nemet | |
| 2012/0145781 A1 | 6/2012 | Nemet | |
| 2012/0305637 A1 | 12/2012 | Nemet | |
| 2013/0024185 A1 | 1/2013 | Parikh | |
| 2013/0074248 A1 | 3/2013 | Evans et al. | |
| 2013/0138641 A1 | 5/2013 | Korolev et al. | |
| 2013/0334301 A1 | 12/2013 | Nemet et al. | |
| 2014/0001256 A1 | 1/2014 | Nemet et al. | |
| 2014/0110486 A1 | 4/2014 | Nemet | |
| 2014/0252096 A1 | 9/2014 | Nemet et al. | |
| 2014/0353385 A1 | 12/2014 | Nemet | |
| 2014/0360269 A1 | 12/2014 | Burghardt et al. | |
| 2015/0047552 A1 | 2/2015 | Ortais | |
| 2015/0053776 A1 | 2/2015 | Nemet et al. | |
| 2015/0100105 A1 | 4/2015 | Kiani et al. | |
| 2015/0122880 A1 | 5/2015 | Nemet et al. | |
| 2015/0168223 A1 | 6/2015 | Hammond | |
| 2015/0193677 A1 | 7/2015 | Nemet et al. | |
| 2015/0220877 A1 | 8/2015 | Nemet et al. | |
| 2016/0042260 A1 | 2/2016 | Nemet | |
| 2016/0071000 A1 | 3/2016 | Nemet et al. | |
| 2016/0239781 A1 | 8/2016 | Nemet et al. | |
| 2016/0275390 A1 | 9/2016 | Nemet et al. | |
| 2016/0292554 A1 | 10/2016 | Nemet et al. | |

FOREIGN PATENT DOCUMENTS

| | | |
|---|---|---|
| CN | 101365934 | 2/2009 |
| CN | 204176727 | 2/2015 |
| EP | 936753 | 8/1999 |
| JP | S57-59293 | 4/1982 |
| JP | 63094383 | 4/1988 |
| JP | 63-118894 | 5/1988 |
| JP | 3-53281 | 3/1991 |
| JP | 5-19695 | 1/1993 |
| JP | S-6470 | 1/1993 |
| JP | 5-67253 | 3/1993 |
| JP | 9-504858 | 11/1994 |
| JP | 2006-522933 | 5/1997 |
| JP | 2001-502794 | 2/2001 |
| JP | 2002-040012 | 2/2002 |
| JP | 2002/504684 | 2/2002 |
| JP | 2003-203210 | 7/2003 |
| JP | 2003/525464 | 8/2003 |
| JP | 2005-518320 | 6/2005 |
| JP | 2006-18782 | 1/2006 |
| JP | 2007121017 | 5/2007 |
| JP | 2004-184920 | 7/2007 |

(56) References Cited

FOREIGN PATENT DOCUMENTS

| WO | WO 1994/27144 | 11/1994 |
| --- | --- | --- |
| WO | WO 1994/27155 | 11/1994 |
| WO | WO 1997/011535 | 3/1997 |
| WO | WO 1998/14777 | 4/1998 |
| WO | WO 1998/035514 | 12/1998 |
| WO | WO 1999/042822 | 8/1999 |
| WO | WO 2001/048680 | 7/2001 |
| WO | WO 2001/064430 | 9/2001 |
| WO | WO 2003/060626 | 7/2003 |
| WO | WO 2004/038353 | 5/2004 |
| WO | WO 2004/038535 | 5/2004 |
| WO | WO 2004/092697 | 10/2004 |
| WO | WO 2006-086053 | 8/2006 |
| WO | WO 2007-049792 | 5/2007 |
| WO | WO 2008/022140 | 2/2008 |
| WO | WO 09/016631 | 2/2009 |
| WO | WO 2007/129316 | 4/2009 |
| WO | WO 2008/135962 | 4/2009 |
| WO | WO 2009/063464 | 5/2009 |
| WO | WO 2009/063465 | 5/2009 |
| WO | WO 2009-144701 | 12/2009 |
| WO | WO 2009/150641 | 12/2009 |
| WO | WO 10/013228 | 2/2010 |
| WO | WO 2010/134061 | 11/2010 |
| WO | WO 2010/134062 | 11/2010 |

OTHER PUBLICATIONS

A Notice of Allowance dated Apr. 23, 2014, which issued during the prosecution of U.S. Appl. No. 13/323,906.
A Notice of Allowance dated Apr. 25, 2014, which issued during the prosecution of U.S. Appl. No. 13/490,705.
A Notice of Allowance dated Apr. 26, 2013, which issued during the prosecution of U.S. Appl. No. 12/598,979.
A Notice of Allowance dated Aug. 4, 2014, which issued during the prosecution of U.S. Appl. No. 12/669,175.
A Notice of Allowance dated Dec. 8, 2015, which issued during the prosecution of U.S. Appl. No. 14/055,422.
A Notice of Allowance dated Feb. 15, 2012, which issued during the prosecution of U.S. Appl. No. 12/471,798.
A Notice of Allowance dated Feb. 2, 2016, which issued during the prosecution of U.S. Appl. No. 14/595,412.
A Notice of Allowance dated Feb. 4, 2016, which issued during the prosecution of U.S. Appl. No. 14/595,395.
A Notice of Allowance dated Jun. 27, 2014, which issued during the prosecution of U.S. Appl. No. 14/017,545.
A Notice of Allowance dated Mar. 16, 2016, which issued during the prosecution of U.S. Appl. No. 14/595,954.
A Notice of Allowance dated Mar. 23, 2016, which issued during the prosecution of U.S. Appl. No. 14/823,758.
A Notice of Allowance dated Mar. 3, 2016, which issued during the prosecution of U.S. Appl. No. 14/528,186.
A Notice of Allowance dated May 16, 2013, which issued during the prosecution of U.S. Appl. No. 12/742,650.
A Notice of Allowance dated May 29, 2015, which issued during the prosecution of U.S. Appl. No. 13/958,893.
A Notice of Allowance dated Nov. 7, 2014, which issued during the prosecution of U.S. Appl. No. 13/490,705.
A Notice of Allowance dated Nov. 18, 2014, which issued during the prosecution of U.S. Appl. No. 13/323,906.
A Notice of Allowance dated Oct. 11, 2016, which issued during the prosecution of U.S. Appl. No. 14/823,702.
A Notice of Allowance dated Oct. 15, 2014, which issued during the prosecution of U.S. Appl. No. 14/017,545.
A Notice of Allowance in U.S. Appl. No. 12/743,209, dated Apr. 2, 2013, 20 pages.
A Supplementary European Search Report dated Apr. 13, 2011, which issued during the prosecution of European Patent Application No. 07827384.
A Supplementary European Search Report dated Jul. 5, 2012, which issued during the prosecution of European Patent Application No. 08789727.
A Supplementary European Search Report dated Sep. 16, 2015, which issued during the prosecution of European Patent Application No. 10777451.5.
An English Translation of an Office Action dated Apr. 19, 2015 which issued during the prosecution of Israeli Patent Application No. 216396.
An English Translation of an Office Action dated Apr. 20, 2015 which issued during the prosecution of Israeli Patent Application No. 216397.
An English Translation of an Office Action dated Apr. 22, 2014 which issued during the prosecution of Israeli Patent Application No. 205687.
An English Translation of an Office Action dated Apr. 28, 2012 which issued during the prosecution of Chinese Patent Application No. 200880101405.7.
An English translation of an Office Action dated Aug. 26, 2014 which issued during the prosecution of Japanese Patent Application No. 2012-511407.
An English translation of an Office Action dated Aug. 27, 2015 which issued during the prosecution of Japanese Patent Application No. 2014-218223.
An English Translation of an Office Action dated Dec. 24, 2013 which issued during the prosecution of Chinese Patent Application No. 200980160387.4.
An English Translation of an Office Action dated Dec. 31, 2015 which issued during the prosecution of Israeli Patent Application No. 209901.
An English translation of an Office Action dated Feb. 3, 2014 which issued during the prosecution of Japanese Patent Application No. 2012-511407.
An English Translation of an Office Action dated Feb. 18, 2014 which issued during the prosecution of Japanese Patent Application No. JP2009-508663.
An English Translation of an Office Action dated Feb. 26, 2013 which issued during the prosecution of Japanese Patent Application No. JP2009-508663.
An English Translation of an Office Action dated Jan. 25, 2013 which issued during the prosecution of Chinese Patent Application No. 200880101405.7.
An English Translation of an Office Action dated Jan. 6, 2014 which issued during the prosecution of Chinese Patent Application No. 201080030956.6.
An English translation of an Office Action dated Jul. 28, 2015 which issued during the prosecution of Japanese Patent Application No. 2014-125707.
An English Translation of an Office Action dated Jun. 13, 2014 which issued during the prosecution of Chinese Patent Application No. 200880101405.7.
An English translation of an Office Action dated Jun. 14, 2016 which issued during the prosecution of Japanese Patent Application No. 2014-125707.
An English Translation of an Office Action dated Jun. 23, 2011 which issued during the prosecution of Chinese Patent Application No. 200880101405.7.
An English translation of an Office Action dated Jun. 25, 2013 which issued during the prosecution of Japanese Patent Application No. 2012-511406.
An English translation of an Office Action dated Mar. 15, 2016, which issued during the prosecution of Japanese Patent Application No. 2014-218223.
An English Translation of an Office Action dated May 22, 2015 which issued during the prosecution of Chinese Patent Application No. 200980160387.4.
An English Translation of an Office Action dated Nov. 15, 2014 which issued during the prosecution of Chinese Patent Application No. 200980160387.4.
An English Translation of an Office Action dated Nov. 4, 2014 which issued during the prosecution of Chinese Patent Application No. 201080030956.6.

(56) References Cited

OTHER PUBLICATIONS

An English Translation of an Office Action dated Oct. 27, 2014 which issued during the prosecution of Israeli Patent Application No, 209901.
An English translation of an Office Action dated Sep. 10, 2013 which issued during the prosecution of Japanese Patent Application No. 2011-513110.
An Examiner Interview Summary Report dated Nov. 7, 2008, which issued during the prosecution of U.S. Appl. No. 11/852,911.
An International Preliminary Examination Report dated Oct. 19, 2010, which issued during the prosecution of Applicant's PCT/IL2009/00317.
An International Preliminary Report on Patentability dated Dec. 13, 2010, which issued during the prosecution of Applicant's PCT/IL2009/000503.
An International Preliminary Report on Patentability dated Mar. 10, 2009, which issued during the prosecution of Applicant's PCTIL2007000547.
An International Preliminary Report on Patentability dated May 18, 2010, which issued during the prosecution of Applicant's PCT/IL2008/001494.
An International Preliminary Report on Patentability dated May 18, 2010, which issued during the prosecution of Applicant's PCT/IL2008/001495.
An International Preliminary Report on Patentability dated Nov. 10, 2009, which issued during the prosecution of Applicant's PCT/IL2007/001411.
An International Preliminary Report on Patentability dated Nov. 22, 2011 which issued during the prosecution of Applicant's PCT/IL10/00205.
An International Preliminary Report on Patentability dated Nov. 22, 2011, which issued during the prosecution of Applicant's PCT/IL2009/001167.
An International Search Report and a Written Opinion both dated Apr. 5, 2010, which issued during the prosecution of Applicant's PCT/IL2009/001167.
An International Search Report and a Written Opinion both dated Aug. 31, 2009, which issued during the prosecution of Applicant's PCT/IL2009/000503.
An International Search Report and a Written Opinion both dated Jan. 9, 2009, which issued during the prosecution of Applicant's PCT/IL2007/001411.
An International Search Report and a Written Opinion both dated Jul. 17, 2008, which issued during the prosecution of Applicant's PCTIL2007000547.
An International Search Report and a Written Opinion both dated Jun. 3, 2009, which issued during the prosecution of Applicant's PCT/IL2008/001494.
An International Search Report and a Written Opinion both dated Jun. 8, 2010, which issued during the prosecution of Applicant's PCT/IL2010/000205.
An International Search Report and a Written Opinion both dated Mar. 9, 2009, which issued during the prosecution of Applicant's PCT/IL2008/001495.
An International Search Report and a Written Opinion both dated May 25, 2011, which issued during the prosecution of Applicant's PCT/IL2011/00088.
An International Search Report and Written Opinion both dated Feb. 3, 2009 which issued during the prosecution of Applicant's PCT/IL08/01051.
An International Search Report dated Jun. 26, 2009, which issued during the prosecution of Applicant's PCT/IL2009/00317.
An International Search Report dated May 11, 2009, which issued during the prosecution of Applicant's PCT/IL2009/00130.
An Office Action dated Jan. 10, 2014, which issued during the prosecution of European Patent Application No. 08848845.
An Office Action dated Aug. 5, 2013, which issued during the prosecution of U.S. Appl. No. 12/669,175.
An Office Action dated Aug. 14, 2015, which issued during the prosecution of U.S. Appl. No. 14/055,422.
An Office Action dated Dec. 4, 2015, which issued during the prosecution of U.S. Appl. No. 14/823,758.
An Office Action dated Feb. 5, 2013, which issued during the prosecution of U.S. Appl. No. 12/669,175.
An Office Action dated Feb. 11, 2015, which issued during the prosecution of U.S. Appl. No. 13/958,893.
An Office Action dated Jan. 21, 2015, which issued during the prosecution of U.S. Appl. No. 14/461,778.
An Office Action dated Jan. 26, 2016, which issued during the prosecution of Canadian Patent Application No. 2762891.
An Office Action dated Jan. 29, 2016, which issued during the prosecution of U.S. Appl. No. 14/528,186.
An Office Action dated Jan. 29, 2016, which issued during the prosecution of U.S. Appl. No. 14/595,954.
An Office Action dated Jul. 1, 2014, which issued during the prosecution of U.S. Appl. No. 13/576,330.
An Office Action dated Jul. 12, 2013, which issued during the prosecution of European Patent Application No. 07736287.9.
An Office Action dated Jul. 28, 2015, which issued during the prosecution of U.S. Appl. No. 14/595,412.
An Office Action dated Jun. 5, 2014, which issued during the prosecution of U.S. Appl. No. 14/017,545.
An Office Action dated Jun. 20, 2008, which issued during the prosecution of U.S. Appl. No. 11/852,911.
An Office Action dated Jun. 27, 2016, which issued during the prosecution of U.S. Appl. No. 14/823,702.
An Office Action dated Mar. 7, 2014, which issued during the prosecution of U.S. Appl. No. 12/669,175.
An Office Action dated Mar. 6, 2015, which issued during the prosecution of U.S. Appl. No. 14/055,422.
An Office Action dated May 9, 2013, which issued during the prosecution of U.S. Appl. No. 12/937,618.
An Office Action dated Nov. 4, 2013, which issued during the prosecution of U.S. Appl. No. 13/323,906.
An Office Action dated Nov. 19, 2013, which issued during the prosecution of European Application No. 07827384.4.
An Office Action dated Oct. 11, 2016, which issued during the prosecution of U.S. Appl. No. 15/184,483.
An Office Action dated Oct. 12, 2012, which issued during the prosecution of U.S. Appl. No. 12/669,175.
An Office Action dated Oct. 28, 2013, which issued during the prosecution of U.S. Appl. No. 14/017,545.
An Office Action dated Sep. 9, 2011, which issued during the prosecution of U.S. Appl. No. 12/471,798.
An Office Action dated Sep. 18, 2014, which issued during the prosecution of U.S. Appl. No. 14/143,827.
An Office Action dated Sep. 25, 2014, which issued during the prosecution of U.S. Appl. No. 14/461,778.
An Office Action dated Sep. 27, 2016, which issued during the prosecution of U.S. Appl. No. 15/189,127.
Bick, "A Constraint Grammar Based Spellchecker for Danish with a Special Focus on Dyslexics," SKY Journal of Linguistics, 2006, retreived on Jan. 12, 2009, retreived from URL http://www.ling.helsinki.fi/sky/julkaisut/SKY2006_1/1.6.1.%20BICK.pdf, 19:387-396.
CN Office Action in Chinese Appln. No. 200880101405.7, dated Jun. 13, 2014.
EP Extended European Search Report in European Appln. No. 07736287, dated Aug. 18, 2011, 6 pages (with English Translation).
EP Extended European Search Report in European Appln. No. 08848845.7, dated Feb. 11, 2013, 7 pages.
EP Extended European Search Report in European Appln. No. 09762166.8, dated Feb. 18, 2013, 5 pages (with English Translatim).
EP Supplementary European Search Report in European Appln. No. 08849330.9, dated Aug. 23, 2012, 5 pages.
European Search Report dated Sep. 16, 2015, which issued during the prosecution of European Patent Application No. 09844849.
IL Office Action in Israeli Appln. No. 201958, dated Oct. 25, 2012, 1 page.
JP Office Action in Japanese Appln. No. 2010-507054, dated Aug. 27, 2013, 6 pages (with English Translation).
JP Office Action in Japanese Appln. No. JP 2009-508663, dated Feb. 7, 2012, Feb. 7, 2012, 2 pages (with English translation).

(56) References Cited

OTHER PUBLICATIONS

JP Office Action in Japanese Appln. No. JP 2010-507054, dated Jan. 15, 2013, 6 pages (with English Translation).
Letter submitted on Jul. 17, 2009 in U.S. Appl. No. 11/852,911.
Notice of Allowance dated Apr. 14, 2014, which issued during the prosecution of U.S. Appl. No. 13/657,185.
Notice of Allowance dated May 13, 2015, which issued during the prosecution of U.S. Appl. No. 14/461,778.
Notice of Allowance dated May 29, 2015, which issued during the prosecution of U.S. Appl. No. 13/958,893.
PCT International Search Report and a Written Opinion in International Appln No. dated Dec. 12, 2016, which issued during the prosecution of Applicant's PCT/IL2016/050727, 12 pages.
U.S. Appl. No. 60/746,646, filed May 7, 2006.
U.S. Appl. No. 60/804,072, filed Jun. 6, 2006.
U.S. Appl. No. 60/959,120, filed Jul. 10, 2007.
U.S. Appl. No. 60/963,956, filed Aug. 6, 2007.
U.S. Appl. No. 61/131,644, filed Jun. 10, 2008.
U.S. Appl. No. 61/231,799, filed Aug. 6, 2009.
U.S. Appl. No. 62/163,193, filed May 18, 2015.
U.S. Appl. No. 62/189,367, filed Jul. 7, 2015.
U.S. Notice of Allowance in U.S. Appl. No. 11/852,911, dated Feb. 25, 2009, 12 pages.
U.S. Notice of Allowance in U.S. Appl. No. 12/469,309, dated Sep. 9, 2011, 7 pages.
U.S. Notice of Allowance in U.S. Appl. No. 13/321,477, dated Jul. 11, 2013, 9 pages.
U.S. Office Action U.S. Appl. No. 12/471,798, dated May 3, 2011, 11 pages.
U.S. Office Action in U.S. Appl. No. 12/469,309, dated Apr. 19, 2011, 9 pages.
U.S. Office Action in U.S. Appl. No. 12/743,20, dated Mar. 9, 2012, 13 pages.
U.S. Office Action in U.S. Appl. No. 12/598,979, dated Apr. 25 2012, 13 pages.
U.S. Office Action in U.S. Appl. No. 12/743,209, dated Nov. 7, 2012, 15 pages.
U.S. Office Action in U.S. Appl. No. 13/321,467, dated Mar. 15, 2013, 22 pages.
U.S. Office Action in U.S. Appl. No. 13/321,477, dated Mar. 20, 2013, 21 pages.
U.S. Office Action in U.S. Appl. No. 13/657,185, dated Sep. 10, 2013, 8 pages.
U.S. Office Action in U.S. Appl. No. 12/598,979, dated Jan. 16, 2013, 21 pages.
U.S. Office Action in U.S. Appl. No. 12/598,979, dated Nov. 7, 2011, 14 pages.
U.S. Office Action in U.S. Appl. No. 12/742,650, dated Dec. 19, 2012, 21 pages.

\* cited by examiner

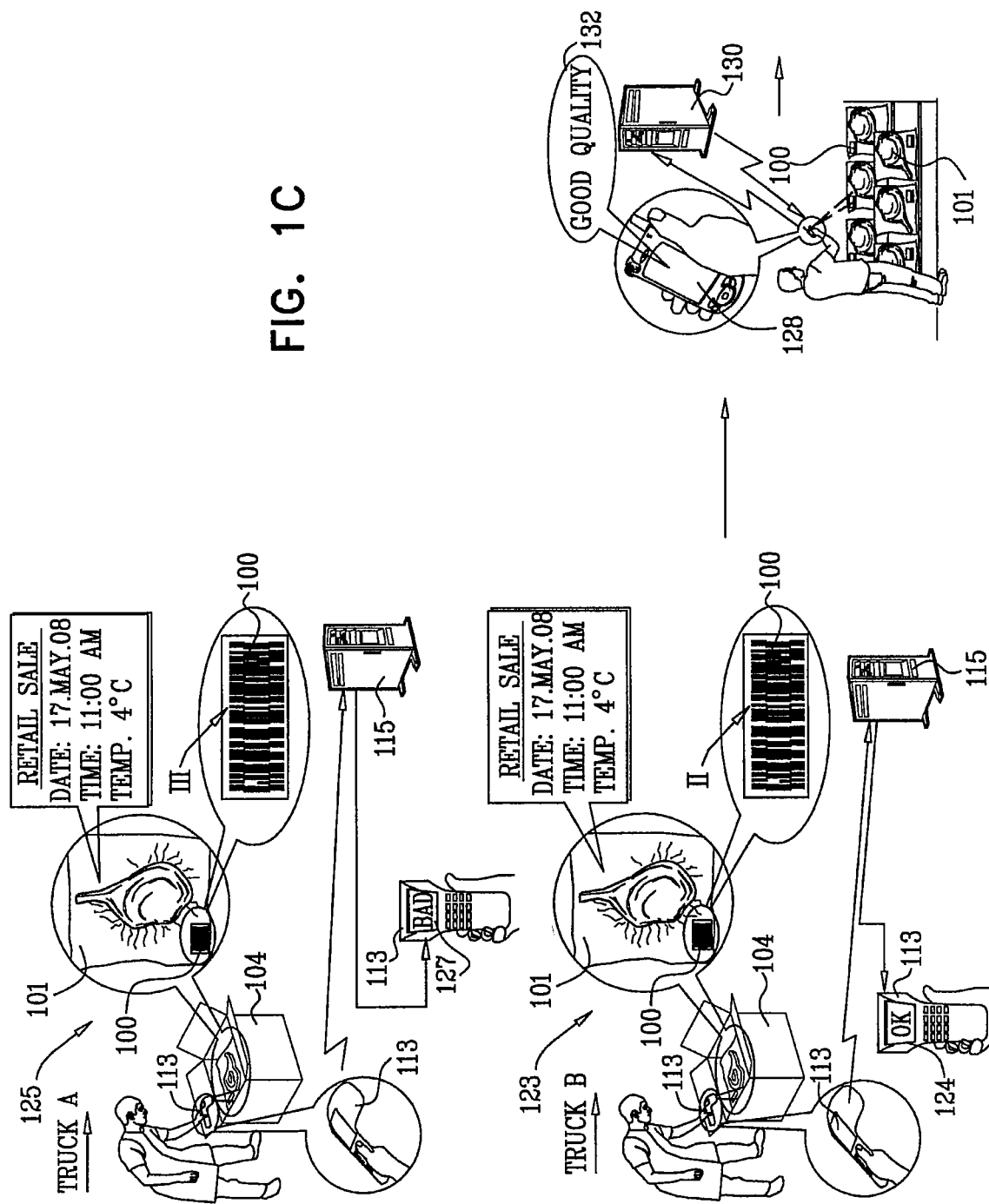

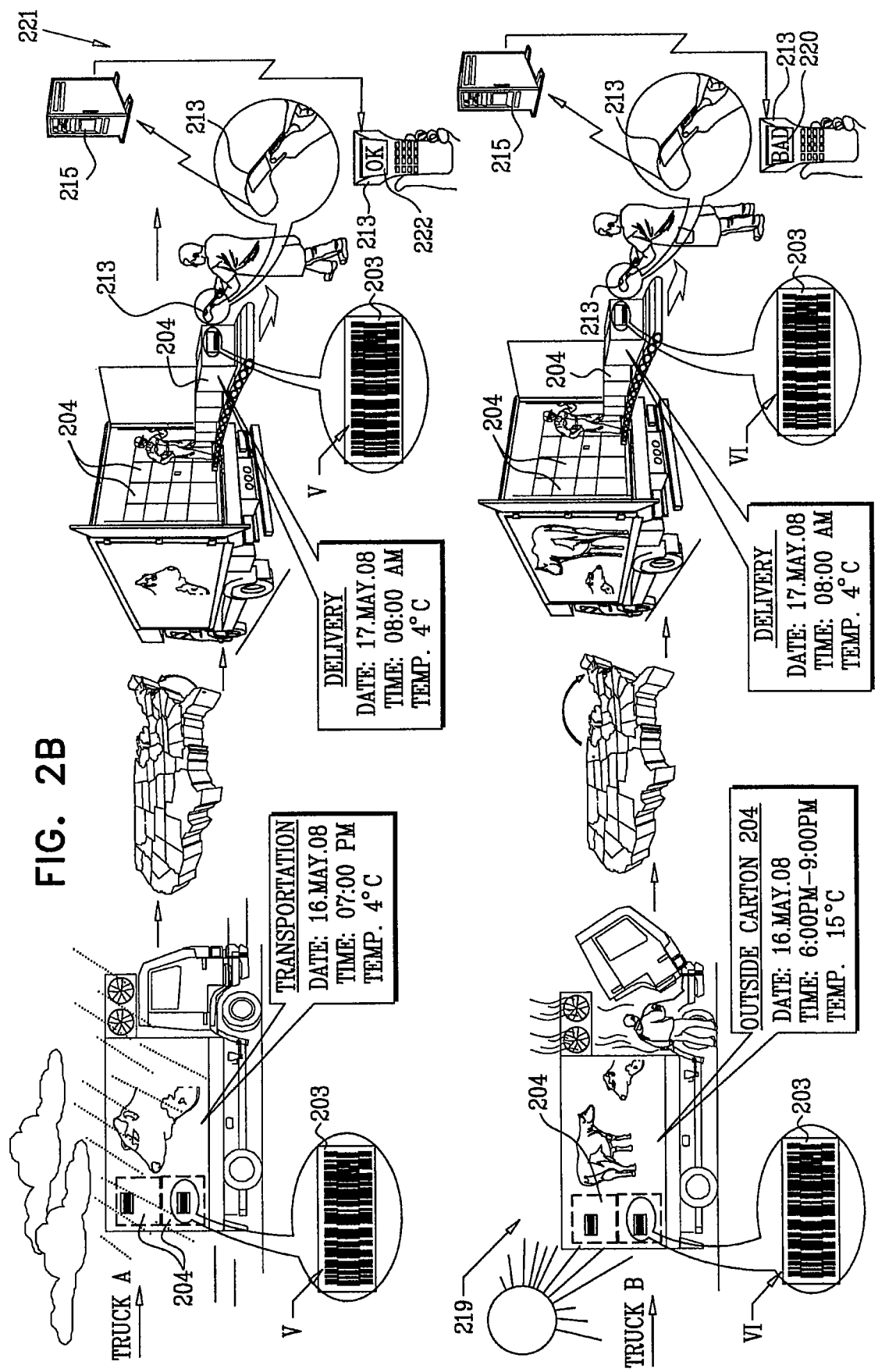

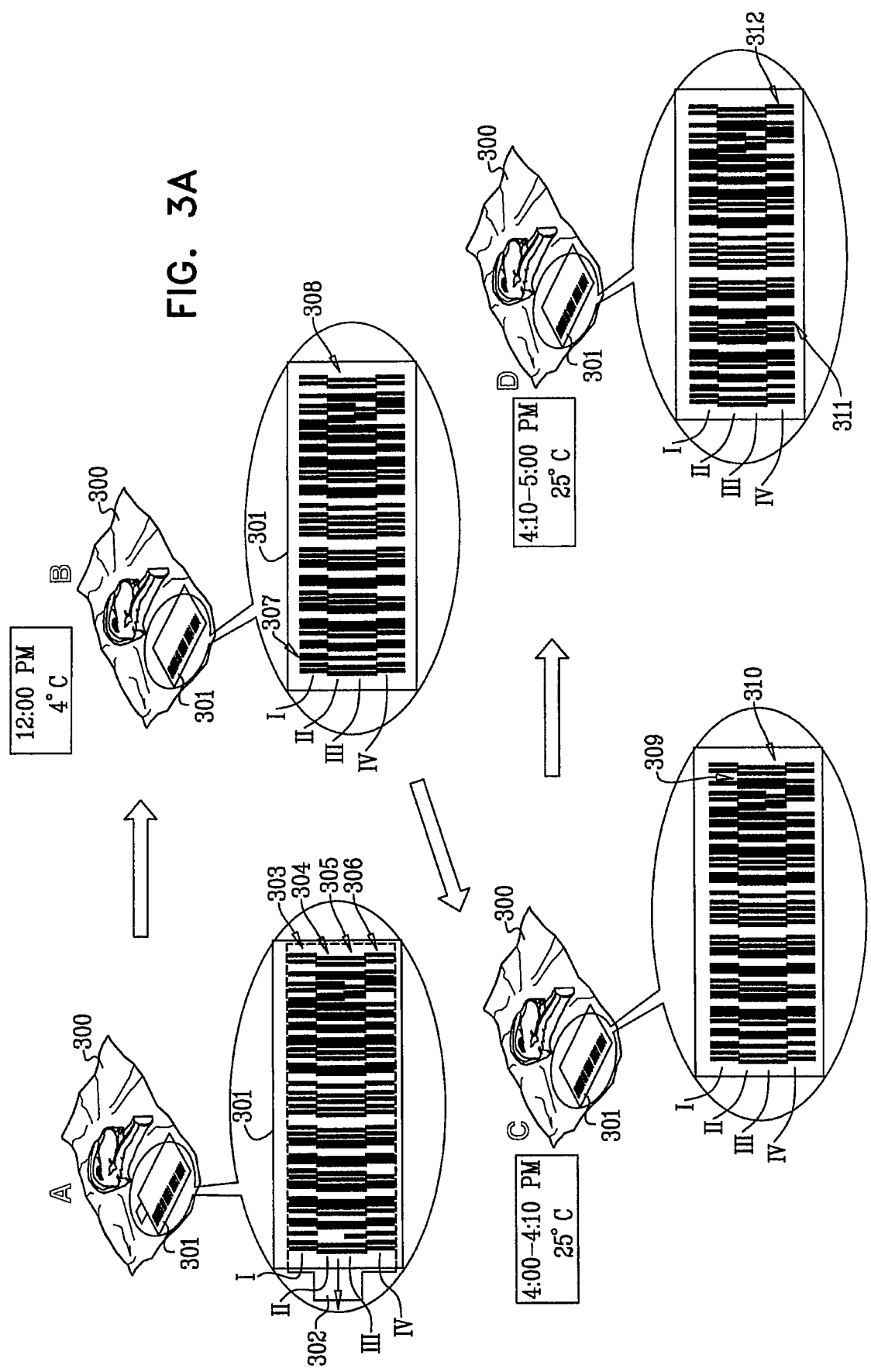

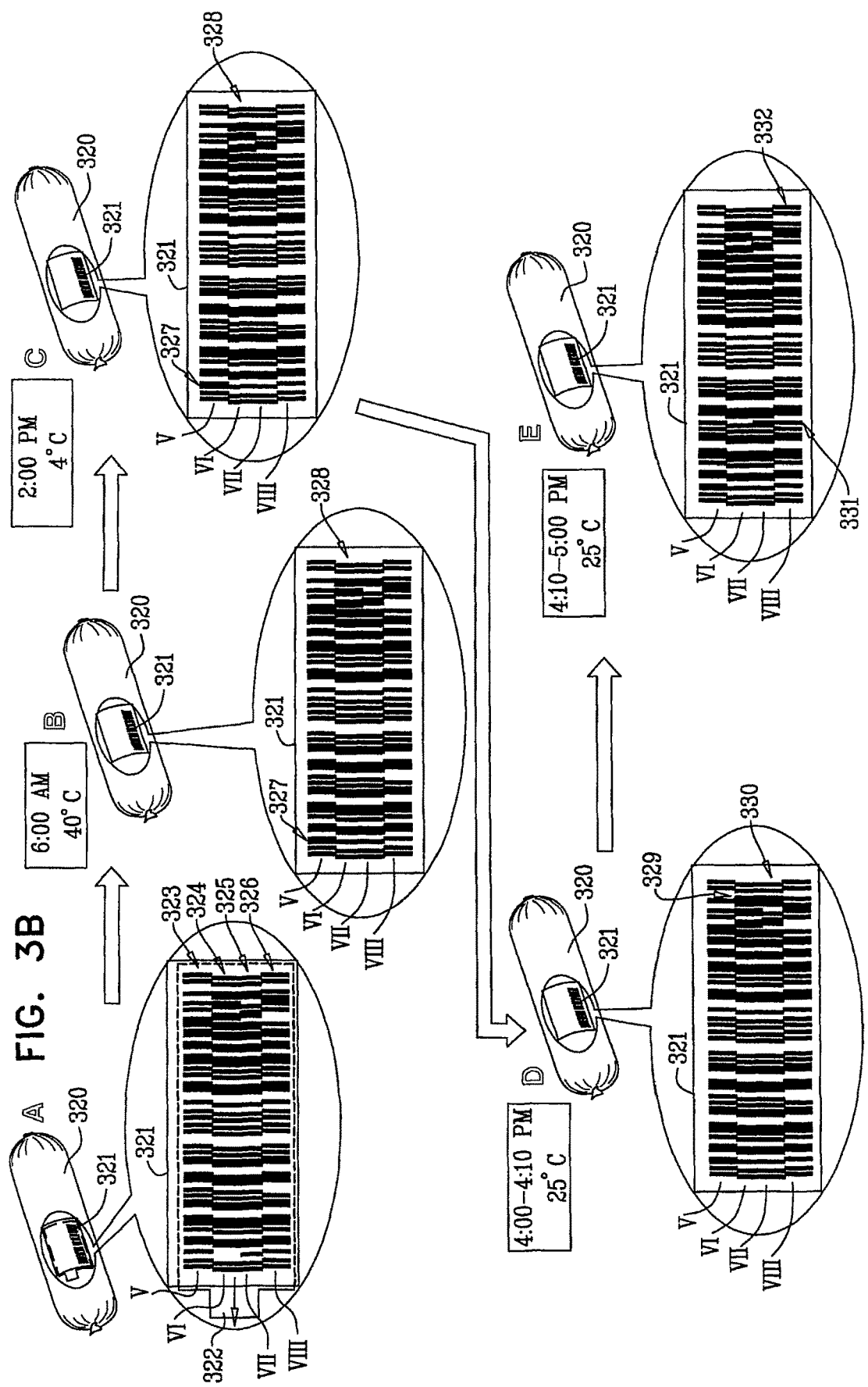

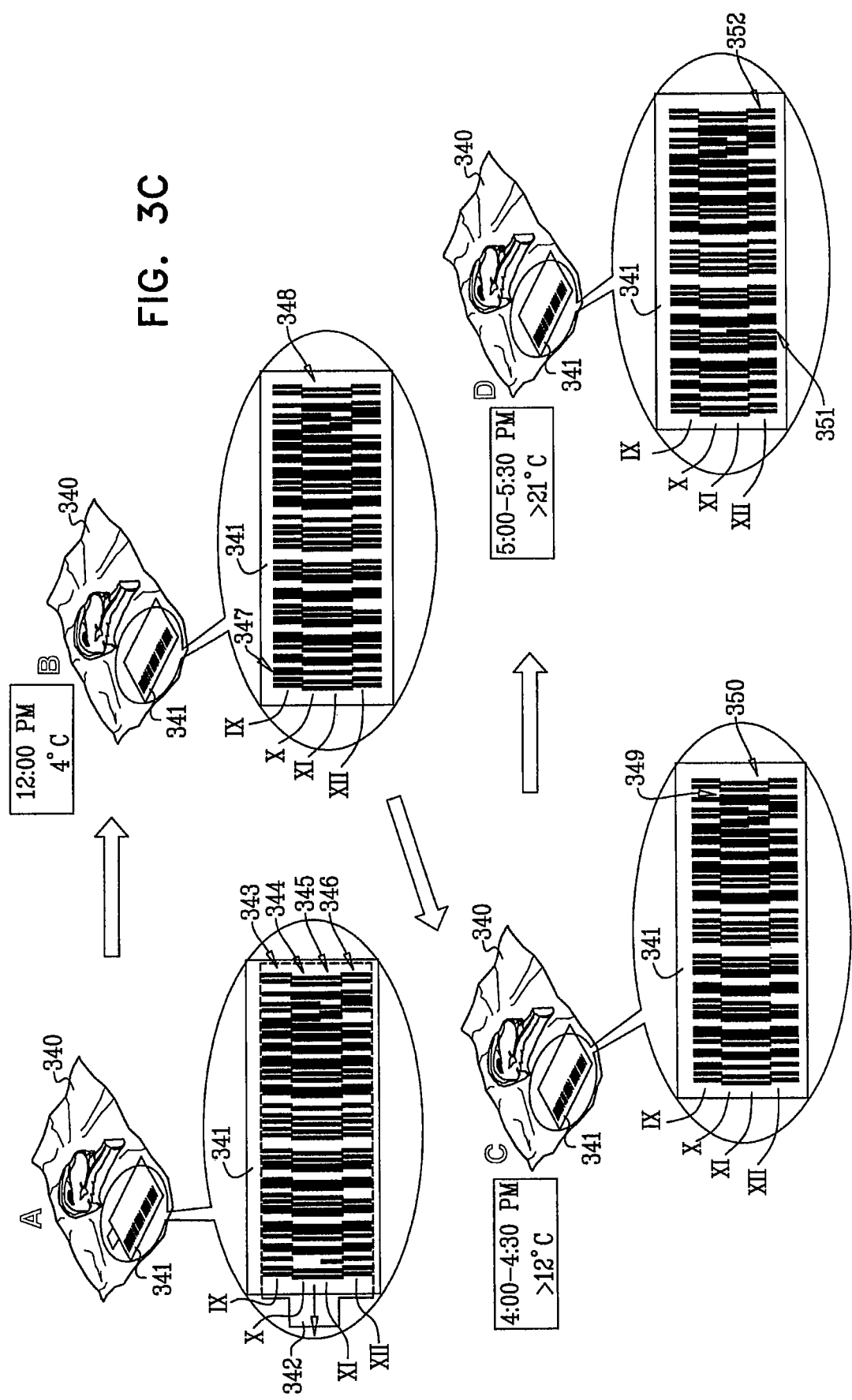

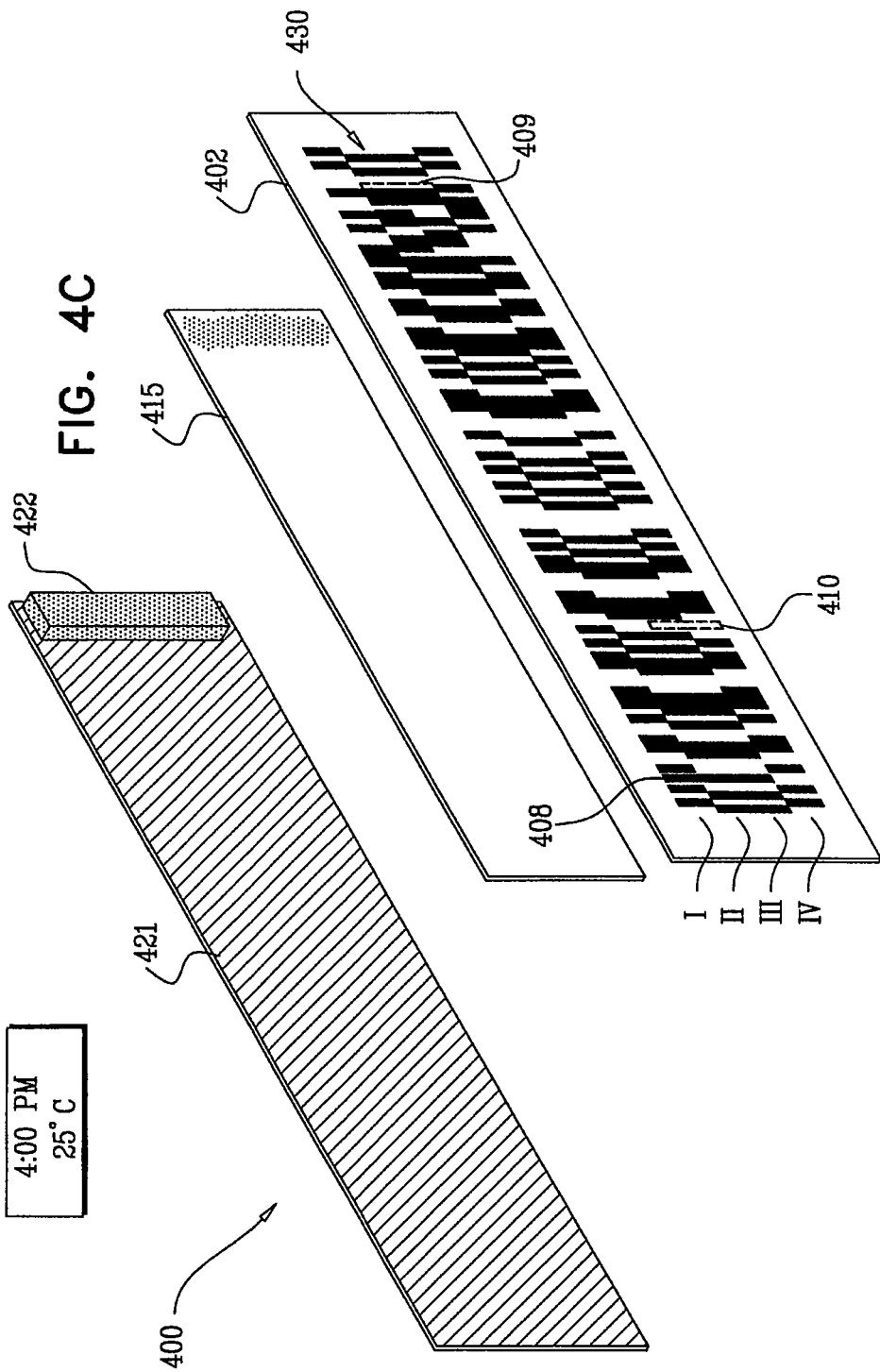

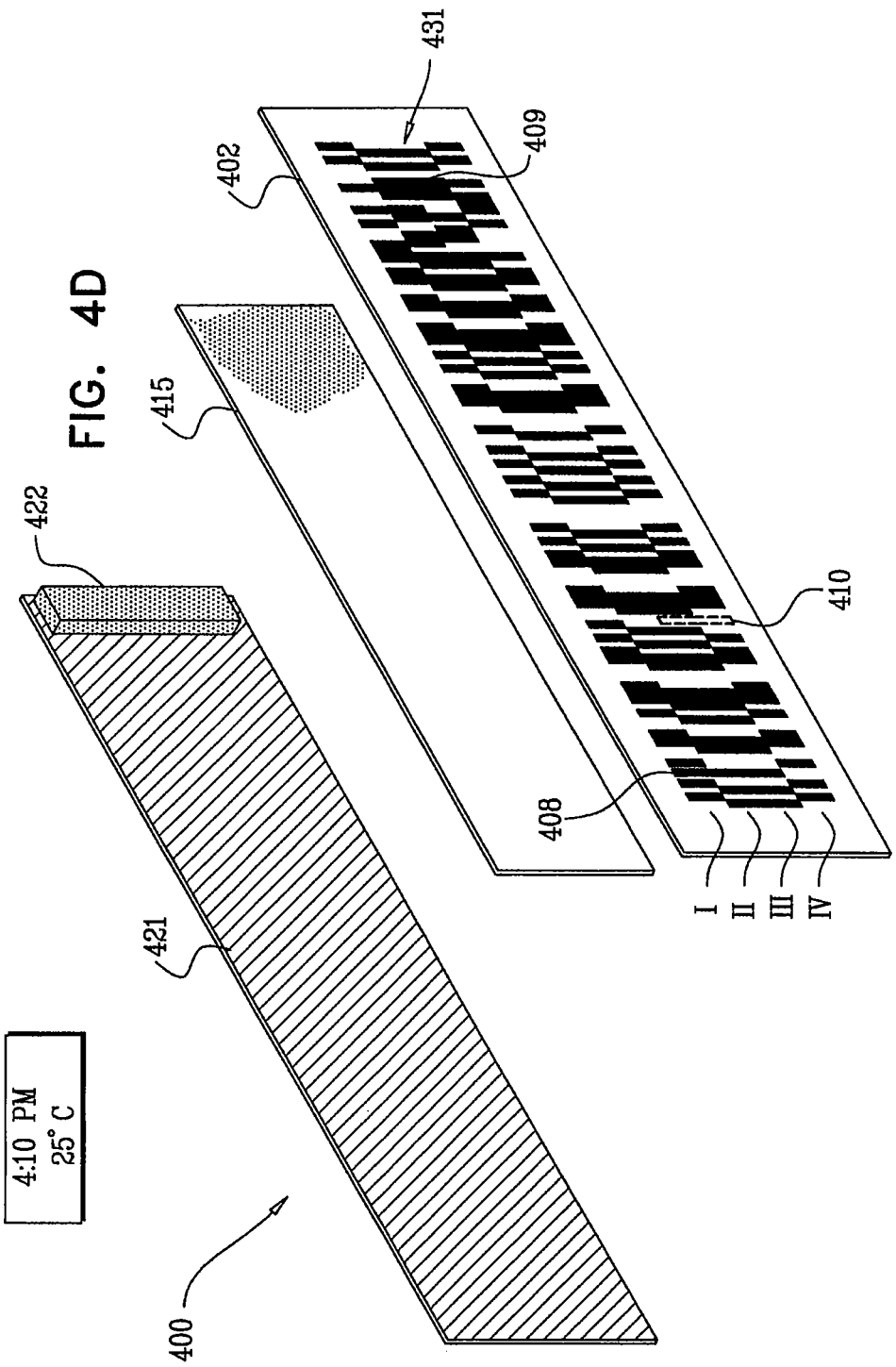

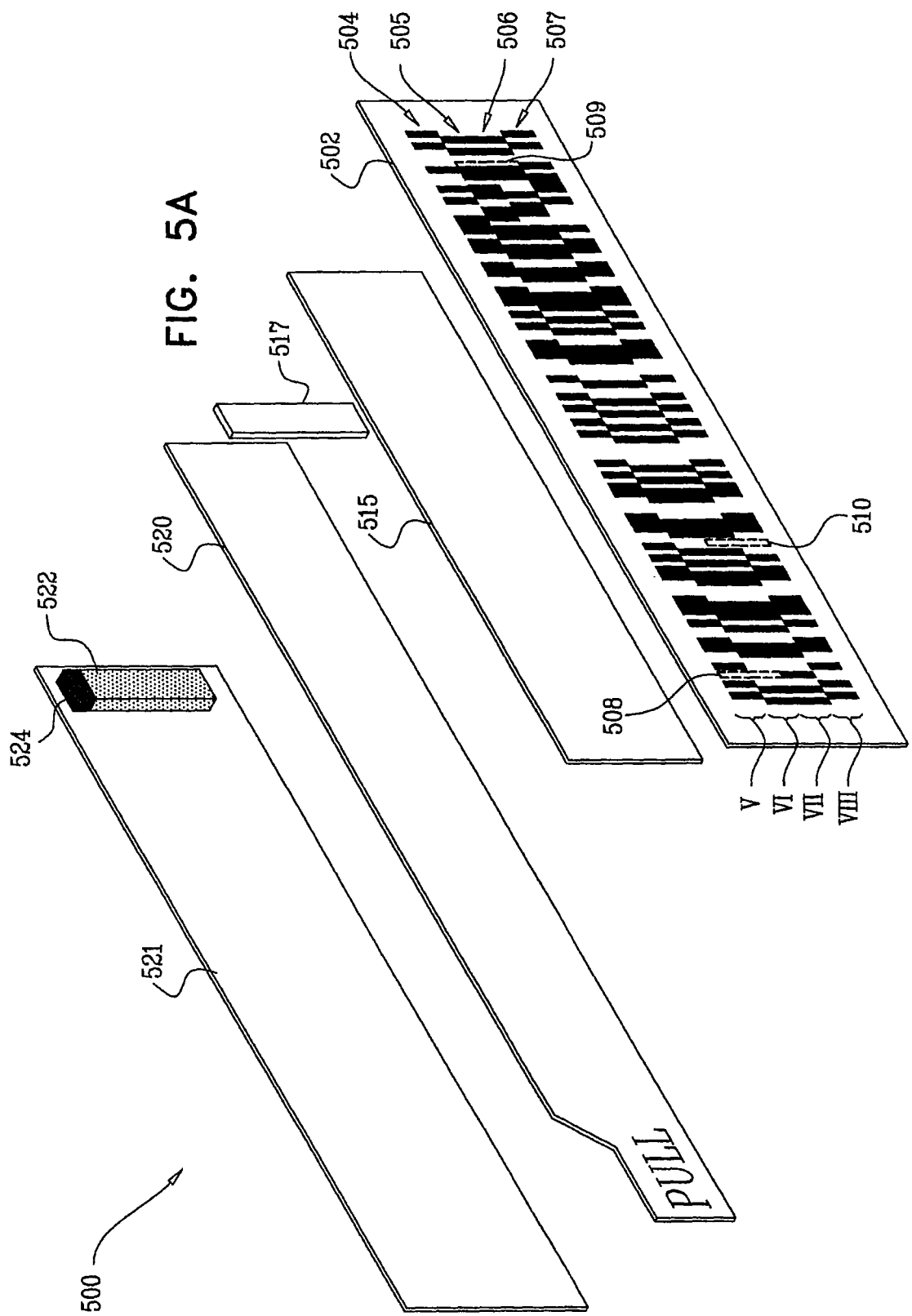

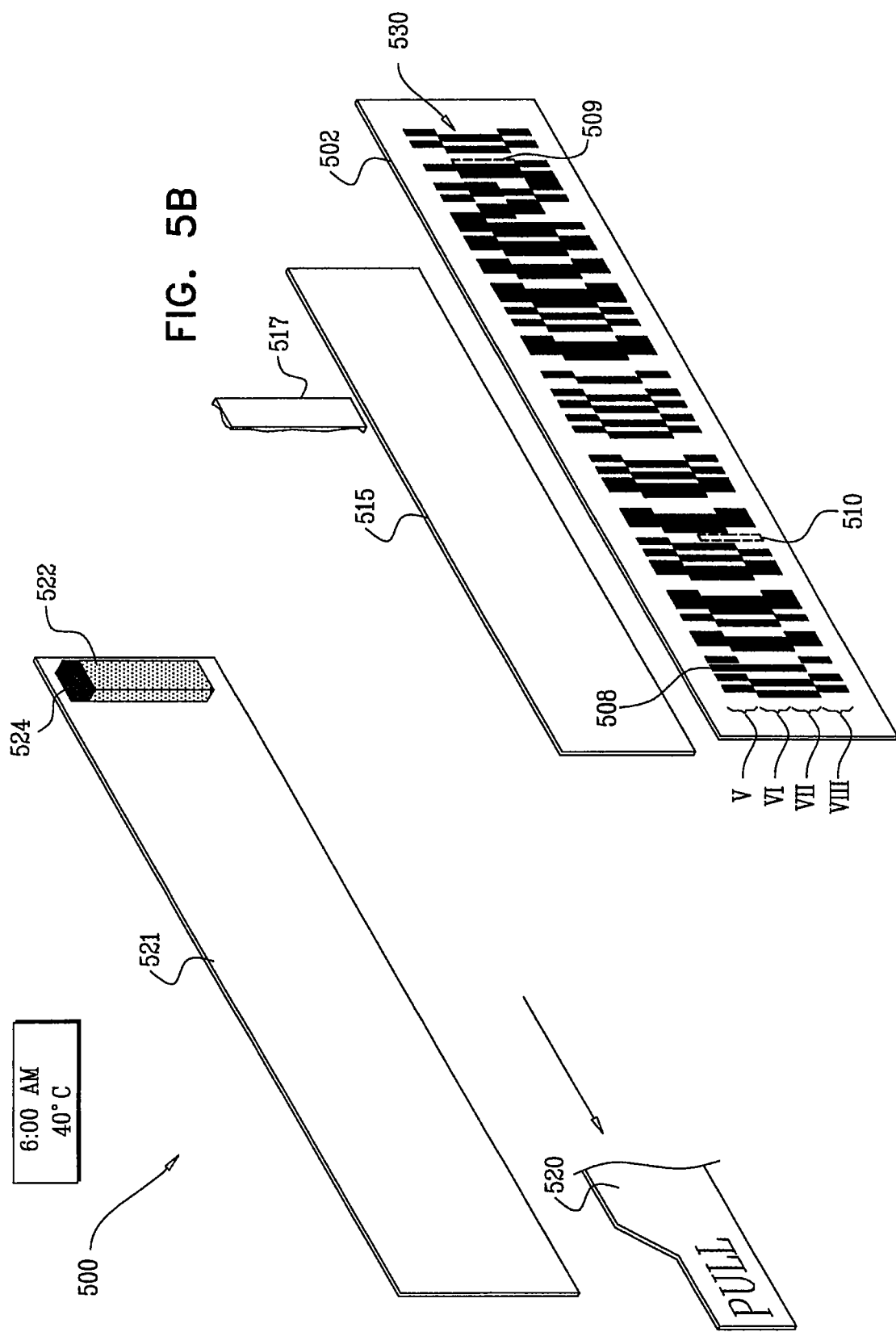

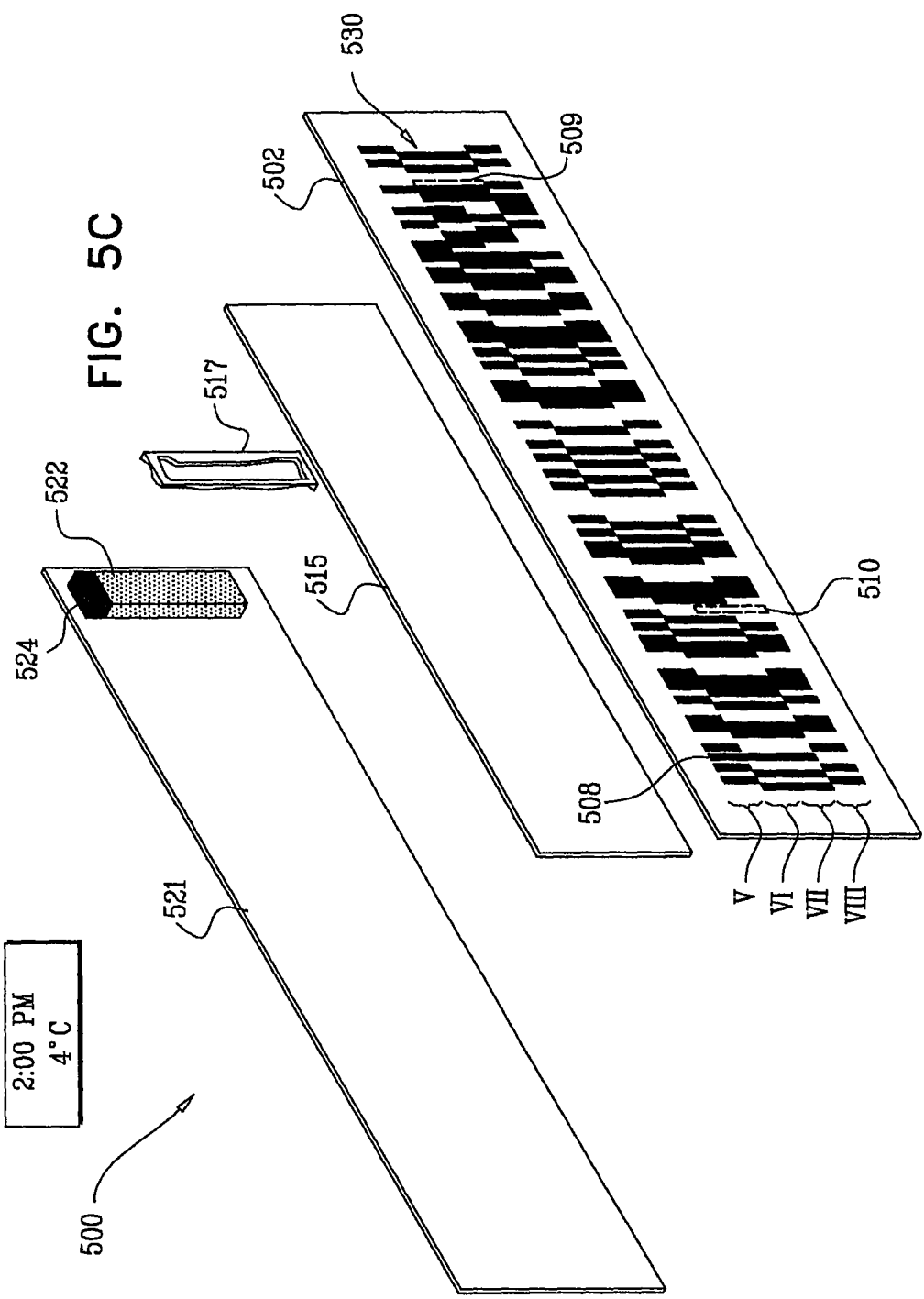

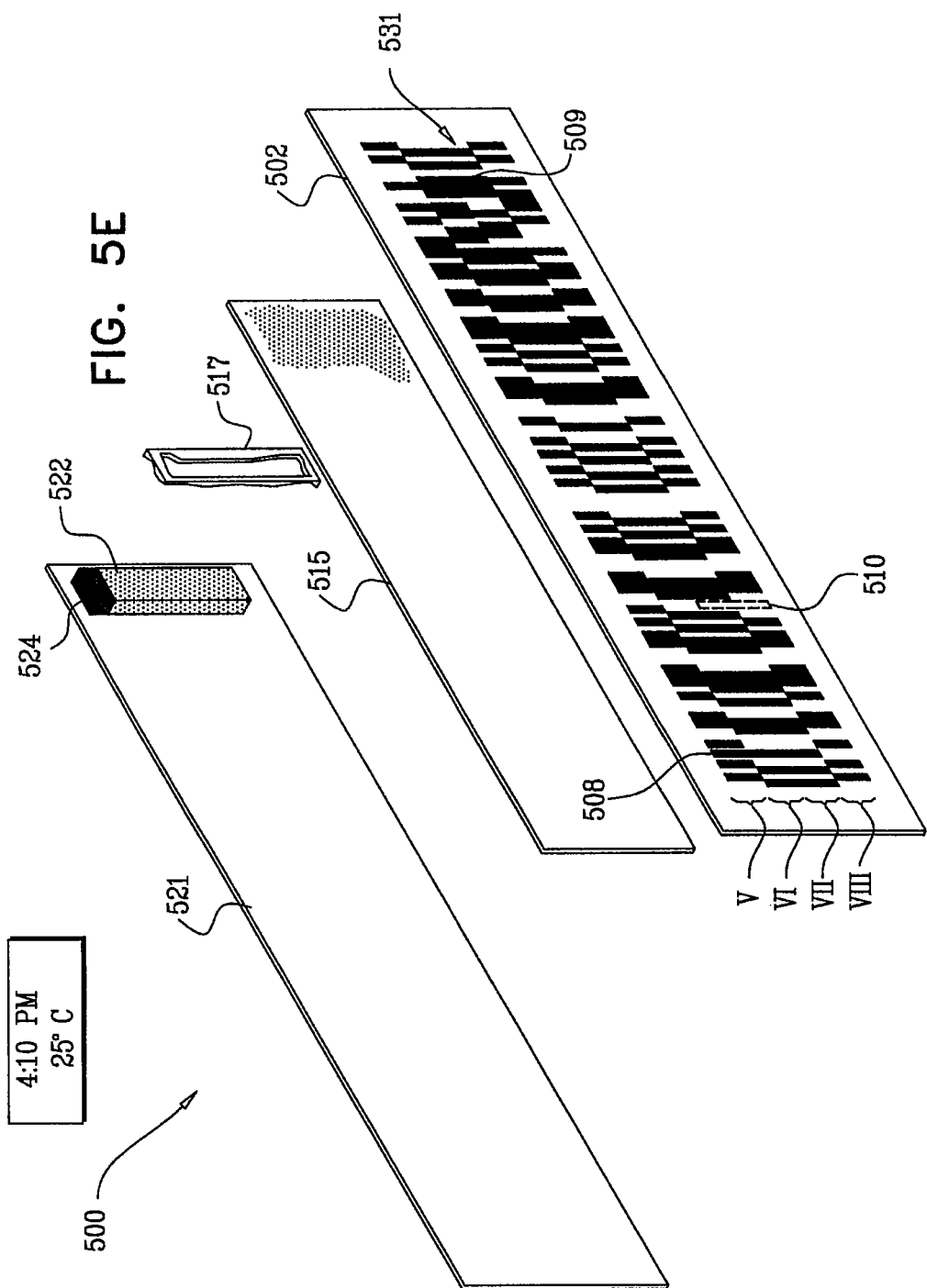

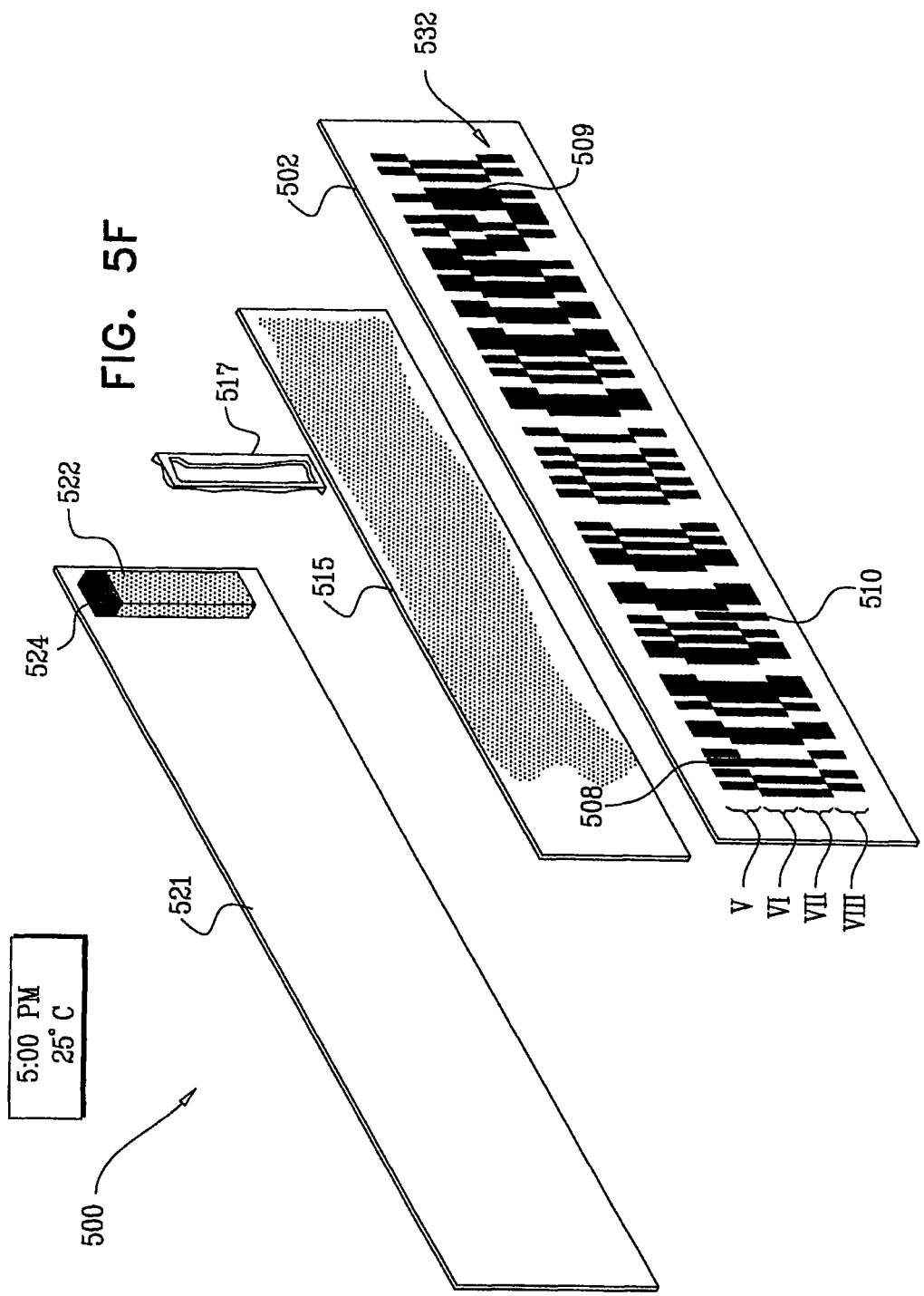

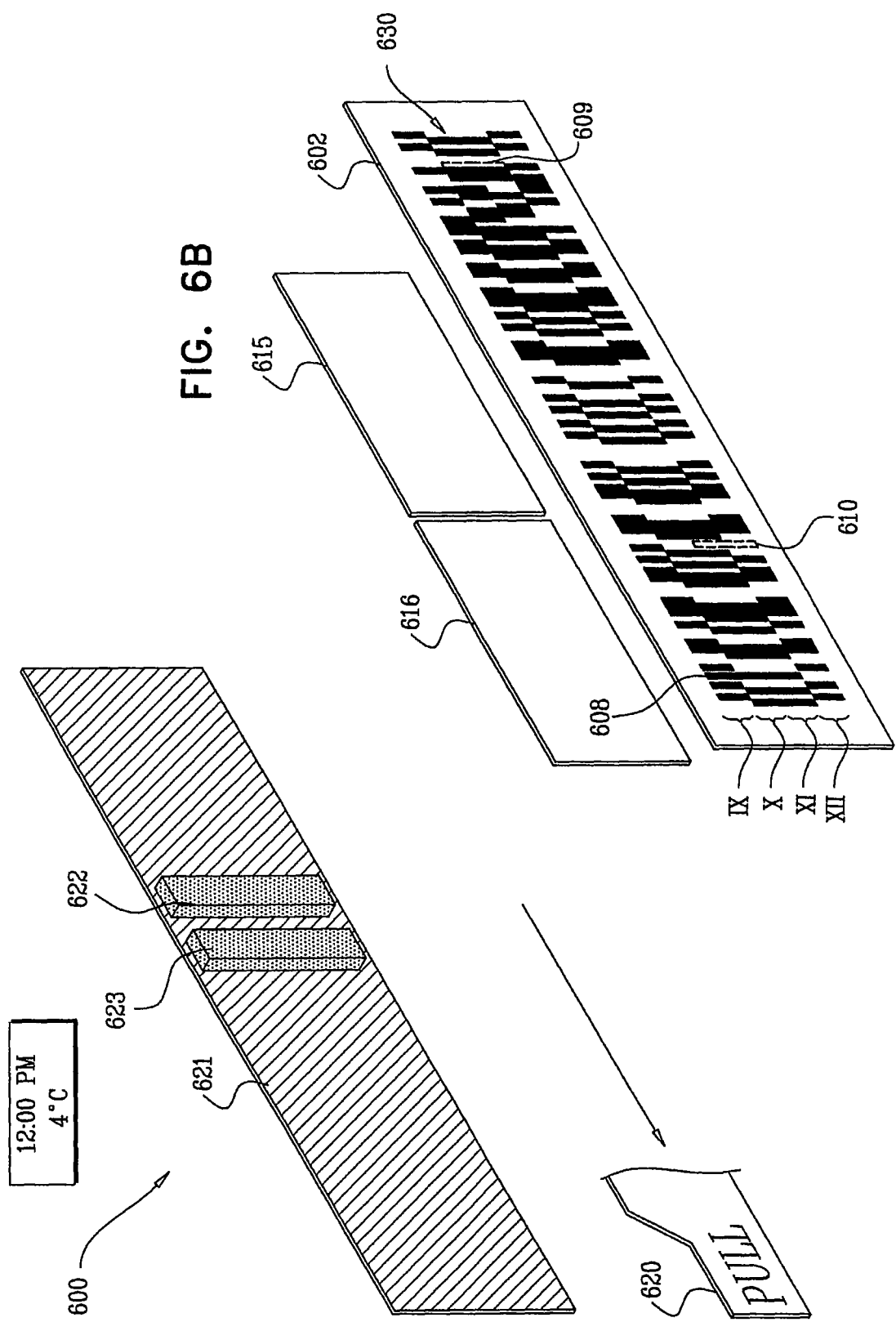

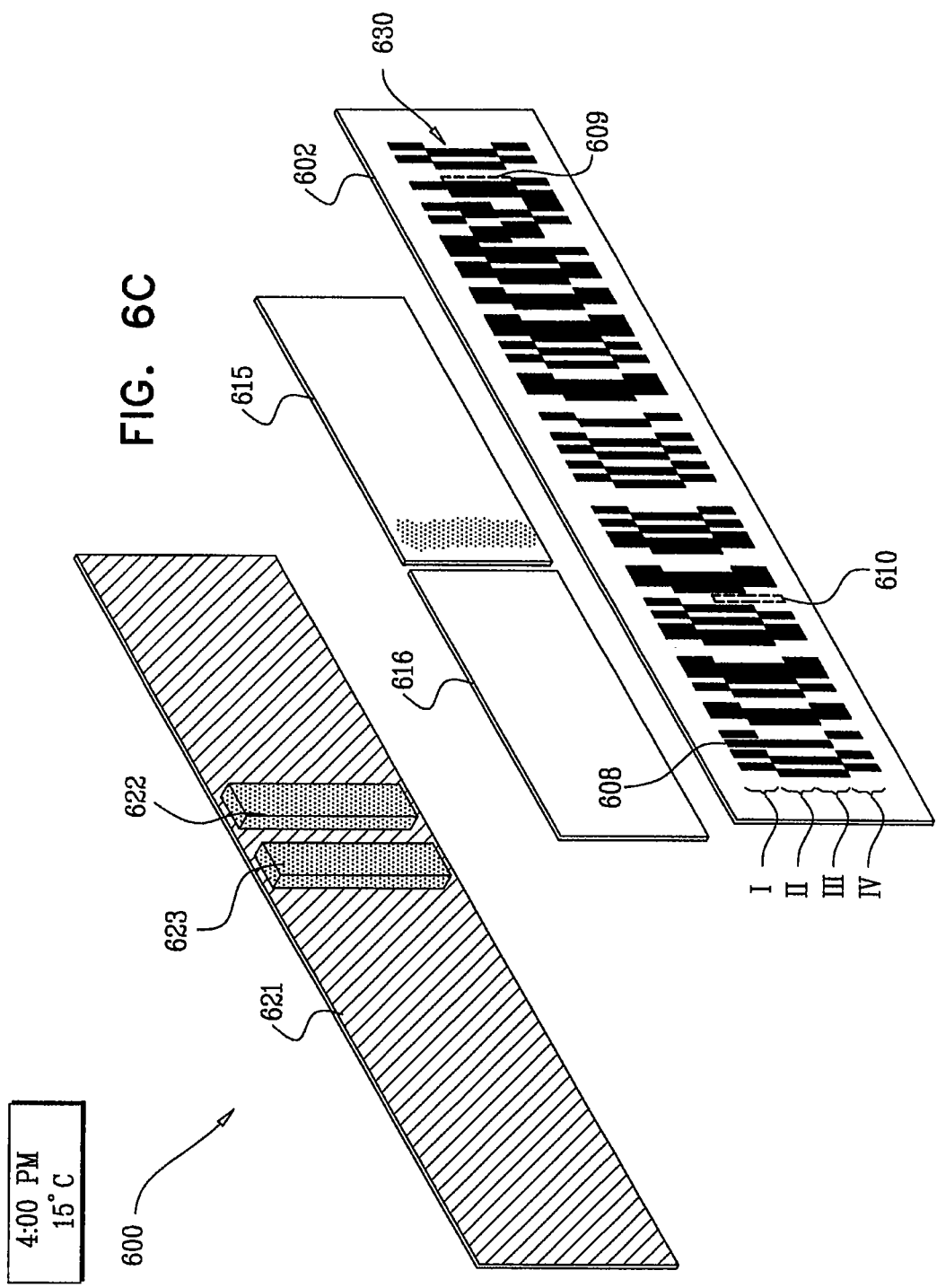

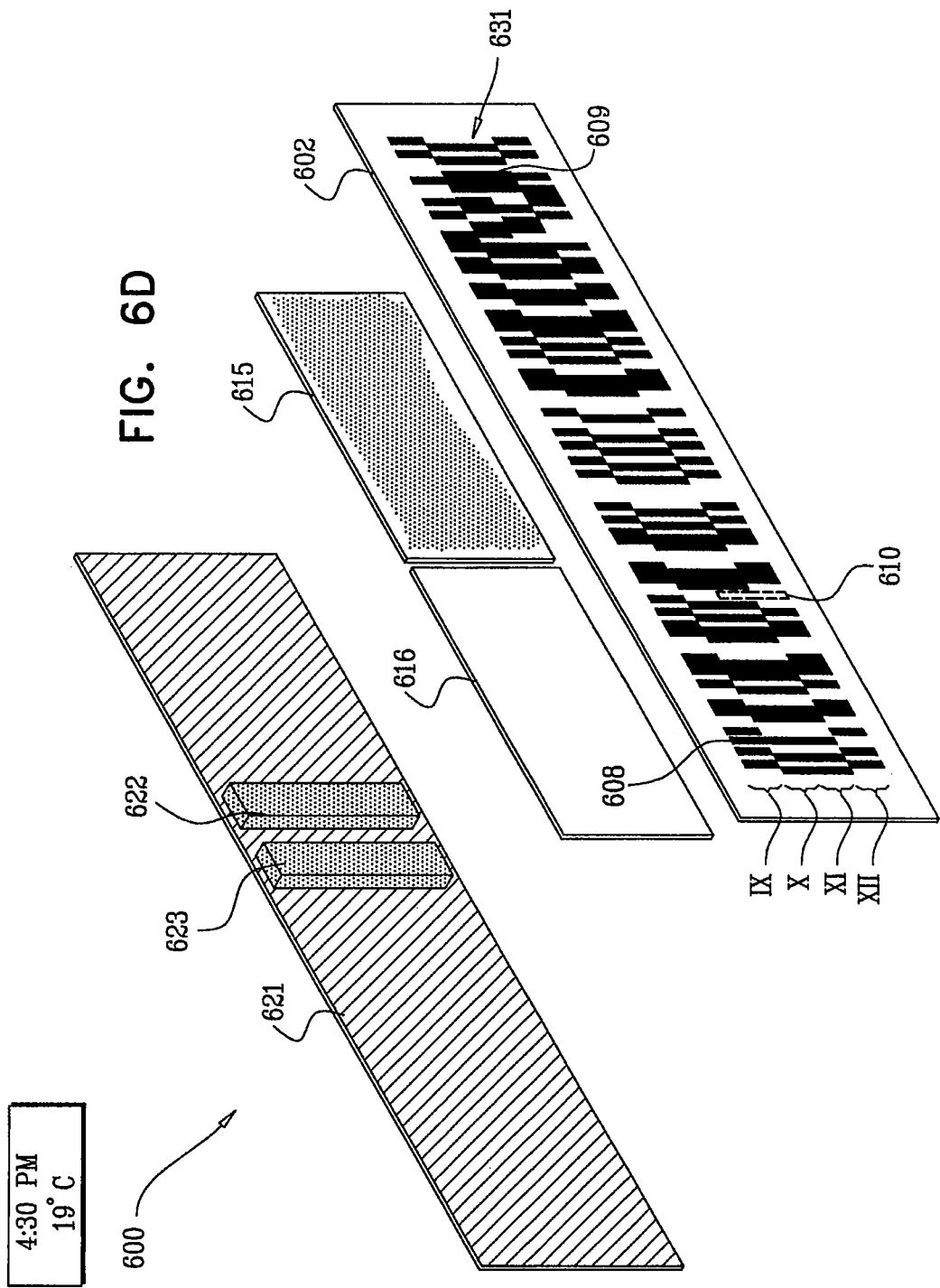

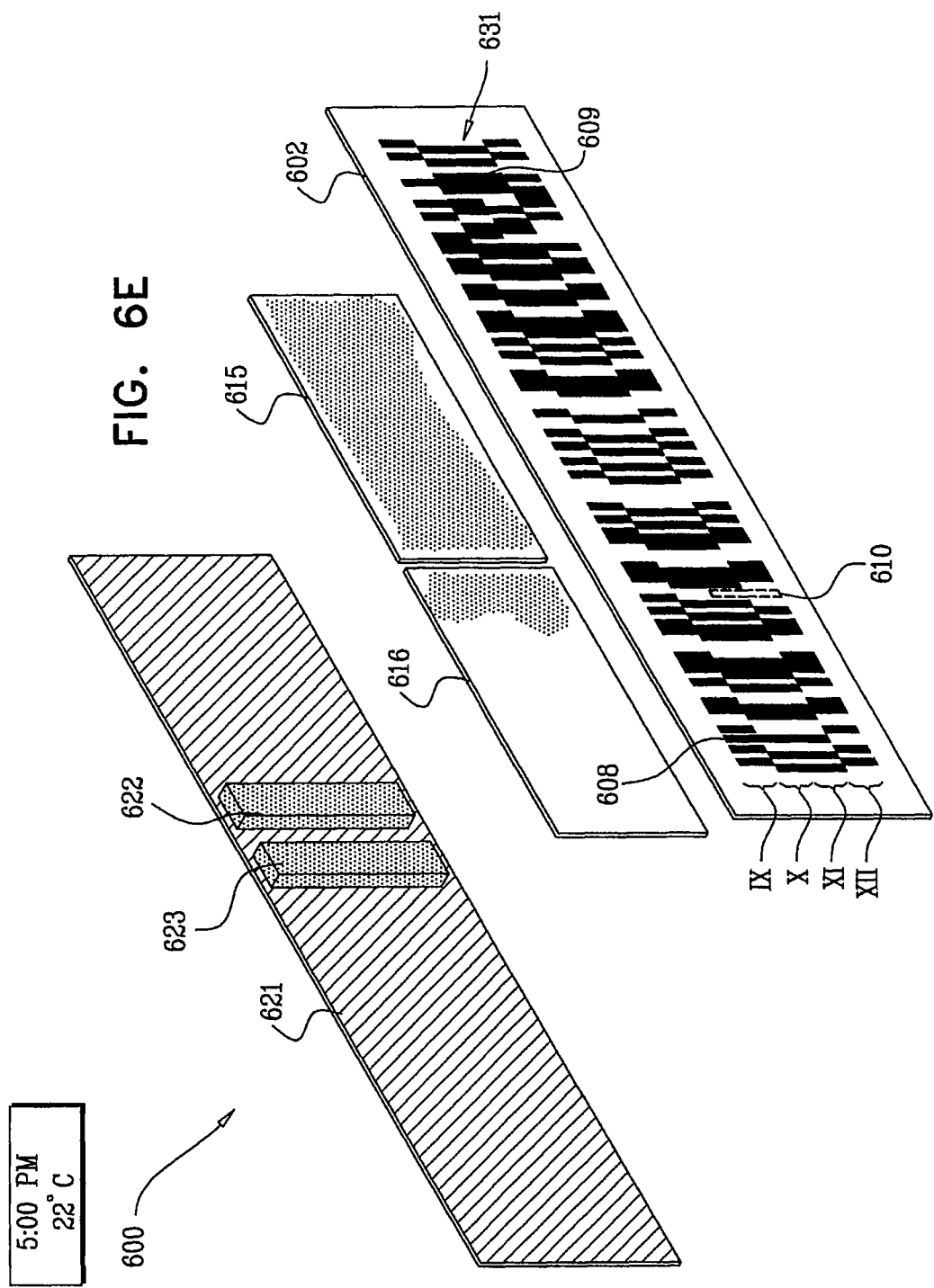

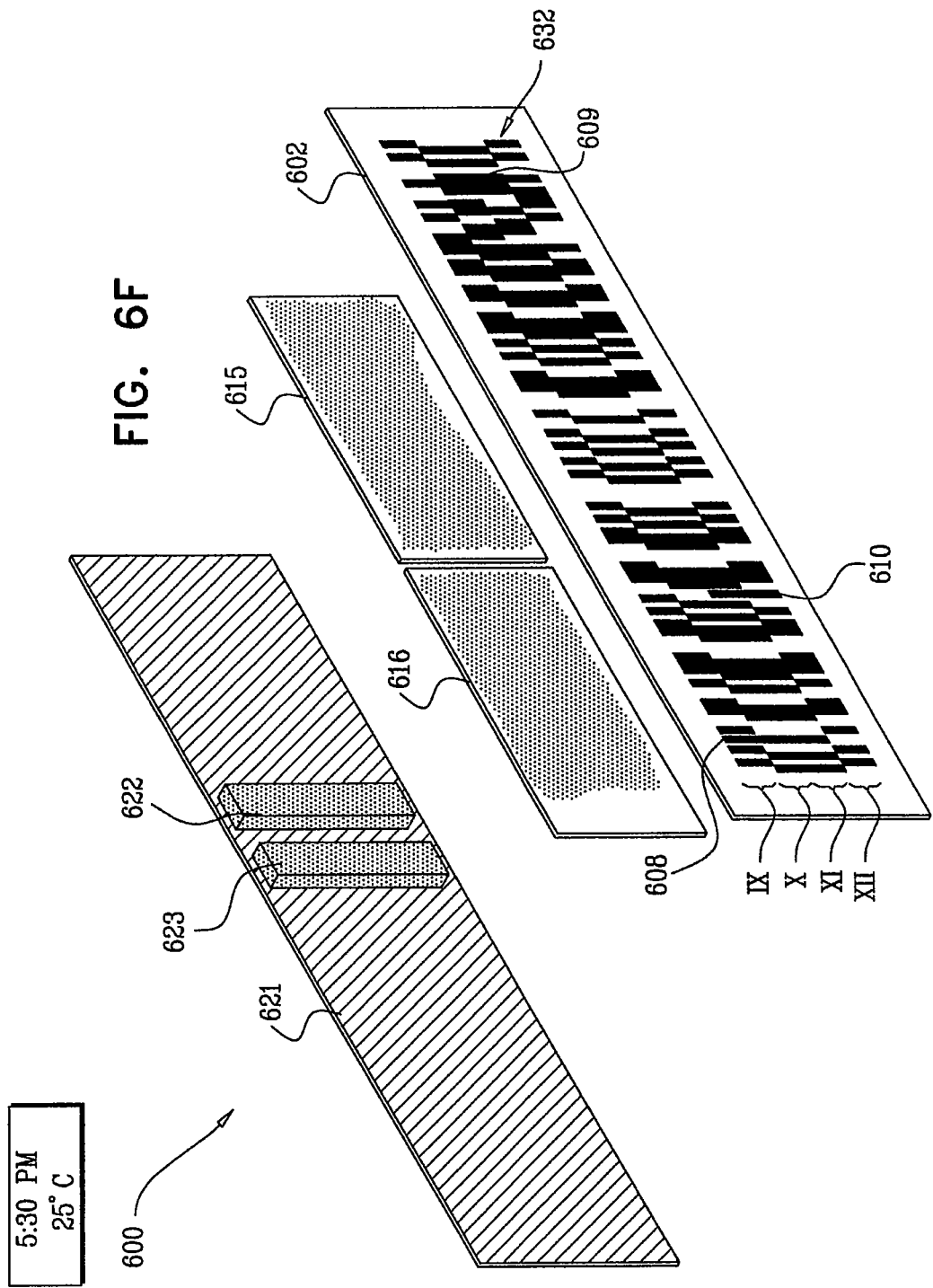

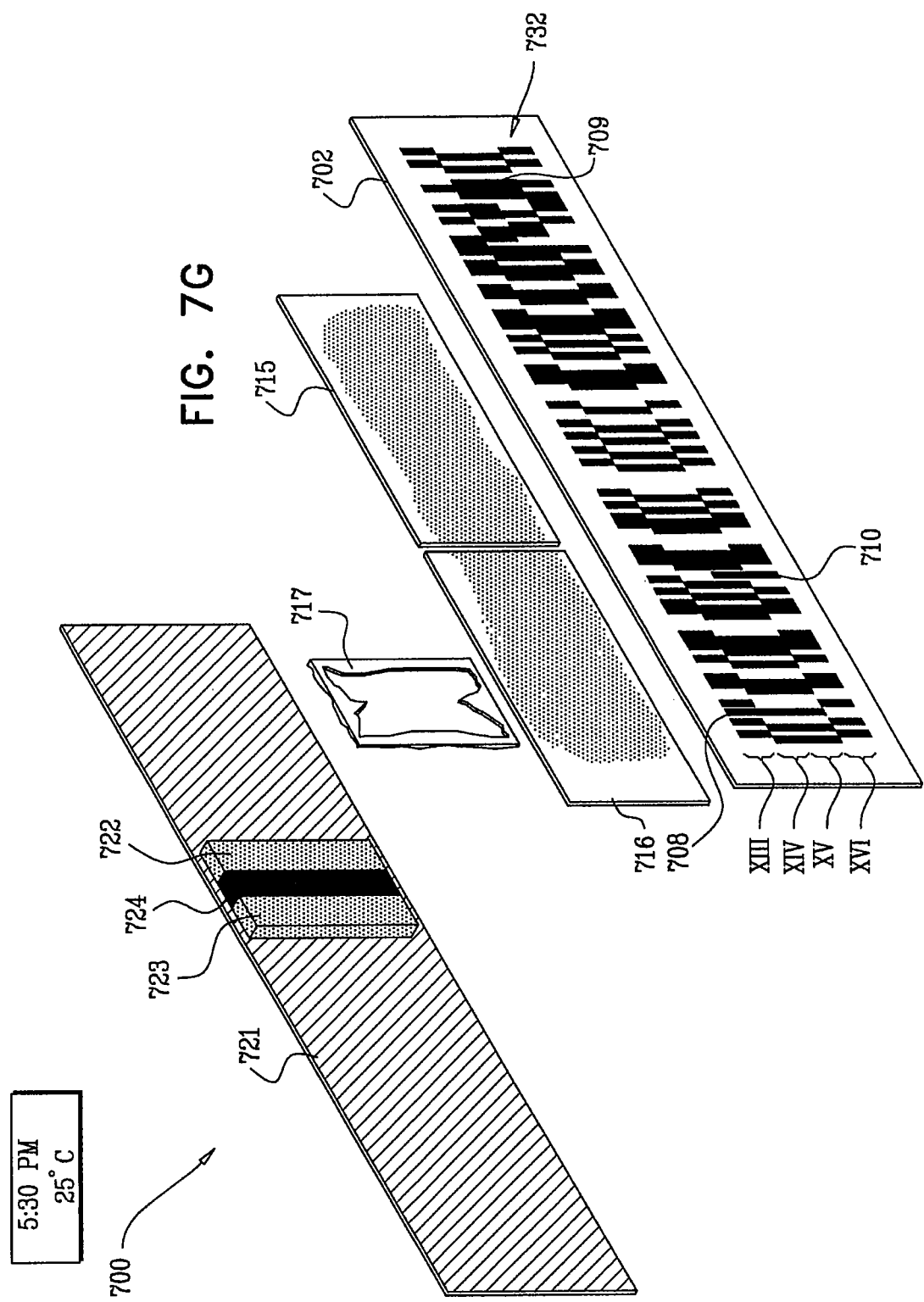

SYSTEM AND METHOD FOR QUALITY MANAGEMENT UTILIZING BARCODE INDICATORS

REFERENCE TO RELATED APPLICATIONS

Reference is made to PCT Patent Application No. PCT/IL07/000547, filed May 6, 2007 and entitled "A System And Method For Improved Quality Management In A Product Logistic Chain", to PCT Patent Application No. PCT/IL07/01411, filed Nov. 14, 2007 and entitled "A System And Method For Quality Management Utilizing Barcode Indicators", to PCT Patent Application No. PCT/IL2008/001495, filed Nov. 13, 2008 and entitled "A System And Method For Quality Management Utilizing Barcode Indicators", to PCT Patent Application No. PCT/IL2008/001494, filed Nov. 13, 2008 and entitled "A System And Method For Quality Management Utilizing Barcode Indicators" and to U.S. Provisional Application No. 61/131,644, filed Jun. 10, 2008 and entitled "A System And Method For Quality Management Utilizing Barcode Indicators", the disclosures of which are hereby incorporated by reference.

This application is a continuation of U.S. patent application Ser. No. 16/409,209, filed May 10, 2019, entitled "System And Method For Quality Management Utilizing Barcode Indicators", now U.S. Pat. No. 10,776,680, which is a continuation of U.S. patent application Ser. No. 15/978,759, filed May 14, 2018, entitled "System And Method For Quality Management Utilizing Barcode Indicators", now U.S. Pat. No. 10,303,992, which is a continuation of U.S. patent application Ser. No. 15/486,906, filed Apr. 13, 2017, entitled "System And Method For Quality Management Utilizing Barcode Indicators", now U.S. Pat. No. 9,996,783, which is a continuation of U.S. patent application Ser. No. 15/183,465, filed Jun. 15, 2016, entitled "System And Method For Quality Management Utilizing Barcode Indicators", now U.S. Pat. No. 9,626,610, which is a continuation of U.S. patent application Ser. No. 14/595,954, filed Jan. 13, 2015, entitled "System And Method For Quality Management Utilizing Barcode Indicators", now U.S. Pat. No. 9,396,423, which is a continuation of U.S. patent application Ser. No. 13/323,906, filed Dec. 13, 2011, entitled "System And Method For Quality Management Utilizing Barcode Indicators", now U.S. Pat. No. 8,960,534, which is a continuation of U.S. patent application Ser. No. 12/469,309, filed May 20, 2009, entitled "System And Method For Quality Management Utilizing Barcode Indicators", now U.S. Pat. No. 8,091,776, which claims priority from PCT Patent Application No. PCT/IL2008/001495, filed Nov. 13, 2008 and entitled "A System And Method For Quality Management Utilizing Barcode Indicators" and PCT Patent Application No. PCT/IL2008/001494, filed Nov. 13, 2008 and entitled "A System And Method For Quality Management Utilizing Barcode Indicators", and from U.S. Provisional Application No. 61/131,644, filed Jun. 10, 2008 and entitled "A System And Method For Quality Management Utilizing Barcode Indicators", the disclosures of which are hereby incorporated by reference.

FIELD OF THE INVENTION

The present invention relates to quality management systems and methodologies and to indicators useful in such systems and methodologies.

BACKGROUND OF THE INVENTION

The following U.S. patents relate generally to the subject matter of the present application: U.S. Pat. Nos. 6,758,397, 6,009,400, 6,685,094, 7,157,048, 7,156,597 and RE 39,226.

SUMMARY OF THE INVENTION

The present invention seeks to provide improved quality management systems and methodologies as well as indicators useful in such systems and methodologies.

There is thus provided in accordance with a preferred embodiment of the present invention a quality management system for products including a multiplicity of barcoded quality indicators each operative to provide a machine-readable indication of exceedance of at least one time and temperature threshold, a barcode indicator reader operative to read the barcoded quality indicators and to provide output indications and a product type responsive indication interpreter operative to receive the output indications and to provide human sensible, product quality status outputs, each of the barcoded quality indicators being operative to provide a single machine-readable barcode readable by the barcode indicator reader, generally at all times including times prior to, during and immediately following exceedance of the at least one time and temperature threshold. Each of the barcoded quality, indicators includes a first barcode including at least one first colorable area, the first barcode being machine-readable before exceedance of the at least one time and temperature threshold, at least a second barcode including at least one second colorable area, the second barcode not being machine-readable before exceedance of the at least one time and temperature threshold, a coloring agent located at a first location on the indicator and a coloring agent pathway operative to allow the coloring agent to move, at a rate which is at least partially a function of time, from the first location to the first and second colorable areas simultaneously for simultaneous coloring thereof upon exceedance of the time and temperature threshold, thereby causing the first barcode to become unreadable and at the same time causing the second barcode to become machine-readable.

Preferably, the barcoded quality indicators include linear barcodes. Additionally or alternatively, the first barcode and the at least second barcode are each operative to indicate a numerical or alphanumerical sequence.

Preferably, the first barcode complies with a first barcode standard and the at least second barcode complies with a barcode standard different from the first barcode standard.

Preferably, each of the multiplicity of barcoded quality indicators provides a first machine-readable indication prior to the exceedance of the at least one time and temperature threshold and a second machine-readable indication, different from the first machine-readable indication, following the exceedance of the at least one time and temperature threshold.

Preferably, at least one of the quality indicators is operative to provide a machine-readable indication of exceedance of a time period of less than ten minutes. Additionally or alternatively, at least one of the quality indicators is operative to provide indications of exceedance of several different thresholds.

Preferably, at least one of the quality indicators is operative to provide the machine-readable indication only following actuation thereof. Additionally, prior to the actuation at least one of the quality indicator is in a first visible state and following the actuation at least one of the quality indicator is in a second visible state, different from the first visible state, and at least one of the quality indicator is machine-readable at least in the second visible state. Additionally, at least one of the indicators is not machine-readable when the indicator is in the first visible state. Alternatively, at least one of the indicators is machine-readable when the indicator is in the first visible state.

Preferably, at least one of the quality indicators is operative to provide the machine-readable indication only upon activation thereof which occurs automatically a predetermined time following manufacture or actuation thereof.

There is also provided in accordance with another preferred embodiment of the present invention a barcoded quality indicator operative to provide a machine-readable indication of exceedance of at least one time and temperature threshold including a first barcode including at least one first colorable area, the first barcode being machine-readable before exceedance of the at least one time and temperature threshold, at least a second barcode including at least one second colorable area, the second barcode not being machine-readable before exceedance of the at least one time and temperature threshold, a coloring agent located at a first location on the indicator and a coloring agent pathway operative to allow the coloring agent to move, at a rate which is at least partially a function of time, from the first location to the first and second colorable areas simultaneously for simultaneous coloring thereof upon exceedance of the time and temperature threshold, thereby causing the first barcode to become unreadable and at the same time causing the second barcode to become machine-readable.

Preferably, the coloring agent pathway is operative to allow the coloring agent to move by diffusing from the first location to the first and the second colorable areas. Preferably, the first location is intermediate the ends of the first and the second barcodes. Additionally or alternatively, generally at any time prior to, during and immediately following exceedance of the time and temperature threshold only one of the barcodes is readable.

Preferably, the quality indicator further includes a pull strip, the pull strip being suitable to prevent the passage of solvents and coloring agents therethrough before removal thereof, and wherein removal of the pull strip actuates the indicator. Additionally or alternatively, the quality indicator further includes an activation delay layer dissolvable by a solvent, the activation delay layer being suitable to prevent the passage of coloring agents and solvents therethrough before dissolution thereof and wherein the indicators are not activated until dissolution of the delay layer.

There is additionally provided in accordance with yet another preferred embodiment of the present invention a method for providing quality management for products including employing a multiplicity of barcoded quality indicators each operative to provide a machine-readable indication of exceedance of at least one time and temperature threshold, each of the barcoded quality indicators being operative to provide a single machine-readable barcode, generally at all times including times prior to, during and immediately following exceedance of the at least one time and temperature threshold, reading the barcoded quality indicators to provide output indications, receiving the output indications and interpreting the output indications to provide human sensible, product quality status outputs. Each of the barcoded quality indicators includes a first barcode including at least one first colorable area, the first barcode being machine-readable before exceedance of the at least one time and temperature threshold, at least a second barcode including at least one second colorable area, the second barcode not being machine-readable before exceedance of the at least one time and temperature threshold, a coloring agent located at a first location on the indicator and a coloring agent pathway operative to allow the coloring agent to move, at a rate which is at least partially a function of time, from the first location to the first and second colorable areas simultaneously for simultaneous coloring thereof upon exceedance of the time and temperature threshold, thereby causing the first barcode to become unreadable and at the same time causing the second barcode to become machine-readable.

There is also provided in accordance with an additional preferred embodiment of the present invention a quality management system for products including a multiplicity of barcoded quality indicators each operative to provide a machine-readable indication of exceedance of at least one threshold by one or more product quality affecting parameters, a barcode indicator reader operative to read the barcoded quality indicators and to provide output indications and a product type responsive indication interpreter operative to receive the output indications and to provide human sensible, product quality status outputs, each of the barcoded quality indicators being operative to provide a single machine-readable barcode readable by the barcode indicator reader, generally at all times including times prior to, during and immediately following exceedance of the at least one threshold. Each of the barcoded quality indicators includes a first barcode including at least one first colorable area, the first barcode being machine-readable before exceedance of the at least one threshold, at least a second barcode including at least one second colorable area, the second barcode not being machine-readable before exceedance of the at least one threshold, a coloring agent located at a first location on the indicator and a coloring agent pathway operative to allow the coloring agent to move, at a rate which is at least partially a function of time, from the first location to the first and second colorable areas simultaneously for simultaneous coloring thereof upon exceedance of the threshold, thereby causing the first barcode to become unreadable and at the same time causing the second barcode to become machine-readable.

Preferably, one of the one or more product quality affecting parameters is time. Additionally or alternatively, one of the one or more product quality affecting parameters is temperature.

BRIEF DESCRIPTION OF THE DRAWINGS

The present invention will be understood and appreciated more fully from the following detailed description, taken in conjunction with the drawings in which:

FIGS. 1A-1C together are a simplified illustration of a system and methodology for quality management constructed and operative in accordance with a preferred embodiment of the present invention;

FIGS. 2A-2C together are a simplified illustration of a system and methodology for quality management constructed and operative in accordance with another preferred embodiment of the present invention;

FIG. 3A is a simplified illustration of a quality indicator constructed and operative in accordance with a preferred embodiment of the present invention for indicating elapsed time in temperature history;

FIG. 3B is a simplified illustration of a quality indicator constructed and operative in accordance with another preferred embodiment of the present invention for indicating elapsed time in temperature history with delayed activation;

FIG. 3C is a simplified illustration of a quality indicator constructed and operative in accordance with another preferred embodiment of the present invention for indicating elapsed time in temperature history;

FIGS. 4A-4E together are a simplified illustration of the structure and operation of an example of the quality indicator of FIG. 3A, in accordance with a preferred embodiment of the present invention;

FIGS. 5A-5F together are a simplified illustration of the structure and operation of an example of the quality indicator of FIG. 3B, in accordance with a preferred embodiment of the present invention;

FIGS. 6A-6F together are a simplified illustration of the structure and operation of an example of the quality indicator of FIG. 3C, in accordance with a preferred embodiment of the present invention;

FIGS. 7A-7G together are a simplified illustration of the structure and operation of an example of the quality indicator of FIG. 3D, in accordance with a preferred embodiment of the present invention.

DETAILED DESCRIPTION OF PREFERRED EMBODIMENTS

Figure 1A:
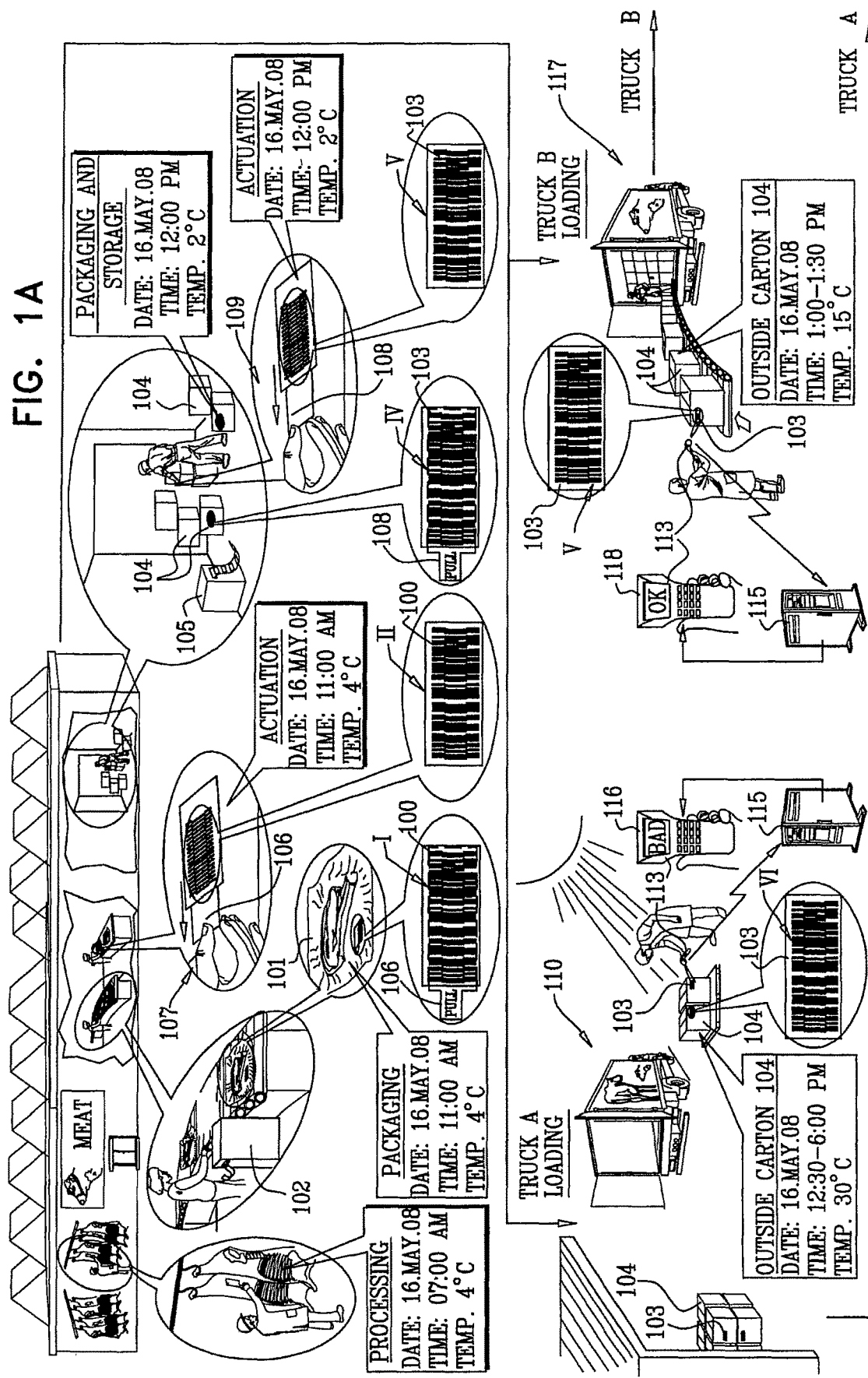
Figure 1B:
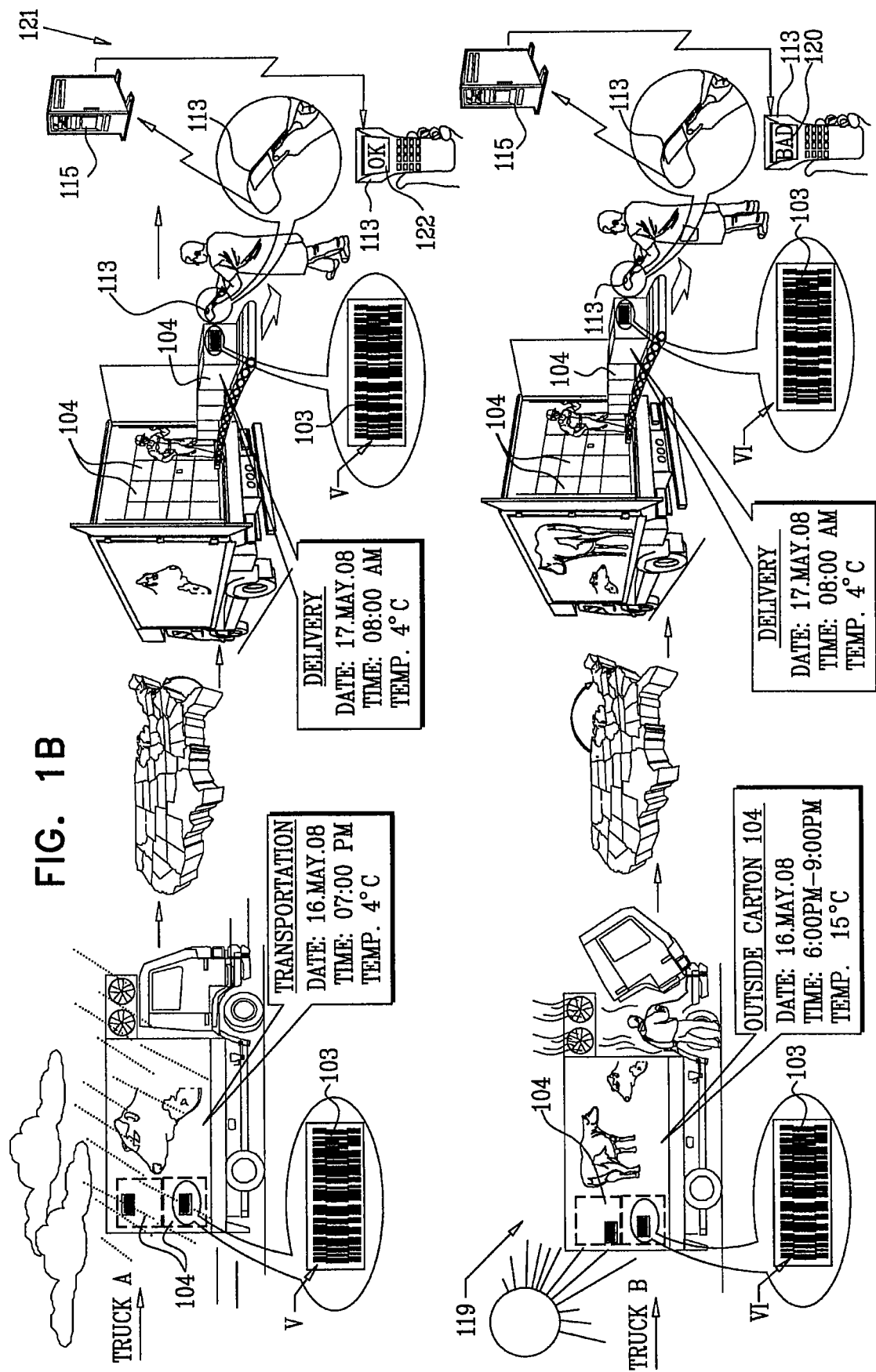

Reference is now made to FIGS. 1A-1C which together are a simplified illustration of a system and methodology for quality management constructed and operative in accordance with a preferred embodiment of the present invention. As seen in FIGS. 1A-1C, there is shown a quality management system and methodology for products including a multiplicity of quality indicators, here shown in the form of changeable barcode indicators, each operative to provide a machine-readable, preferably barcode-reader-readable, indication of exceedance of at least one threshold by at least one product quality affecting parameter, at least one indicator reader operative to read the quality indicators and to provide output indications and a product type responsive indication interpreter operative to receive the output indications and to provide human sensible, product quality status outputs.

Preferably, as elaborated hereinbelow with reference to FIG. 8, in addition to receiving the output indications provided by the indicator reader the indication interpreter may also receive product-related parameters such as product type, for example "meat", and product manufacturing date. Additionally or alternatively, the indication interpreter may receive other parameters, for example information relating to the quality indicator, such as the range of parameters sensed by the quality indicator, when the quality indicator was actuated, and whether the quality indicator includes a delayed activation feature. Additionally or alternatively, the indication interpreter may also received parameters relating to the source of the output indications provided, for example, whether the output indications were provided by a hand held device during inspection, or by the checkout scanner of a retail store.

The product-related parameters and the other parameters, such as those relating to the quality indicator may be provided by the quality indicator itself or by an additional, separate indicator, such as a barcode-bearing indicator. As a further alternative, these parameters may be provided by sensors, a priori information otherwise available to the indication interpreter or by manual entry.

The indication interpreter preferably forms part of or is otherwise connected to a quality indication computer, which may be remote from the indicator reader and which preferably includes a decision table providing product quality status outputs based on the output indications provided by the indicator reader and the additional parameters.

It is appreciated that the additional parameters may be provided via another part of the same indicator or by another barcoded indicator associated with the same product. Alternatively, the additional parameters may be provided by other methods, such as using RFID technology.

The term "barcode" is used herein to refer to a machine-readable optical code. In the examples in the specification, linear, or one-dimensional barcodes are illustrated. It is appreciated that the invention may be applicable to two dimensional barcodes as well.

Each barcode standard includes rules which govern the proper reading of the barcode. A typical barcode includes start indicia representing the start of the barcode, stop indicia representing the end of the barcode and digital indicia representing digits positioned therebetween. Each digit of the barcode is indicated by a series of bars and spaces each having a predetermined width. For example, in the 2 of 5 Interleaved barcode standard, each digit is indicated by two wide bars and three narrow bars. The UPC and the EAN128 barcode standards include middle indicia with different rules for indicating digits on either side of the middle indicia. Additionally, some barcode standards employ a checksum digit, which is calculated according to a mathematical formula based on the barcode symbol digits and is used as a control for the validity of the barcode.

Accordingly, a machine-readable barcode can be rendered unreadable in several different ways. For example, the series of bars forming the start or the stop indicia can be changed by adding or deleting bars or spaces, or by changing the width thereof. Such a change can cause the barcode reader not to recognize the start or the end of the barcode symbol resulting in the barcode not being readable. Another possibility is adding or deleting bars or spaces of the digital indicia or changing the width thereof so that a series of bars and spaces indicating a digit no longer indicates a digit according to the standard employed. Yet another possibility is making the above changes to a series of bars and spaces indicating a digit such that a different digit is indicated after the change and calculating the checksum digit including the changed digit results in a checksum digit different from the checksum digit indicated in the barcode, thereby causing the barcode to become invalid. A similar change causing invalidity of the barcode can also be made to the bars indicating the checksum digit itself.

Similarly, an unreadable barcode can be rendered machine-readable by adding or deleting bars or spaces or changing the width thereof. For example, bars forming the start or the stop indicia in a barcode where the start or the end are not properly indicated can be changed as explained above in order to properly form start or stop indicia. Similarly, an unreadable series of bars can be made to indicate a digit by adding or deleting bars or spaces or changing the width thereof. For example, according to the 2 or 5 Interleaved barcode standard, each digit is indicated by two wide bars and three narrow bars. If, for example, a readable barcode was rendered unreadable by changing a narrow bar into a wide bar, then changing a wide bar into a narrow bar can render the barcode readable. Similarly, if a barcode is unreadable because the checksum digit does not match the other barcode digits, then the bars indicating one of the digits or the checksum digit can be changed as explained above to restore barcode validity.

The quality indicator may incorporate a product code such as an EAN (European Article Number) or a UPC code (Universal Product Code). The examples shown in the description which follows all illustrate the use of an EAN code. Alternatively, the quality indicator may incorporate a 2 of 5 interleaved barcode or any other suitable barcode or machine-readable methodology. It is appreciated that bars of one dimensional barcodes correspond to cells in Data Matrix two dimensional barcodes and instead of the "start" and "stop" indicia of one dimensional barcodes, two adjacent borders defining a "finder pattern" are used in the Data Matrix two dimensional barcodes to locate and orient the symbol.

According to a preferred embodiment of the present invention, the quality indicator includes barcodes complying with GS1 (General Specifications) standards, which are outlined at www.gs1.org. According to GS1 standards, the three left-most digits are usually assigned to a country. In Israel, the seven, nine or ten left-most digits, including the country code, represent the supplier's code and the remaining right-most digits are used by each supplier. For example, as seen in the illustrated embodiments of the present application, the three left-most digits are 729, the GS1 country code assigned to Israel. The ten left-most digits, including the country code, represent a supplier's code and the three right-most digits are changeable by the supplier and combinations thereof are used in this application for indicating exceedance of thresholds.

It is appreciated that the ten left-most digits including the country code, which are generally assigned to a supplier, may be dedicated to indicating unsaleable goods, regardless of the event which lead to the goods becoming unsaleable.

According to a preferred embodiment of the present invention, the quality indicator is operative to provide a machine-readable indication of exceedance of at least one threshold by at least one product quality affecting parameter. Preferably, one of the product quality affecting parameters is time and the quality indicator is operative to provide a machine-readable indication of the exceedance of a very short time period, for example ten minutes. In a preferred embodiment illustrated in the description and drawings of this application, the quality indicator is operative to provide an indication of exceedance only following actuation thereof. Alternatively, the quality indicator may be operative to provide an indication of exceedance without actuation.

According to a preferred embodiment of the present invention, the quality indicator has a visible pre-actuation state, a different visible post-actuation state and at least one visible state indicating exceedance of a corresponding one of at least one threshold. The various states are preferably all machine-readable by a conventional barcode reader.

According to a preferred embodiment of the present invention the quality indicator is machine-readable generally at all times and presents one and only one machine-readable barcode generally at any given time. The term "generally" means at all times possibly except for very short time periods, such as time periods of less than five minutes, which may occur during exceedance of a threshold. During these short time periods the quality indicator may present more or less than one machine-readable barcode. Alternatively, one or more of the visible states of the quality indicator may not be machine-readable by a conventional barcode reader and the fact that they cannot be read provides status information. For example, various situations in which a product is not to be sold or used may be indicated as non-readable states of the quality indicator. Alternatively, the quality indicator may only become readable following actuation thereof. According to another embodiment of the present invention the quality indicator includes visible states wherein the indicator presents more than one machine-readable barcode at the same time.

In a preferred embodiment of the present invention the quality indicator includes at least two different barcodes preferably arranged in a stacked arrangement, each barcode having at least two visible states. Preferably, at any given time the visible state of only one of the barcodes forming part of an indicator is machine-readable and therefore the indicator presents a single machine-readable barcode at any given time. Alternatively, in one or more states of the indicator all of the barcodes forming part thereof may be in visible states which are not machine-readable. The quality indicator does not present a machine-readable barcode at these one or more states and the fact that the indicator cannot be read provides status information as detailed above.

Preferably, the barcodes forming part of an indicator are aligned such that the axes thereof are generally parallel to each other. According to a preferred embodiment illustrated in the description and drawings of this application, the bars of one barcode do not lie in registration with the corresponding bars of another barcode but rather are slightly offset with respect to each other. Alternatively, the bars of one barcode lie in registration with the corresponding bars of another barcode.

According to a preferred embodiment of the present invention, each of the barcodes forming part of a quality indicator includes a variable barcode having at least one colorable area. Preferably, at least one of the colorable areas in each barcode is operative to become colored or uncolored at the same time as a colorable area of at least one other barcode forming part of the same indicator, thereby causing at least two barcodes to simultaneously change.

Preferably, the colorable areas have the same width as a single barcode bar. Alternatively, at least one colorable area has a width different from that of a single barcode bar.

For the purposes of the present specification and claims, colorable areas which are operative to become colored or uncolored at the same time are together referred to as a colorable common area.

According to a preferred embodiment of the present invention a colorable common area which forms part of a first barcode and a second barcode is initially uncolored. The first barcode is machine-readable in its first visible state and the second barcode is not machine-readable in its first visible state. Upon actuation or upon exceedance of a threshold the colorable common area becomes colored thereby, at the same time causing the machine-readable first barcode to assume a second visible state which is not machine-readable and the unreadable second barcode to assume a second visible state which is machine-readable. Preferably, the second barcode in the machine-readable second visible state is different from the first barcode in the machine-readable first visible state. Accordingly, the indicator presents a first machine-readable barcode prior to actuation or exceedance of the threshold and a second machine-readable barcode, which is preferably different from the first machine-readable barcode, following actuation or exceedance of a threshold.

To further elaborate on the preferred embodiment described above, a quality indicator operative for indicating the exceedance of two thresholds without actuation may include, for example, three barcodes, I, II and III. Barcode I is machine-readable in its first visible state and barcodes II and III are not machine-readable in their first visible states. A first colorable common area useful for indicating the exceedance of a first threshold forms part of barcodes I and II. A second colorable common area useful for indicating the exceedance of a second threshold, which can occur only following exceedance of the first threshold, forms part of barcodes II and III. Before exceedance of a threshold the quality indicator presents a single machine-readable barcode, barcode I.

Upon exceedance of the first threshold the first colorable common area becomes colored thereby, at the same time causing the machine-readable barcode I to assume a second visible state which is not machine-readable and the unreadable barcode II to assume a second visible state which is machine-readable and different from the machine-readable first visible state of barcode I. At this point the quality indicator presents a single machine-readable barcode, barcode II.

Upon exceedance of the second threshold the second colorable common area becomes colored thereby, at the same time causing the machine-readable barcode II in the second visible state to assume a third visible state which is not machine-readable and the unreadable barcode III to assume a second visible state which is machine-readable and different from the machine-readable first visible state of barcode I and the machine-readable second visible state of barcode II. At this point the quality indicator presents a single machine-readable barcode, barcode III. Thus, at any time prior to, during and following exceedance of each threshold the indicator presents one machine-readable barcode.

The quality indicator may be rendered operative for indicating the exceedance of additional thresholds by including additional barcodes and additional colorable common areas in accordance with the above description.

It is appreciated that instead of using a separate barcode for indicating different events, one or more barcodes may each be used for indicating multiple events. For example, if the addition of a first barcode bar causes a barcode in a first machine-readable state to assume an unreadable state and the addition of a second barcode bar causes the same barcode in the unreadable state to assume a second machine-readable state then the first machine-readable state may be used for indicating one event and the second machine-readable state may be used for indicating a different event.

It is also appreciated that in order to provide indication of exceedance of unrelated thresholds which could occur at any order, the indicator may include a set of barcodes with colorable common areas, as described above, for each such threshold. The indicator in this case may present a machine-readable barcode for each threshold indicating the status thereof and therefore the indicator may present multiple machine-readable barcodes at a certain point in time.

According to a preferred embodiment of the present invention barcodes forming part of a quality indicator are each capable of indicating any numerical or alphanumerical sequence. Additionally or alternatively, barcodes forming part of a quality indicator are each capable of complying with any suitable barcode standard, including but not limited to EAN, UPC, 2 of 5 Interleaved, code39, code 39 extended, code 93, code 93 extended, code 128, code 128 A, B and C, ISBN, Code bar and Data Matrix. Accordingly, different barcodes forming part of the same quality indicator can comply with different barcode standards. For example, a quality indicator can include a first barcode complying with the EAN13 standard and a second barcode complying with the 2 of 5 Interleaved standard. Consequently, if the barcode reader of a checkout scanner is operative to read only the EAN13 barcode standard, then, once the first barcode becomes unreadable, the indicator no longer presents a readable barcode to the checkout scanner. However, the indicator is still readable by a barcode reader operative to read the 2 of 5 Interleaved standard.

Turning now to FIGS. 1A-1C, the present invention is illustrated in the context of a typical application, here a meat processing plant. A barcoded quality indicator 100 is attached to or otherwise incorporated into each package 101 of processed meat. A package bearing a barcoded quality indicator 100 is typically an individual package suitable for retail sale.

In accordance with a preferred embodiment of the present invention, the quality indicators 100 may be assembled and/or actuated at the same location or at a location adjacent that at which the quality indicators 100 are associated with packages 101. A suitable indicator assembler is indicated by reference numeral 102. It is appreciated that indicator assembler 102 may be associated with an automatic actuator. It is further appreciated that the actuator may be automatic and may actuate the quality indicator after it has been produced by indicator assembler 102.

As seen in FIG. 1A, additional barcoded quality indicators 103, which are preferably different from the quality indicators 100, are attached to or otherwise incorporated into cartons 104 containing packages 101 of processed meat bearing quality indicators 100. Preferably, the quality indicators 103 are assembled by an indicator assembler 105 which is similar to the quality indicator assembler 102, but is placed at a location which is different from the location of the quality indicator assembler 102. Alternatively, the quality indicators 103 may be assembled by the quality indicator assembler 102.

Different types of indicators may be employed for different types of packages. For example, the quality indicator used on a carton containing a plurality of individual packages may be more or less accurate or have a greater or lesser dynamic range of indications than the quality indicator used on an individual package. The dynamic range of an indicator may be a greater or lesser range of temperatures and/or of times. Additionally or alternatively, the quality indicator on a carton may include an indicator capable of indicating exceedance of additional thresholds, not included in the quality indicators of individual packages contained therein, or fewer thresholds than the quality indicators of individual packages contained therein.

In the illustrated embodiment, the quality indicators include an EAN (European Article Number) barcode. The quality indicators 100 are preferably constructed to be actuatable by pulling a pull strip 106 forming part thereof, as indicated by reference numeral 107. In the illustrated embodiment, the quality indicators 100 preferably have a visible pre-actuation state I, a different visible post-actuation state II and a visible state III indicating exceedance of a predetermined temperature, for example 21 degrees Celsius, for at least a predetermined cumulative amount of time, for example ten minutes, as seen at reference numeral 125 in FIG. 1C.

The visible states are readable by a barcode reader. For example, in this illustrated embodiment, the pre-actuation state I is read as 7290003804108, the post-actuation state II is read as 7290003804122 and the visible state III is read as 7290003804115.

As further seen in FIG. 1A, the quality indicators 103 are preferably constructed to be actuatable by pulling pull strip 108 forming part thereof, as indicated by reference numeral 109. In the illustrated embodiment, the indicators 103 preferably have a visible pre-actuation state IV, readable by a barcode reader typically as 7290003804146. The indicators 103 preferably have a visible post-actuation state V which is different from pre-actuation state IV and is readable by a barcode reader typically as 7290003804153. The indicators 103 preferably also have an additional at least one visible state VI as seen, for example, at reference numeral 110 in FIG. 1A and at reference numeral 119 in FIG. 1B, indicating exceedance of a predetermined temperature, for example 12 degrees Celsius, for at least a predetermined cumulative amount of time, for example one hour. This further visible state is readable by a barcode reader typically as 7290003804160.

Alternatively, any of the visible states IV, V and VI of the quality indicators 103 may be associated with barcodes which are the same as barcodes associated with states of the quality indicators 100. If the same barcode is associated with states of both types of indicators, then the identity of the quality indicator read by a barcode reader is provided to the indication interpreter by another method, for example by a manual entry to the database.

It is appreciated that the predetermined temperatures and the predetermined cumulative amounts of time may be selected as appropriate for a given application.

It is appreciated that as long as the temperature of the packages 101 does not exceed a predetermined temperature for at least a predetermined total amount of time, for example 21 degrees Celsius for ten minutes, indicators 100 remain in the visible state II.

As seen in FIG. 1A, as long as the temperature of the cartons 104 does not exceed a predetermined temperature for at least a predetermined total amount of time, for example 12 degrees Celsius for one hour, the quality indicators 103 remain in the visible state V.

As further seen in FIG. 1A, if during loading of truck A as indicated by reference numeral 110, the temperature on the outside of one or more cartons 104 is at least 30 degrees Celsius for a period of five and a half hours, which is more then the predetermined temperature of 12 degrees Celsius and the predetermined total amount of time of one hour, the corresponding indicators 103 assume the further visible state VI. This further visible state VI does not revert to the visible state V notwithstanding that the temperature of the carton 104 subsequently drops below the predetermined temperature. These cartons, when received by the customer, will be subject to inspection to determine whether the temperature of the packages 101 inside the cartons 104 exceeded predetermined time and temperature thresholds.

Accordingly, upon inspection, as upon delivery, the quality indicators 103 attached to the cartons 104 which were exposed to a temperature of at least 30 degrees Celsius for a period of five and a half hours may be read by an inspector using a conventional barcode reader 113. The barcode in its visible state VI preferably provides information to the quality indication computer 115 which enables the indication interpreter forming part thereof to provide an immediate indication of a quality status, such as a BAD indication 116. This BAD indication 116 indicates that at some time in the history of the quality indicator 103, the carton 104 to which it was attached was at least at the predetermined temperature for at least a predetermined total amount of time and that this event may have rendered one or more of the products in carton 104 unacceptable for sale.

Should the quality indicator 103 be in the visible state IV, indicating that proper actuation of the quality indicator 103 did not occur, a NON-ACTUATED indication or a BAD indication may be provided to an inspector or other interested party.

It is appreciated that until the cartons 104 are opened, which normally occurs only upon delivery, it is impractical to visually inspect the indicators 100 which are attached to the individual packages 101 inside the cartons 104. Depending on the circumstances, the temperature of the individual packages 101 within a carton 104 may or may not have exceeded 21 degrees Celsius for ten minutes and the indicators 100 which are attached to the packages 101 may or may not be in the further visible state III. This normally can only be seen upon opening the cartons 104 as shown in FIG. 1C.

It is a particular feature of the present invention that the time and temperature thresholds of the quality indicators 100 and 103, placed on the individual packages and the cartons containing them respectively, are preferably related in order to provide highly effective cold chain management. It is preferable that indicators 103 provide a time in temperature warning even if, upon inspection, the indicators 100 show that the individual packages 101 have not experienced unacceptable temperatures. In order that an unacceptable rate of false alarms not occur, the thresholds of the indicators 103 and 100 are preferably calibrated with respect to each other based, inter alia, on empirical data.

As further seen in FIG. 1A, if during loading of truck B, the ambient temperature on the outside of truck B reaches 15 degrees Celsius for 30 minutes, which is less than the predetermined duration of one hour, the quality indicators 103 remain in visible state V, as seen at reference numeral 117.

At any stage, such as upon delivery, the quality indicators 103 can be read with a conventional barcode reader 113, which preferably communicates with a remote quality indication computer 115 and provides an immediate indication of a quality status, such as an OK indication 118, to an inspector. It is appreciated that normally until delivery it is impractical to visually inspect the indicators 100.

As stated above with relation to loading of truck A as indicated by reference numeral 110, it is preferable that the indicators 103 provide a time in temperature threshold exceedance warning even if, upon inspection, the indicators 100 show that the individual packages 101 have not experienced unacceptable temperatures for unacceptable durations. Accordingly upon subsequent reading of the indicators 100 on the packages 101 inside a carton 104 for which no such warning was provided, as indicated by reference numeral 123 in FIG. 1C, it is not expected that the indicators 100 will indicate exceedance of corresponding time in temperature thresholds.

As seen in FIG. 1B, if during vehicle breakdown of truck B, the ambient temperature outside of the cartons 104 is 15 degrees Celsius which is more than the predetermined temperature of 12 degrees Celsius, for three hours which is more than the predetermined total duration of one hour, the quality indicators 103 assume the further visible state VI, as seen at reference numeral 119. This visible state VI does not revert to the visible state V notwithstanding that the temperature of the cartons 104 subsequently drops below the predetermined temperature.

Accordingly, upon inspection, as upon delivery, upon reading the quality indicators 103 by an inspector using a conventional barcode reader 113, the barcode in its visible state VI preferably provides information to the quality indication computer 115 which enables the indication interpreter forming part thereof to provide an immediate indication of a quality status, such as a BAD indication 120. This BAD indication 120 indicates that at some time in the history of the quality indicator 103, the carton 104 to which it was attached was at least at the predetermined temperature for at least a predetermined total amount of time and that this event may have rendered one or more of the products in carton 104 unacceptable for sale. It is appreciated that normally until cartons 104 are opened, typically following delivery, it is impractical to visually inspect indicators 100.

Depending on the circumstances, the temperatures of the individual packages 101 within the cartons 104 may or may not have exceeded 21 degrees Celsius for ten minutes and the quality indicators 100 which are attached to the packages 101 may or may not be in the further visible state III. This normally can only be seen upon opening cartons 104 as shown in FIG. 1C.

As further seen from FIG. 1B and indicated by reference numeral 121, upon inspection, as upon delivery, the quality indicators 103 attached to the cartons 104 which were delivered by truck A may be read by an inspector using a conventional barcode reader 113. As indicated by reference numeral 110 in FIG. 1A with relation to loading of truck A, one or more cartons 104 were exposed to a temperature of at least 30 degrees Celsius for a period of five and a half hours, and the quality indicators 103 of these cartons assumed the visible state VI, indicating exceedance of time in temperature thresholds.

In contrast, as indicated by reference numeral 121, the quality indicators 103 of other cartons 104 which were not exposed to a temperature of at least 30 degrees Celsius for a period of five and a half hours remained in the visible state V. The barcode in its visible state V preferably provides information to the quality indication computer 115 which enables the indication interpreter forming part thereof to provide an immediate OK indication 122.

Should the quality indicator 103 be in the visible state IV, indicating that proper actuation of the quality indicator 103 did not occur, a NON-ACTUATED indication or a BAD indication may be provided to an inspector or other interested party.

Turning now specifically to FIG. 1C, it is seen that upon opening the cartons 104 of packages 101 which were delivered by truck B, as indicated by reference numeral 123, the quality indicators 100 attached to the packages 101 are read by a conventional barcode reader 113. In this example, the quality indicators 100 of some of packages 101 are in the visible state II, indicating that notwithstanding that an indicator 103 on a carton 104 indicates exceedance of a time in temperature threshold, some of the packages, particularly those at the interior of the carton, may not have exceeded a corresponding time in temperature threshold and may be acceptable for sale.

Barcode reader 113 preferably communicates with a remote quality indication computer 115 and provides an immediate OK indication 124 to an inspector, indicating that the temperature of some of packages 101 did not exceed a predetermined temperature for at least a predetermined total amount of time, for example 21 degrees Celsius for ten minutes.

This OK indication is in contrast to the BAD indication 120 provided by the quality indicators 103 associated with the cartons 104 containing these packages 101 as the result of refrigeration breakdown of truck B, as indicated by reference numeral 119 in FIG. 1B. As stated above with relation to truck A loading indicated by reference numeral 110, it is preferable that the indicators 103 provide a time in temperature warning even if, upon inspection, the indicators 100 show that the individual packages 101 have not experienced unacceptable temperatures.

It is further stated above that in order that an unacceptable rate of false alarms not occur, the thresholds of indicators 103 and 100 are preferably calibrated with respect to each other based, inter alia, on empirical data, and not necessarily as indicated in the example of FIGS. 1A-1C, which is provided for illustration purposes. For example, a BAD indication for a carton 104 containing packages 101 all having an OK indication can be prevented if indicators 103 attached to the cartons 104 are calibrated to indicate the exceedance of a higher time or temperature threshold than that of indicators 100 on packages 101.

As further seen in FIG. 1C and indicated by reference numeral 125, upon opening the cartons 104 of packages 101 which were delivered by truck A and for which a BAD indication has already been provided by the quality indicators 103 associated therewith during loading of truck A, as indicated by reference numeral 110 in FIG. 1A, it is seen that the indicators 100 assumed during transport a further visible state III. It is appreciated that once the state III is reached, the quality indicator 100 preferably does not thereafter revert to the state II notwithstanding that the temperature of the package 101 subsequently drops below the predetermined temperature.

Accordingly, upon inspection, as upon delivery, upon reading the quality indicator 100 by an inspector using a conventional barcode reader 113, the barcode in its visible state III preferably provides information to the quality indication computer 115 which enables the indication interpreter forming part thereof to provide an immediate indication of a quality status, such as a BAD indication 127. This BAD indication 127 indicates that at some time in the history of the quality indicator 100, the package 101 to which it was attached was at a temperature exceeding the predetermined temperature for more than at least a predetermined cumulative amount of time, and that this event has rendered the product in package 101 unacceptable for sale.

Should the quality indicator 100 be in the visible state I, indicating that proper actuation of the quality indicator 100 did not occur, a NON-ACTUATED indication or a BAD indication may be provided to an inspector or other interested party.

It is appreciated, as discussed in more detail with reference to FIG. 8 below, that whereas machine reading of the quality indicators 100 and 103 provides an indication of whether or not a given event has occurred, the indication of a quality status by the quality indication computer 115 provides an indication of whether and to what extent that event has affected the quality of a given product with which the quality indicator 100 or the quality indicator 103 are associated. It is appreciated that there may be a great variation in the effect of a given event depending on the type of product. Thus, for example, exposure to 21 degrees Celsius for a short period of time may cause fresh meat to be rendered unfit for sale but may not appreciably affect the quality or saleability of oranges.

As further seen in FIG. 1C, a user employing an imager-equipped telephone or other suitable mobile communicator 128 may image the quality indicator 100 and communicate the image information to a suitably programmed quality indication computer 130, which may be identical to the computer 115, and which is capable of reading the barcode from the image information and providing to the user, via SMS or any other suitable communication methodology, an immediate indication of a quality status, such as a GOOD QUALITY indication 132. This quality status indicates that the product is safe for use. Alternatively, if the user employs a barcode reader-equipped communicator, the communicator can provide to the computer 115 an output resulting from reading the barcode.

It is appreciated that quality indication computer 130 may provide reports to various interested entities, such as the manufacturer or distributor of the products, health authorities and other governmental or private entities, to enable real-time monitoring of the quality of products offered for sale. The quality indication computer 130 may have caller ID functionality so as to be able to identify the caller, classify the caller, for example as a customer, a manufacturer's QA inspector and a health inspector, and provide an appropriate quality indication output. Additionally or alternatively, the quality indication computer 130 may send messages to supermarket management regarding remedial steps to be taken, such as refrigeration maintenance or repair instructions.

It is appreciated that the quality indicator may also be used for indicating the elapse of a long period of time at a storage temperature. Additionally, the quality indicator may be used to indicate events which occur following the purchase of a product.

Figure 2A:
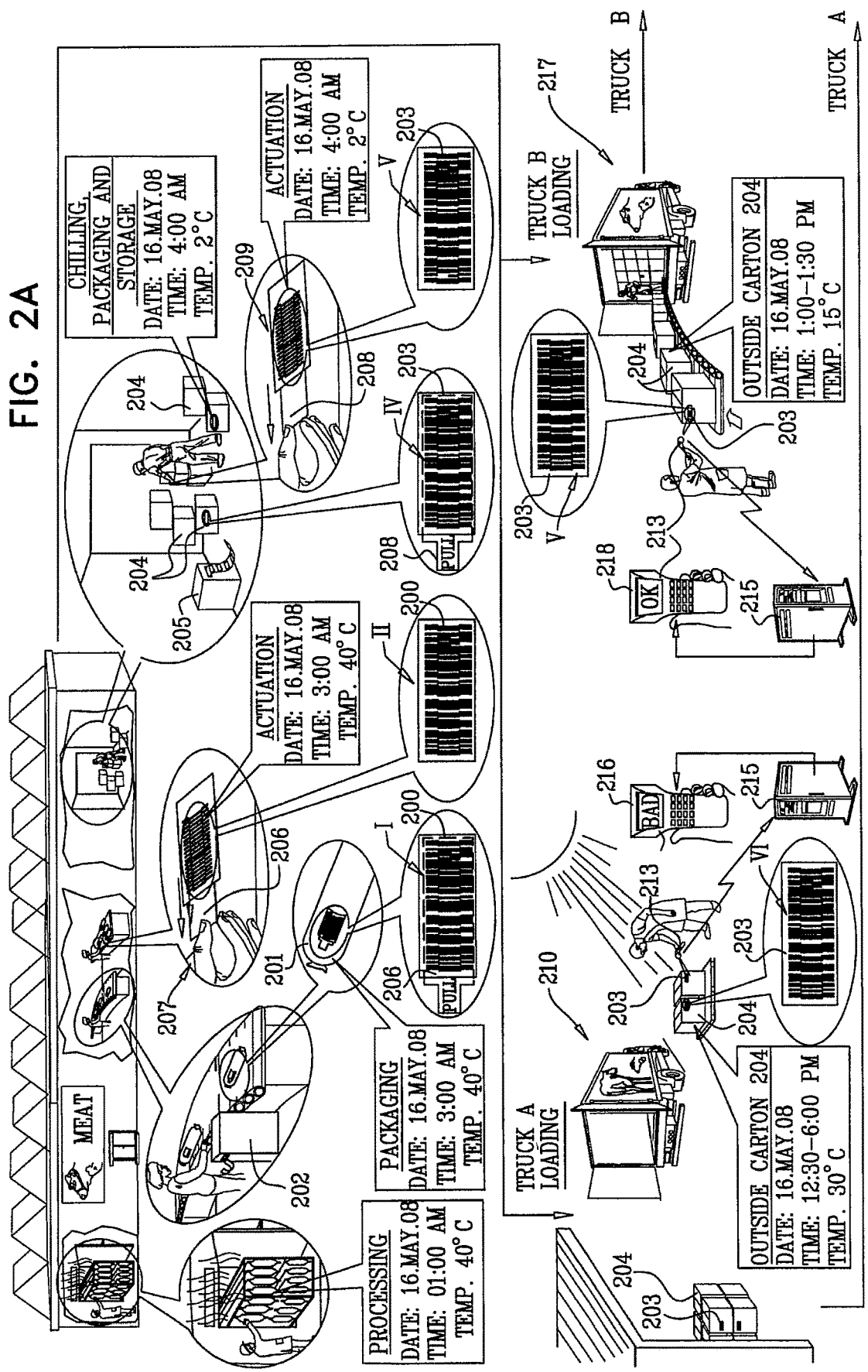
Figure 2C:
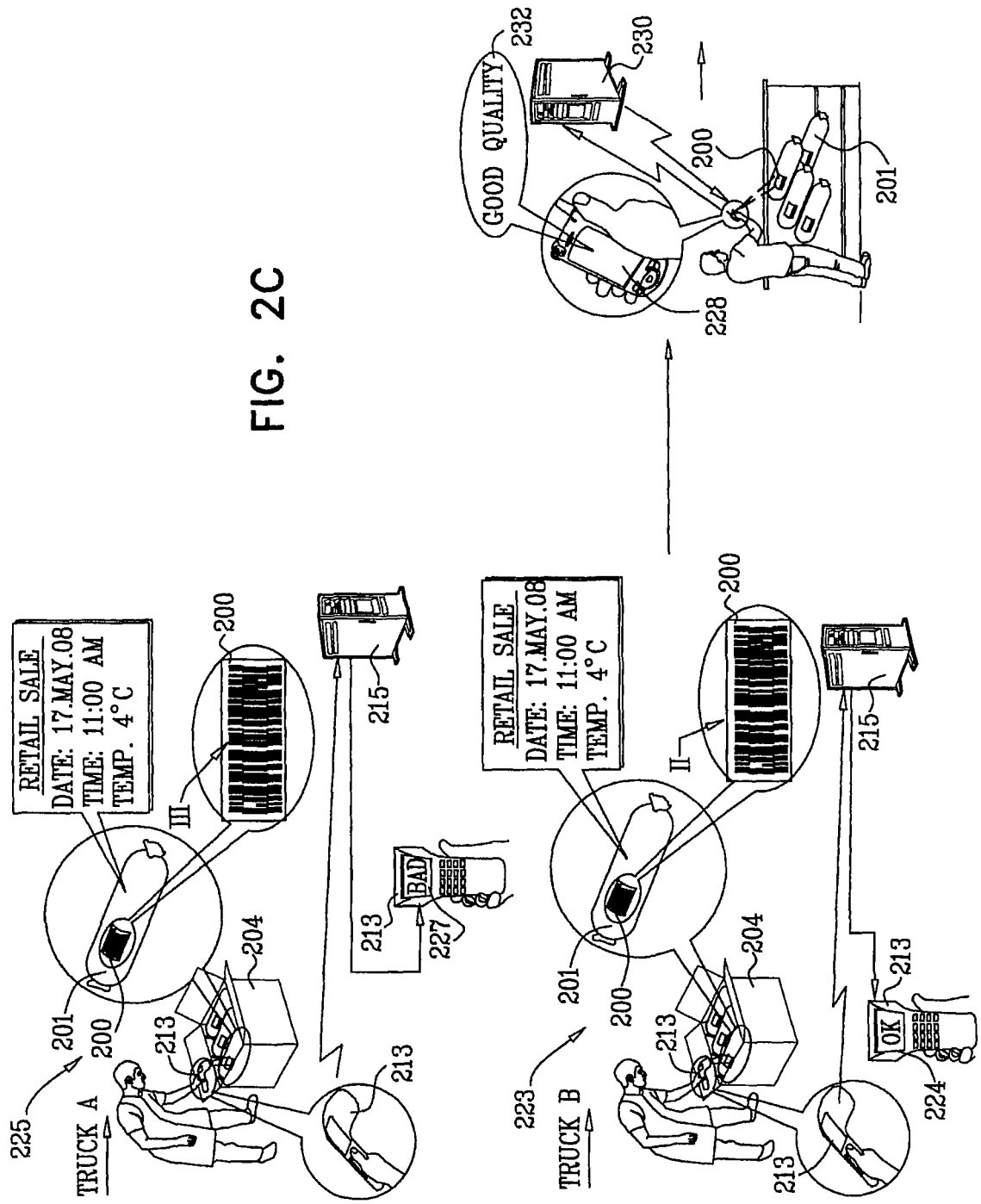

Turning now to FIGS. 2A-2C, the present invention is illustrated in the context of a typical application, here a meat processing plant. In contrast to the embodiment described hereinabove with reference to FIGS. 1A-1C, in the illustrated example of FIGS. 2A-2C, where hot packaging and labeling takes place, it is necessary for activation of the quality indicator to take place only once the product has been cooled to its desired long term storage temperature. A barcoded quality indicator 200 is attached to or otherwise incorporated into each package 201 of processed meat. A package bearing the barcoded quality indicator 200 is typically an individual package suitable for retail sale.

In accordance with a preferred embodiment of the present invention, the quality indicators 200 may be assembled and/or actuated at the same location or at a location adjacent that at which the quality indicators 200 are associated with the packages 201. A suitable indicator assembler is indicated by reference numeral 202. It is appreciated that the indicator assembler 202 may be associated with an automatic actuator. It is further appreciated that the actuator may be automatic and may actuate the quality indicator after it has been produced by the indicator assembler 202.

As seen in FIG. 2A, additional barcoded quality indicators 203, which are preferably different from the quality indicators 200, are attached to or otherwise incorporated into cartons 204 containing packages 201 of processed meat bearing quality indicators 200. Preferably, the quality indicators 203 are assembled by an indicator assembler 205 which is similar to the indicator assembler 202, but is placed at a location which is different from the location of the indicator assembler 202. Alternatively, the quality indicators 203 may be assembled by the indicator assembler 202.

Different types of quality indicators may be employed for different types of packages. For example, the quality indicator used on a carton containing a plurality of individual packages may be more or less accurate or have a greater or lesser dynamic range of indications than the quality indicator used on an individual package. The dynamic range of a quality indicator may be a greater or lesser range of temperatures and/or of times. Additionally or alternatively, the quality indicator on a carton may include a quality indicator capable of indicating exceedance of additional thresholds, not included on the quality indicators of individual packages contained therein, or fewer thresholds than the quality indicators of individual packages contained therein.

In the illustrated embodiment, the quality indicators include an EAN (European Article Number) barcode. The quality indicators 200 are preferably constructed to be actuatable by pulling a pull strip 206 forming part thereof, as indicated by reference numeral 207. In the illustrated embodiment, the quality indicators 200 preferably have a visible pre-actuation state I, a different visible post-actuation state II and a visible state III indicating exceedance of a predetermined temperature, for example 21 degrees Celsius, for at least a predetermined total amount of time, for example ten minutes, as seen at reference numeral 225 in FIG. 2C.

The visible states are readable by a barcode reader. For example, in this illustrated embodiment, the pre-actuation state I is read as 7290003804108, the post-actuation state II is read as 7290003804122 and the visible state III is read as 7290003804115.

As further seen in FIG. 2A, the quality indicators 203 are preferably constructed to be actuatable by pulling pull strip 208 forming part thereof, as indicated by reference numeral 209. In the illustrated embodiment, the indicators 203 preferably have a visible pre-actuation state IV, readable by a barcode reader typically as 7290003804146. Indicators 203 preferably have a visible post-actuation state V which is different from pre-actuation state IV and is readable by a barcode reader typically as 7290003804153. Indicators 203 preferably also have an additional at least one visible state VI as seen, for example, at reference numeral 210 in FIG. 2A and at reference numeral 219 in FIG. 2B, indicating exceedance of a predetermined temperature, for example 12 degrees Celsius, for at least a predetermined cumulative amount of time, for example one hour. This further visible state is readable by a barcode reader typically as 7290003804160.

Alternatively, any of the visible states IV, V and VI of the quality indicators 203 may be associated with barcodes which are the same as barcodes associated with states of the quality indicators 200. If the same barcode is associated with states of both types of indicators, then the identity of the quality indicator read by a barcode reader is provided to the indication interpreter by another method, for example by a manual entry to the database.

It is appreciated that the predetermined temperatures and the predetermined cumulative amounts of time may be selected as appropriate for a given application.

In contrast to the embodiment described hereinabove with reference to FIGS. 1A-1C, actuation, as by pulling the pull strip 206 or the pull strip 208, does not result in immediate activation of the indication functionality of the respective quality indicators 200 and 203. Thus the quality indicators 200 and 203 do not provide a machine-readable indication of exceedance of thresholds which takes place during a period of time between actuation and activation. Typically the resulting activation delay may be 8 hours following actuation. It is seen in FIG. 2A that during the activation delay the quality indicators 200 and 203 are not sensitive to temperature and retain their respective visible post-actuation states II and V.

It is appreciated that various types of indicators may be employed together in a quality management system. In some indicators actuation may result in the immediate activation of the quality indicator, and in other indicators activation of the quality indicator following actuation may be delayed. It is also appreciated that delayed activation of the indicator may take place even if the indicator is operative to provide an indication of exceedance without actuation.

It is appreciated that following elapse of the activation delay, as long as the temperature of the packages 201 does not exceed a predetermined temperature for at least a predetermined total amount of time, for example 21 degrees Celsius for ten minutes, the indicators 200 remain in the visible state II.

As seen in FIG. 2A as long as, following elapse of the activation delay, the temperature of the carton 204 of packages 201 does not exceed a predetermined temperature for at least a predetermined cumulative amount of time, for example 12 degrees Celsius for one hour, the quality indicators 203 remain in the visible state V.

As further seen in FIG. 2A, if during loading of truck A as indicated by reference numeral 210, after the elapse of the activation delay the temperature on the outside of one or more cartons 204 is at least 30 degrees Celsius for a period of five and a half hours, which is more then the predetermined temperature of 12 degrees Celsius and the predetermined total amount of time of one hour, the corresponding indicators 203 assume the further visible state VI. This further visible state VI does not revert to the visible state V notwithstanding that the temperature of the carton 204 subsequently drops below the predetermined temperature. These cartons, when received by the customer, will be subject to inspection to determine whether the temperature of the packages 201 inside the cartons 204 exceeded predetermined time in temperature thresholds.

Accordingly, upon inspection, as upon delivery, the quality indicators 203 attached to the cartons 204 which were exposed to a temperature of at least 30 degrees Celsius for a period of five and a half hours may be read by an inspector using a conventional barcode reader 213. The barcode in its visible state VI preferably provides information to the quality indication computer 215 which enables the indication interpreter forming part thereof to provide an immediate indication of a quality status, such as a BAD indication 216. This BAD indication 216 indicates that at some time in the history of the quality indicator 203, the carton 204 to which it was attached was at least at the predetermined temperature for at least a predetermined total amount of time and that this event may have rendered one or more of the products in carton 204 unacceptable for sale.

Should the quality indicator 203 be in the visible state IV, indicating that proper actuation of the quality indicator 203 did not occur, a NON-ACTUATED indication or a BAD indication may be provided to an inspector or other interested party.

It is appreciated that until the cartons 204 are opened, which normally occurs only upon delivery, it is impractical to visually inspect the indicators 200 which are attached to the individual packages 201 inside the cartons 204. Depending on the circumstances, the temperature of the individual packages 201 within a carton 204 may or may not have exceeded 21 degrees Celsius for ten minutes and the quality indicators 200 which are attached to the packages 201 may or may not be in the further visible state III. This normally can only be seen upon opening the cartons 204 as shown in FIG. 2C.

It is a particular feature of the present invention that the time and temperature thresholds of the quality indicators 200 and 203, placed on the individual packages and the cartons containing them respectively, are preferably related in order to provide highly effective cold chain management. It is preferable that the quality indicators 203 provide a time in temperature warning even if, upon inspection, indicators 200 show that the individual packages 201 have not experienced unacceptable temperatures. In order that an unacceptable rate of false alarms not occur, the thresholds of indicators 203 and 200 are preferably calibrated with respect to each other based, inter alia, on empirical data.

As further seen in FIG. 2A, if during loading of truck B, after the elapse of the activation delay the ambient temperature on the outside of truck B reaches 15 degrees Celsius for thirty minutes, which is less than the predetermined duration of one hour, the quality indicator 203 remains in the visible state V, as seen at reference numeral 217.

At any stage, such as upon delivery, the quality indicator 203 can be read with a conventional barcode reader 213, which preferably communicates with a remote quality indication computer 215 and provides an immediate indication of a quality status, such as an OK indication 218, to an inspector. It is appreciated that normally until delivery it is impractical to visually inspect indicators 200.

As stated above with relation to loading of truck A as indicated by reference numeral 210, it is preferable that the quality indicators 203 provide a time in temperature threshold exceedance warning even if, upon inspection, the quality indicators 200 show that the individual packages 201 have not experienced unacceptable temperatures for unacceptable durations. Accordingly upon subsequent reading of the quality indicators 200 on packages 201 inside a carton 204 for which no such warning was provided, as indicated by reference numeral 223 in FIG. 2C, it is not expected that indicators 200 will indicate exceedance of corresponding time in temperature thresholds.

As seen in FIG. 2B, if during vehicle breakdown of truck B, after the elapse of the activation delay the ambient temperature outside of the cartons 204 is 15 degrees Celsius which is more than the predetermined temperature of 12 degrees Celsius, for three hours which is more than the predetermined total duration of one hour, the quality indicator assumes the further visible state VI, as seen at reference numeral 219. This visible state VI does not revert to the visible state V notwithstanding that the temperature of the cartons 204 subsequently drops below the predetermined temperature.

Accordingly, upon inspection, as upon delivery, upon reading the quality indicator 203 by an inspector using a conventional barcode reader 213, the barcode in its visible state VI preferably provides information to the quality indication computer 215 which enables the indication interpreter forming part thereof to provide an immediate indication of a quality status, such as a BAD indication 220. This BAD indication 220 indicates that at some time in the history of the quality indicator 203, the carton 204 to which it was attached was at least at the predetermined temperature for at least a predetermined total amount of time and that this event may have rendered one or more of the products in carton 204 unacceptable for sale. It is appreciated that normally until cartons 204 are opened, typically following delivery, it is impractical to visually inspect indicators 200.

Depending on the circumstances, the temperatures of the individual packages 201 within the cartons 204 may or may not have exceeded 21 degrees Celsius for ten minutes and the quality indicators 200 which are attached to the packages 201 may or may not be in the further visible state III. This normally can only be seen upon opening cartons 204 as shown in FIG. 2C.

As further seen from FIG. 2B and indicated by reference numeral 221, upon inspection, as upon delivery, the quality indicators 203 attached to the cartons 204 which were delivered by truck A may be read by an inspector using a conventional barcode reader 213. As indicated by reference numeral 210 in FIG. 2A with relation to loading of truck A, one or more cartons 204 were exposed to a temperature of at least 30 degrees Celsius for a period of five and a half hours, and the quality indicators 203 of these cartons assumed the visible state VI, indicating exceedance of time in temperature thresholds.

In contrast, as indicated by reference numeral 221, the quality indicators 203 of other cartons 204 which were not exposed to a temperature of at least 30 degrees Celsius for a period of five and a half hours remained in the visible state V. The barcode in its visible state V preferably provides information to the quality indication computer 215 which enables the indication interpreter forming part thereof to provide an immediate OK indication 222.

Should the quality indicator 203 be in visible state IV, indicating that proper actuation of the quality indicator 203 did not occur, a NON-ACTUATED indication or a BAD indication may be provided to an inspector or other interested party.

Turning now specifically to FIG. 2C, it is seen that upon opening the cartons 204 of packages 201 which were delivered by truck B, as indicated by reference numeral 223, the quality indicators 200 attached to the packages 201 are read by a conventional barcode reader 213. In this example, the quality indicators 200 of some of packages 201 are in the visible state II, indicating that notwithstanding that an indicator 203 on a carton 204 indicates exceedance of a time in temperature threshold, some of the packages, particularly those at the interior of the carton, may not have exceeded a corresponding time in temperature threshold and may be acceptable.

Barcode reader 213 preferably communicates with a remote quality indication computer 215 and provides an immediate OK indication 224 to an inspector, indicating that the temperature of some of the packages 201 did not exceed a predetermined temperature for at least a predetermined total amount of time, for example 21 degrees Celsius for ten minutes.

This OK indication is in contrast to the BAD indication 220 provided by the quality indicators 203 associated with cartons 204 containing these packages 201 as the result of refrigeration breakdown of truck B, as indicated by reference numeral 219 in FIG. 2B. As stated above with relation to truck A loading indicated by reference numeral 210, it is preferable that indicators 203 provide a time in temperature warning even if, upon inspection, indicators 200 show that the individual packages 201 have not experienced unacceptable temperatures.

It is further stated above that in order that an unacceptable rate of false alarms not occur, the thresholds of the quality indicators 203 and 200 are preferably calibrated with respect to each other based, inter alia, on empirical data, and not necessarily as indicated in the example of FIGS. 2A-2C, which is provided for illustration purposes. For example, a BAD indication for a carton 204 containing packages 201 all having an OK indication can be prevented if the quality indicators 203 attached to the cartons 204 are calibrated to indicate the exceedance of a higher time or temperature threshold than that of indicators 200 on packages 201.

As further seen in FIG. 2C and indicated by reference numeral 225, upon opening the cartons 204 of packages 201 which were delivered by truck A and for which a BAD indication has already been provided by the quality indicators 203 associated therewith during loading of truck A, as indicated by reference numeral 210 in FIG. 2A, it is seen that indicators 200 assumed during transport the further visible state III. It is appreciated that once the state III is reached, the quality indicator 200 preferably does not thereafter revert to the state II notwithstanding that the temperature of the package 201 subsequently drops below the predetermined temperature.

Accordingly, upon inspection, as upon delivery, upon reading the quality indicator 200 by an inspector using a conventional barcode reader 213, the barcode in its visible state III preferably provides information to the quality indication computer 215 which enables the indication interpreter forming part thereof to provide an immediate indication of a quality status, such as a BAD indication 227. This BAD indication 227 indicates that at some time in the history of the quality indicator 200, the package 201 to which it was attached was at a temperature exceeding the predetermined temperature for more than at least a predetermined cumulative amount of time, and that this event has rendered the product in package 201 unacceptable for sale.

Should the quality indicator 200 be in the visible state I, indicating that proper actuation of the quality indicator 200 did not occur, a NON-ACTUATED indication or a BAD indication may be provided to an inspector or other interested party.

It is appreciated, as discussed in more detail with reference to FIG. 8 below, that whereas machine reading of the quality indicators 200 and 203 provides an indication of whether or not a given event has occurred, the indication of a quality status by the quality indication computer 215 provides an indication of whether and to what extent that event has affected the quality of a given product with which the quality indicator 200 or the quality indicator 203 are associated. It is appreciated that there may be a great variation in the effect of a given event depending on the type of product. Thus, for example, exposure to 21 degrees Celsius for a short period of time may cause fresh meat to be rendered unfit for sale but may not appreciably affect the quality or saleability of oranges.

As further seen in FIG. 2C, a user employing an imager-equipped telephone or other suitable mobile communicator 228 may image the quality indicator 200 and communicate the image information to a suitably programmed quality indication computer 230, which may be identical to the computer 215, and which is capable of reading the barcode from the image information and providing to the user, via SMS or any other suitable communication methodology, an immediate indication of a quality status, such as a GOOD QUALITY indication 232. This quality status indicates that the product is safe for use. Alternatively, if the user employs a barcode reader-equipped communicator, the communicator can provide to the computer 215 an output resulting from reading the barcode.

It is appreciated that the quality indication computer 230 may provide reports to various interested entities, such as the manufacturer or distributor of the products, health authorities and other governmental or private entities, to enable real-time monitoring of the quality of products offered for sale. The quality indication computer 230 may have caller ID functionality so as to be able to identify the caller, classify the caller, for example as a customer, a manufacturer's QA inspector and a health inspector, and provide an appropriate quality indication output. Additionally or alternatively, the quality indication computer 230 may send messages to supermarket management regarding remedial steps to be taken, such as refrigeration maintenance or repair instructions.

It is appreciated that the quality indicator may also be used for indicating the elapse of a long period of time at a storage temperature. Additionally, the quality indicator may be used to indicate events which occur following the purchase of a product.

Reference is now made to FIGS. 3A-3D, which are simplified illustrations of quality indicators constructed and operative in accordance with a preferred embodiment of the present invention for indicating a combination of elapsed time in temperature history.

FIG. 3A illustrates a package of meat 300 including a combination elapsed time in temperature indicator 301 constructed and operative in accordance with a preferred embodiment of the present invention of the type described hereinabove with reference to FIGS. 1A-1C. The quality indicator 301 is typically constructed to be actuatable by pulling a pull strip 302 forming part thereof.

As illustrated in FIG. 3A, indicator 301 includes barcodes I, II, III and IV, which are preferably different from each other and arranged in a stacked arrangement. Barcodes I, II, III and IV are in visible states 303, 304, 305 and 306, respectively. Prior to actuation, barcode I in visible state 303 is typically readable by a conventional barcode reader as 7290003804108 and barcodes II, III and IV in the respective visible states 304, 305 and 306 are preferably not readable by a barcode reader. Thus, the indicator 301 in its first visible state presents a single machine-readable barcode typically readable by a conventional barcode reader as 7290003804108, as indicated by designator A.

Following actuation, the colorable common area indicated by reference numeral 307 becomes colored, thereby causing barcode I to become unreadable and barcode II to assume a further visible state 308, typically readable by a conventional barcode reader as 7290003804122. Barcodes III and IV remain unreadable and the indicator 301 in its second visible state presents a single machine-readable barcode typically readable by a conventional barcode reader as 7290003804122, as long as the temperature of the package 300 does not exceed a predetermined temperature for at least a predetermined cumulative amount of time, for example 21 degrees Celsius for ten minutes, as indicated by designator B.

Once the temperature of the package 300 is more than the predetermined temperature for at least a predetermined cumulative amount of time, such as 25 degrees Celsius for ten minutes, the colorable common area indicated by reference numeral 309 becomes colored, thereby causing barcode II to become unreadable and barcode III to assume a further visible state 310, typically readable by a conventional barcode reader as 7290003804115. Barcodes I and IV remain unreadable and the indicator 301 presents a single machine-readable barcode typically readable by a conventional barcode reader as 7290003804115, as indicated by designator C.

If the temperature of the package 300 continues to exceed the predetermined temperature for an additional predetermined amount of time, for example 50 minutes, the colorable common area indicated by reference numeral 311 becomes colored, thereby causing barcode III to become unreadable and barcode IV to assume a further visible state 312, typically readable by a conventional barcode reader as 7290003804139. Barcodes I and II remain unreadable and the indicator 301 presents a single machine-readable barcode typically readable by a conventional barcode reader as 7290003804139, as indicated by designator D.

FIG. 3B illustrates a package of meat 320 including a combination elapsed time in temperature indicator 321 constructed and operative in accordance with a preferred embodiment of the present invention of the type described hereinabove with reference to FIGS. 2A-2C. The quality indicator 321 is typically constructed to be actuatable by pulling a pull strip 322 forming part thereof.

As illustrated in FIG. 3B, indicator 321 includes barcodes V, VI, VII and VIII, which are preferably different from each other and arranged in a stacked arrangement. Barcodes V, VI, VII and VIII are in visible states 323, 324, 325 and 326, respectively. Prior to actuation, barcode V in visible state 323 is typically readable by a conventional barcode reader as 7290003804108 and barcodes VI, VII and VIII in the respective visible states 324, 325 and 326 are preferably not readable by a barcode reader. Thus, the indicator 321 in its first visible state presents a single machine-readable barcode typically readable by a conventional barcode reader as 7290003804108, as indicated by designator A.

Following actuation, the colorable common area indicated by reference numeral 327 becomes colored, thereby causing barcode V to become unreadable and barcode VI to assume a further visible state 328, typically readable by a conventional barcode reader as 7290003804122. Barcodes VII and VIII remain unreadable and the indicator 321 in its second visible state presents a single machine-readable barcode typically readable by a conventional barcode reader as 7290003804122.

The quality indicator 321 preferably remains in the second visible state prior to activation, for at least a predetermined time following actuation, typically 8 hours, irrespective of the temperature of the quality indicator 321 as indicated by designators B and C.

Upon activation, once the temperature of the package 320 is more than the predetermined temperature for at least a predetermined cumulative amount of time, such as 25 degrees Celsius for ten minutes, the colorable common area indicated by reference numeral 329 becomes colored, thereby causing barcode VI to become unreadable and barcode VII to assume a further visible state 330, typically readable by a conventional barcode reader as 7290003804115. Barcodes V and VIII remain unreadable and the indicator 321 presents a single machine-readable barcode typically readable by a conventional barcode reader as 7290003804115, as indicated by designator D.

If the temperature of the package 320 continues to exceed the predetermined temperature for an additional predetermined amount of time, for example 50 minutes, the colorable common area indicated by reference numeral 331 becomes colored, thereby causing barcode VII to become unreadable and barcode VIII to assume a further visible state 332, typically readable by a conventional barcode reader as 7290003804139. Barcodes V and VI remain unreadable and the indicator 321 presents a single machine-readable barcode typically readable by a conventional barcode reader as 7290003804139, as indicated by designator E.

FIG. 3C illustrates a package of meat 340 including a combination elapsed time in temperature indicator 341 constructed and operative in accordance with a preferred embodiment of the present invention of the type described hereinabove with reference to FIGS. 1A-1C. The quality indicator 341 is typically constructed to be actuatable by pulling a pull strip 342 forming part thereof.

As illustrated in FIG. 3C, indicator 341 includes barcodes IX, X, XI and XII, which are preferably different from each other and arranged in a stacked arrangement. Barcodes IX, X, XI and XII are in visible states 343, 344, 345 and 346, respectively. Before actuation, barcode IX in visible state 343 is typically readable by a conventional barcode reader as 7290003804108, and barcodes X, XI and XII in the respective visible states 344, 345 and 346 are preferably not readable by a barcode reader. Thus, the indicator 341 in its first visible state presents a single machine-readable barcode typically readable by a conventional barcode reader as 7290003804108, as indicated by designator A.

Following actuation, the colorable common area indicated by reference numeral 347 becomes colored, thereby causing barcode IX to become unreadable and barcode X to assume a further visible state 348, typically readable by a conventional barcode reader as 7290003804122. Barcodes XI and XII remain unreadable and the indicator 341 in its second visible state presents a single machine-readable barcode typically readable by a conventional barcode reader as 7290003804122, as long as the temperature of the package 340 does not exceed a predetermined temperature for at least a predetermined cumulative amount of time, for example 12 degrees Celsius for 30 minutes, as indicated by designator B.

Once the temperature of the package 340 is more than the predetermined temperature for at least a predetermined cumulative amount of time the colorable common area indicated by reference numeral 349 becomes colored, thereby causing barcode X to become unreadable and barcode XI to assume a further visible state 350, typically readable by a conventional barcode reader as 7290003804115. Barcodes IX and XII remain unreadable and the indicator 341 presents a single machine-readable barcode typically readable by a conventional barcode reader as 7290003804115, as indicated by designator C.

If the temperature of the package 340 exceeds a second predetermined temperature, for example 21 degrees Celsius, for at least predetermined amount of time, for example thirty minutes, the colorable common area indicated by reference numeral 351 becomes colored, thereby causing barcode XI to become unreadable and barcode XII to assume a further visible state 352, typically readable by a conventional barcode reader as 7290003804139. Barcodes IX and X remain unreadable and the indicator 341 presents a single machine-readable barcode typically readable by a conventional barcode reader as 7290003804139, as indicated by designator D.

Figure 3D:
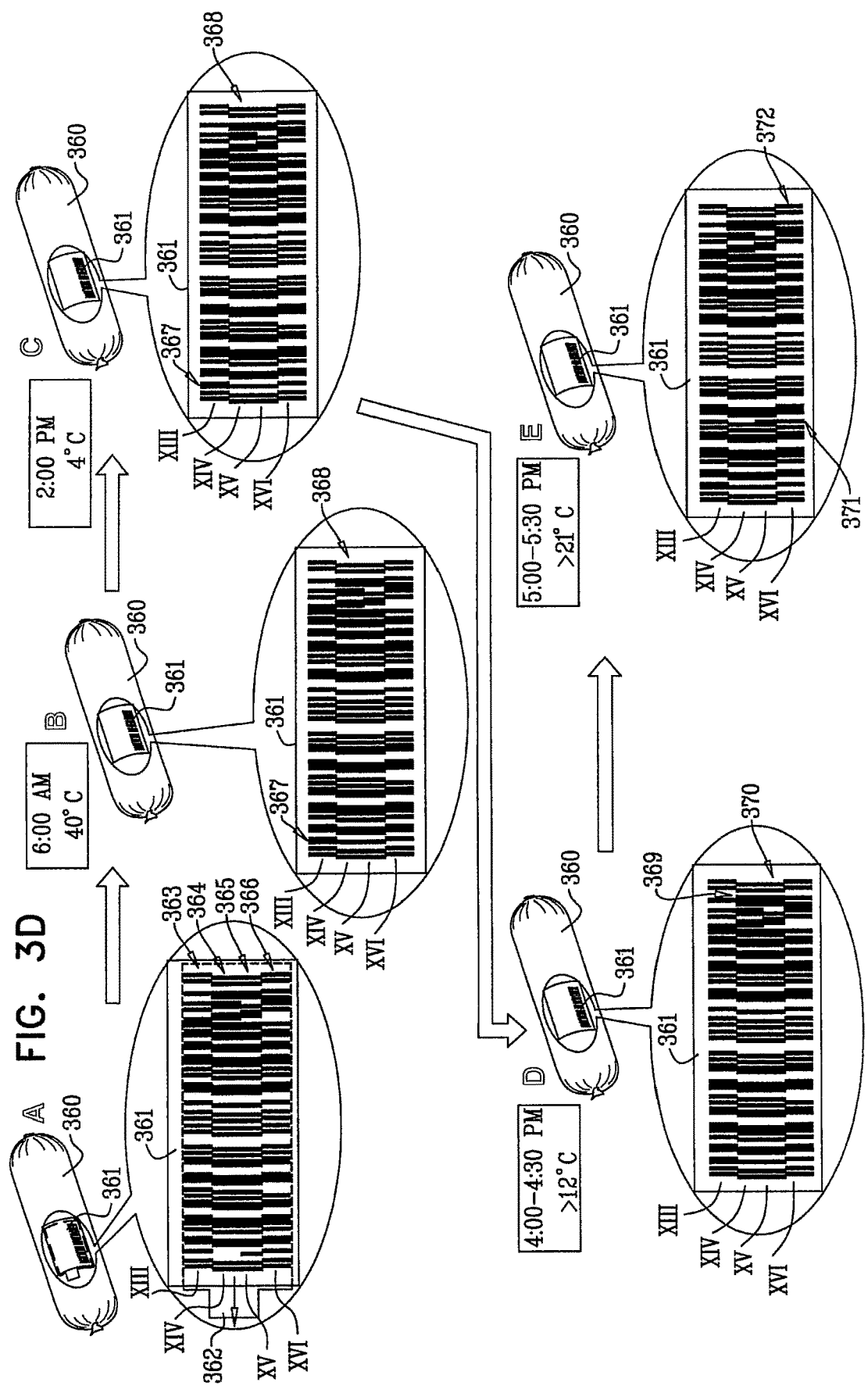
FIG. 3D is a simplified illustration of a quality indicator constructed and operative in accordance with another preferred embodiment of the present invention for indicating elapsed time in temperature history with delayed activation.

FIG. 3D illustrates a package of meat 360 including a combination elapsed time in temperature indicator 361 constructed and operative in accordance with a preferred embodiment of the present invention of the type described hereinabove with reference to FIGS. 2A-2C. The quality indicator 361 is typically constructed to be actuatable by pulling a pull strip 362 forming part thereof.

As illustrated in FIG. 3D, indicator 361 includes barcodes XIII, XIV, XV and XVI, which are preferably different from each other and arranged in a stacked arrangement. Barcodes XIII, XIV, XV and XVI are in visible states 363, 364, 365 and 366, respectively. Before actuation, barcode XIII in visible state 363 is typically readable by a conventional barcode reader as 7290003804108, and barcodes XIV, XV and XVI in the respective visible states 364, 365 and 366 are preferably not readable by a barcode reader. Thus, the indicator 361 in its first visible state presents a single machine-readable barcode typically readable by a conventional barcode reader as 7290003804108, as indicated by designator A.

Following actuation, the colorable common area indicated by reference numeral 367 becomes colored, thereby causing barcode XIII to become unreadable and barcode XIV to assume a further visible state 368, typically readable by a conventional barcode reader as 7290003804122. Barcodes XV and XVI remain unreadable and the indicator 361 in its second visible state presents a single machine-readable barcode typically readable by a conventional barcode reader as 7290003804122.

The quality indicator 361 preferably remains in the second visible state prior to activation, for at least a predetermined time following actuation, typically 8 hours, irrespective of the temperature of the quality indicator 361 as indicated by designators B and C.

Upon activation, once the temperature of the package 360 is more than the predetermined temperature, for example 12 degrees Celsius, for at least a predetermined cumulative amount of time, for example, 30 minutes, the colorable common area indicated by reference numeral 369 becomes colored, thereby causing barcode XIV to become unreadable and barcode XV to assume a further visible state 370, typically readable by a conventional barcode reader as 7290003804115. Barcodes XIII and XVI remain unreadable and the indicator 361 presents a single machine-readable barcode typically readable by a conventional barcode reader as 7290003804115, as indicated by designator D.

If the temperature of the package 360 exceeds a second predetermined temperature, for example 21 degrees Celsius, for at least predetermined amount of time, for example thirty minutes, the colorable common area indicated by reference numeral 371 becomes colored, thereby causing barcode XV to become unreadable and barcode XVI to assume a further visible state 372, typically readable by a conventional barcode reader as 7290003804139. Barcodes XIII and XIV remain unreadable and the indicator 361 presents a single machine-readable barcode typically readable by a conventional barcode reader as 7290003804139, as indicated by designator E.

It is appreciated that instead of using a separate barcode for indicating different events, one or more barcodes may each be used for indicating multiple events. For example, if the addition of a first barcode bar causes a barcode in a first machine-readable state to assume an unreadable state and the addition of a second barcode bar causes the same barcode in the unreadable state to assume a second machine-readable state then the first machine-readable state may be used for indicating one event and the second machine-readable state may be used for indicating a different event.

Reference is now made to FIGS. 4A-7G, which, respectively, are simplified illustrations of the structure and operation of examples of the quality indicators of FIGS. 3A-3D constructed and operative in accordance with a preferred embodiment of the present invention for indicating the exceedance of a combination of temperature history and elapsed time.

Figure 4A:
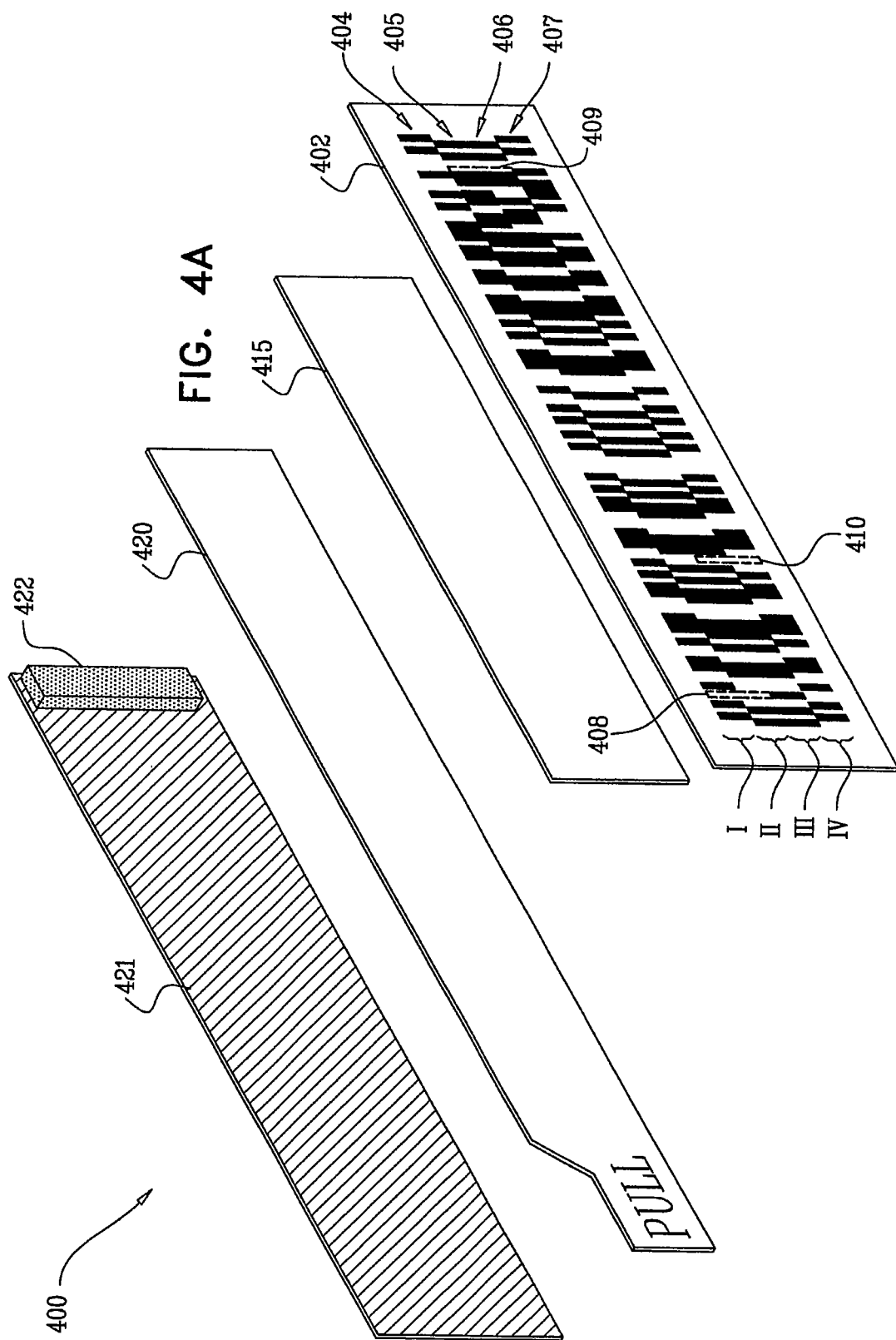

Reference is now made to FIGS. 4A-4E, which together are a simplified illustration of the construction and operation of one embodiment of the quality indicator 301 of FIG. 3A for indicating a combination of time and temperature. As seen in FIG. 4A, the quality indicator, here designated by reference numeral 400, preferably includes a barcode defining layer 402, which is preferably printed on a transparent substrate. The printing on the transparent substrate preferably defines a background area, which is preferably printed with black ink and overprinted with white ink, a plurality of bars forming part of barcodes I, II, III and IV corresponding to barcodes I, II, III and IV of FIG. 3A in visible states 404, 405, 406 and 407, respectively, which are preferably printed with black ink, and a plurality of transparent areas 408, 409 and 410 forming part of the barcodes, which are preferably printed with light blue ink, such as Pantone No. 645, which has a visual appearance similar to that of the black ink overprinted with white ink. Alternatively, the background area and the barcode are printed in such colors as to define high contrast therebetween.

The transparent areas described in FIGS. 4-7 correspond to the colorable common areas described above with reference to FIGS. 1-3.

For the purposes of the present specification and claims, the term "transparent area" is defined so as to include within its scope areas that are either transparent or translucent.

The barcodes I, II, III and IV are preferably arranged in a stacked arrangement. Preferably, each of the transparent areas 408, 409 and 410 forms part of two barcodes. Accordingly, the transparent area 408 forms part of barcodes I and II, the transparent area 409 forms part of barcodes II and III and the transparent area 410 forms part of barcodes III and IV. The transparent areas preferably have the same width as a single barcode bar. Alternatively, the width of any of the transparent areas 408, 409 and 410 is different from the width of a single barcode bar. Additionally, the width of the portion of a transparent area which forms part of one barcode may be different from the width of the portion of the same transparent area which forms part of the other barcode.

Before actuation, the barcode I in the visible state 404 is machine-readable in this embodiment and is typically readable by a barcode reader as 7290003804108 and the visible states 405, 406 and 407 of the respective barcodes II, III and IV are not readable by a barcode reader. The indicator 400 therefore presents a single machine-readable barcode typically readable by a barcode reader as 7290003804108.

Disposed behind the barcode defining layer 402 and preferably adhered thereto is a colorable element 415, such as Whatman No. 3 filter paper commercially available from Whatman International [CAT #: 1003917], which until colored is normally white. The colorable element 415 preferably extends behind the transparent areas 409 and 410 but not behind the transparent area 408. Disposed behind the barcode defining layer 402 and behind the colorable element 415 is a pull strip 420, corresponding to the pull strip 302 in FIG. 3A. The pull strip 420 is preferably white and prevents the passage therethrough of coloring agents employed in this embodiment of the invention. Alternatively, the pull strip is transparent. Preferably, the pull strip 420 is formed of polyester, for example Melinex®401, commercially available from DuPont of Wilmington, Del., and is preferably 75 micrometers thick.

Disposed behind the pull strip 420 is a back layer 421 which is preferably black. Preferably adhered to the back layer 421 rearwardly of the colorable element 415 but not rearwardly of the transparent areas 409 and 410 is a temperature responsive coloring element 422, such as a pad, for example, K-R; 210/34/28, commercially available from Noam-Urim of Kibbutz Urim, Israel, impregnated with a coloring agent, such as Sudan Black, a black color dye [CAS: 4197-25-5], dissolved at a ratio of 1 gram per 1 kg in Coconut oil [CAS: 8001-31-8]. 21 degrees Until such time as the pull strip 420 is removed, the quality indicator 400 is nonresponsive to temperature changes.

Figure 4B:
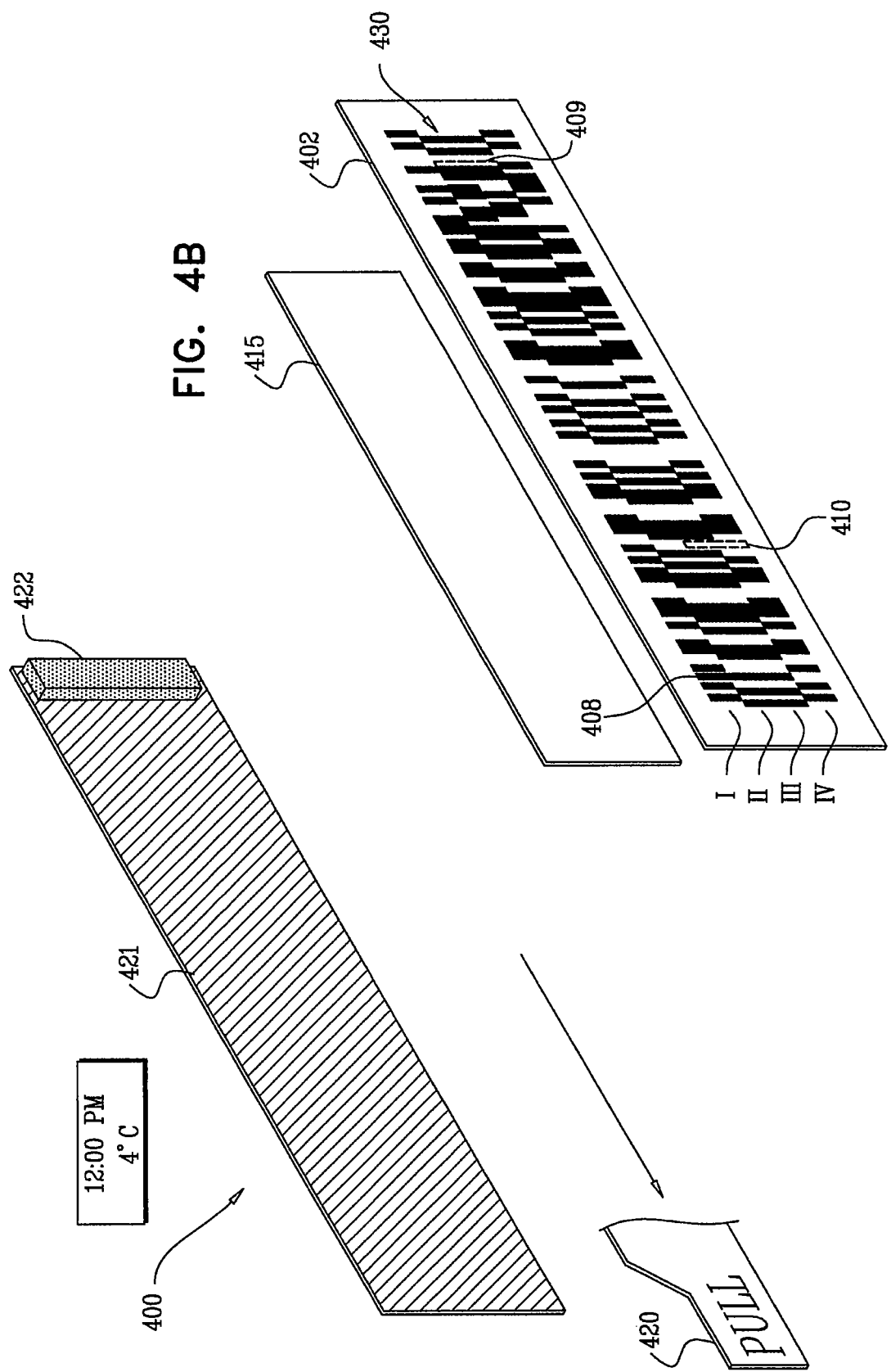

Turning to FIG. 4B, once the pull strip 420 is removed, the quality indicator 400 becomes responsive to temperature changes. As long as the temperature at the quality indicator does not exceed a predetermined temperature, for example 21 degrees Celsius, for at least a predetermined cumulative amount of time, typically ten minutes, the portions of the black back layer 421 which are visible through the transparent area 408 appear similar to the bars of barcodes I and II in the respective visible states 404 and 405. The portion of the back layer 421 which is visible through the part of the transparent area 408 forming part of barcode I renders barcode I unreadable by a conventional barcode reader. The portion of the back layer 421 which is visible through the part of the transparent area 408 forming part of barcode II in the visible state 405 can be read together therewith as a single barcode in a visible state 430, typically readable by a barcode reader as 7290003804122. Barcodes III and IV remain unreadable and the indicator 400 therefore presents a single machine-readable barcode typically readable by a barcode reader as 7290003804122.

Turning to FIG. 4C, when the pull strip 420 has been removed and when the temperature at the quality indicator exceeds 21 degrees Celsius, such as when the temperature reaches 25 degrees Celsius, the coloring agent in the coloring element 422 begins to melt and be released from the coloring element 422 and begins to diffuse through the colorable element 415.

It is appreciated that if the temperature thereafter drops below 21 degrees Celsius the coloring agent continues to diffuse through the colorable element 415. If, after the temperature reaches 21 degrees Celsius, the temperature drops below 17 degrees Celsius, then the coloring agent becomes solid and diffusion thereof through the colorable element 415 is suspended until the temperature again reaches 21 degrees Celsius.

It is also appreciated that the elapsed time from the start of diffusion of the coloring agent from the coloring element 422 along the colorable element 415 until portions of the colorable element 415 which are visible through the transparent areas 409 and 410 start to become colored is defined, for example, by the length of the colorable element 415 between the area in front of coloring element 422 and the area underlying the transparent areas 409 and 410. Additionally, this elapsed time is a function of the material from which the colorable element 415 is made and the thickness thereof.

Accordingly, in the illustrated embodiment, the coloring element 422 is positioned such that the elapsed time from the start of diffusion of the coloring agent along the colorable element 415 until portions of the colorable element 415 are visible through the transparent areas 409 and 410 is ten minutes and one hour, respectively.

As seen in FIG. 4D, when the temperature is at least 21 degrees Celsius for at least a predetermined cumulative amount of time, such as 25 degrees Celsius for ten minutes, the coloring agent diffuses through the colorable element 415, such that the portions of the colorable element 415 which are visible through the transparent area 409 become colored and appear similar to the bars of barcode II in the visible state 430 and to the bars of barcode III in the visible state 406. The colored portion of the transparent area 409, which forms part of barcode II, renders barcode II unreadable. The colored portion of the transparent area 409 which forms part of barcode III in the visible state 406 can be read together therewith as a single barcode in the visible state 431, which is typically readable by a barcode reader as 7290003804115. Barcodes I and IV remain unreadable and the indicator 400 thus presents a single machine-readable barcode typically readable by a barcode reader as 7290003804115.

It is appreciated that the portion of the transparent area 409 which forms part of barcode II may be wider than the portion of the transparent area 409 forms part of barcode III. Accordingly, if the temperature is at least 21 degrees Celsius for an additional amount of time, the portion of the transparent area 409 which forms part of barcode II continues to be colored thereby ensuring the unreadability of barcode II.

Figure 4E:
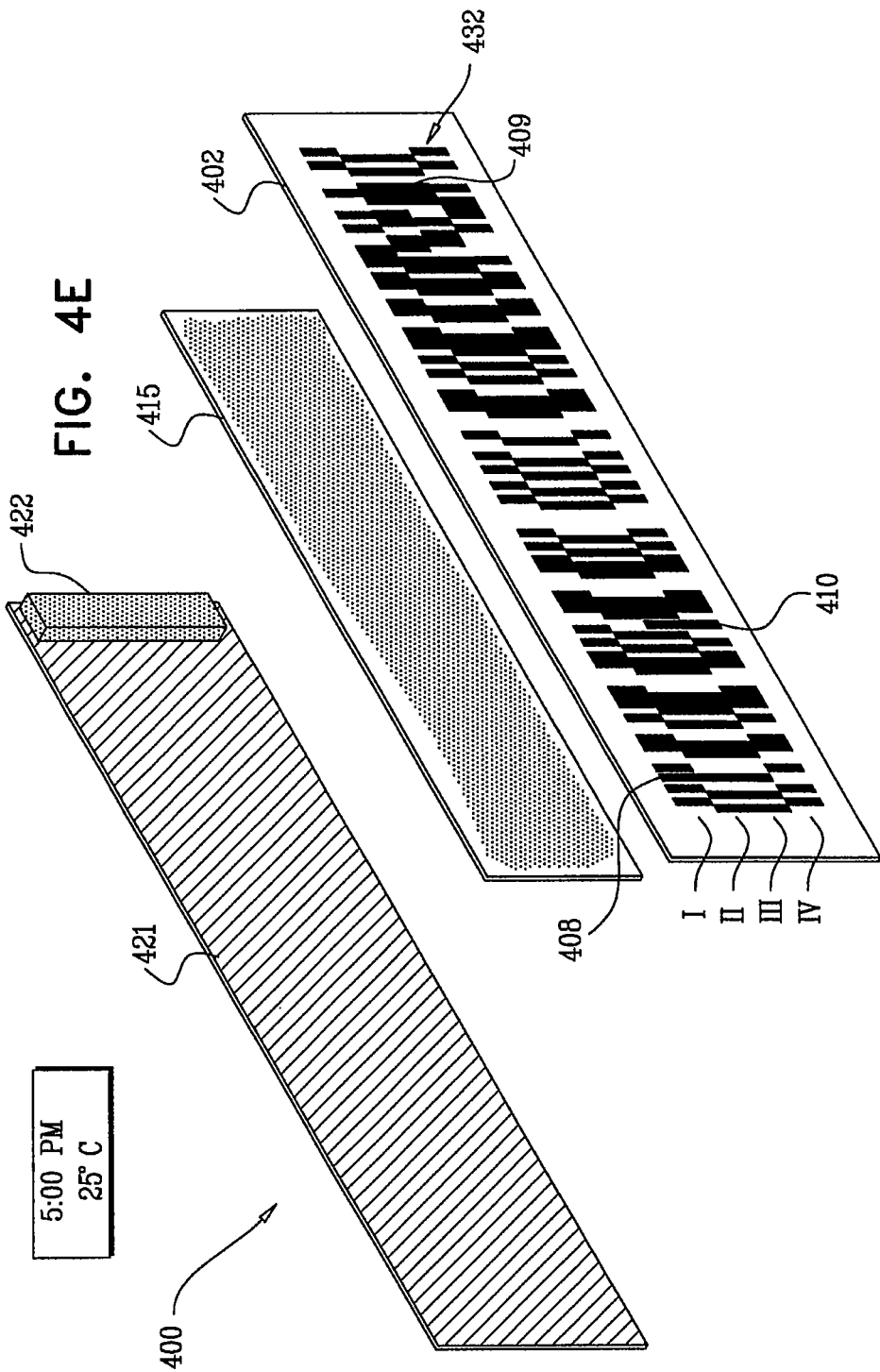

Turning now to FIG. 4E, following the elapse of an additional amount of time at a temperature of at least 21 degrees Celsius, for example 50 additional minutes at 25 degrees Celsius, the coloring agent continues to diffuse through the colorable element 415, such that the portions of the colorable element 415 which are visible through the transparent area 410 become colored and appear similar to the bars of barcode III in the visible state 431 and to the bars of the barcode IV in the visible state 407. The colored portion of the transparent area 410 which forms part of barcode III renders barcode III unreadable. The colored portion of the transparent area 410 which forms part of barcode IV in the visible state 407 can be read together therewith as a single barcode in the visible state 432, which is typically readable by a barcode reader as 7290003804139. Barcodes I and II remain unreadable and the indicator 400 therefore presents a single machine-readable barcode typically readable by a barcode reader as 7290003804139.

It is appreciated that the portion of the transparent area 410 which forms part of barcode III may be wider than the portion of the transparent area 410 which forms part of barcode IV. Accordingly, if the temperature is at least 21 degrees Celsius for an additional amount of time, the portion of the transparent area 410 which forms part of barcode III continues to be colored thereby ensuring the unreadability of barcode III.

Figure 5D:
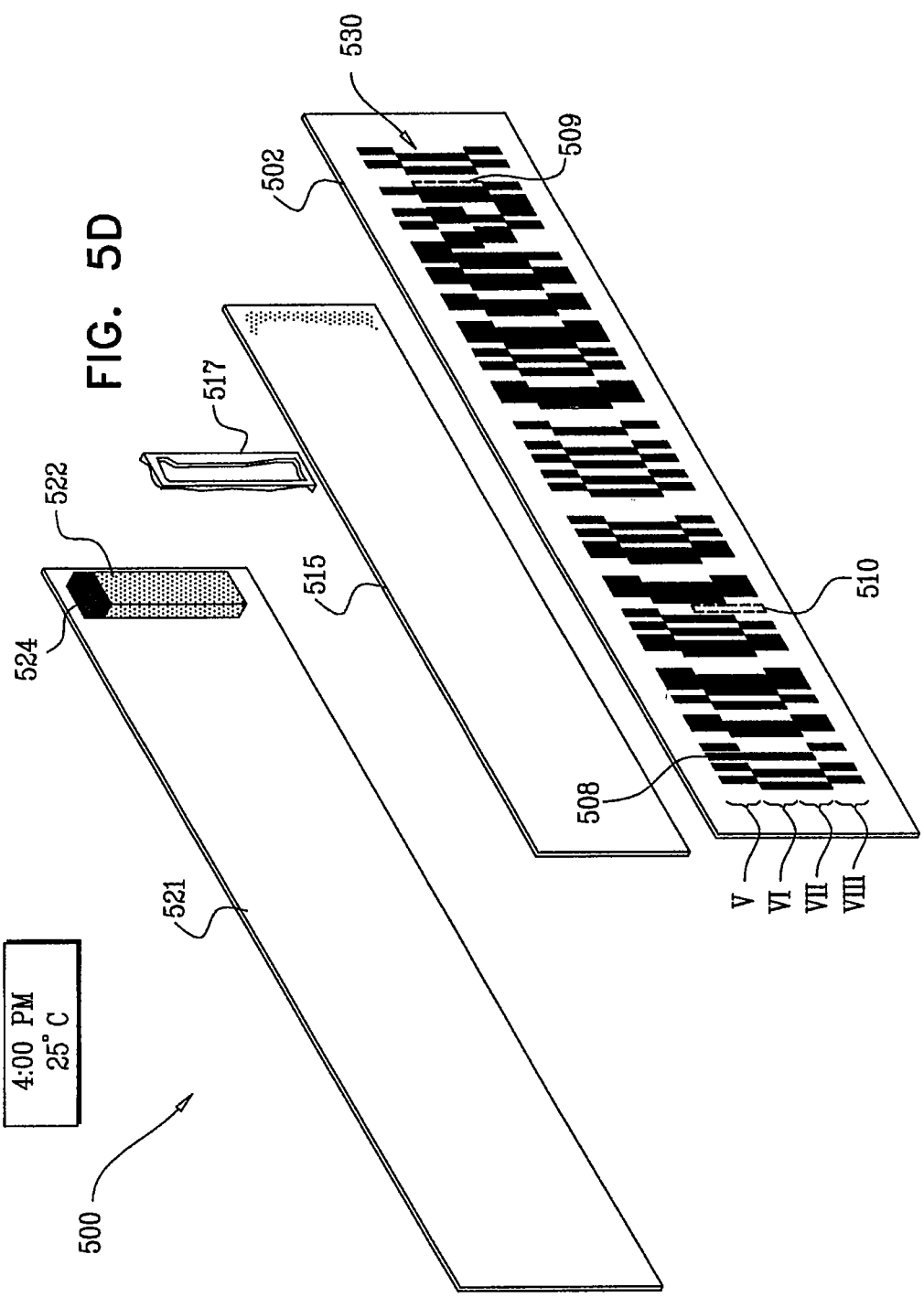

Reference is now made to FIGS. 5A-5F, which together are a simplified illustration of the construction and operation of one embodiment of the quality indicator 321 of FIG. 3B for indicating a combination of time and temperature. As seen in FIG. 5A, the quality indicator, here designated by reference numeral 500, preferably includes a barcode defining layer 502, which is preferably printed on a transparent substrate. The printing on the transparent substrate preferably defines a background area, which is preferably printed with black ink and overprinted with white ink, a plurality of bars forming part of barcodes V, VI, VII and VIII corresponding to barcodes V, VI, VII and VIII of FIG. 3B in visible states 504, 505, 506 and 507, respectively, which are preferably printed with black ink, and a plurality of transparent areas 508, 509 and 510 forming part of the barcodes, which are preferably printed with light blue ink, such as Panton No. 645, which has a visual appearance similar to that of the black ink overprinted with white ink. Alternatively, the background area and the barcode are printed in such colors as to define high contrast therebetween.

The barcodes V, VI, VII and VIII are preferably arranged in a stacked arrangement. Preferably, each of the transparent areas 508, 509 and 510 forms part of two barcodes. Accordingly, the transparent area 508 forms part of barcodes V and VI, the transparent area 509 forms part of barcodes VI and VII and the transparent area 510 forms part of barcodes VII and VIII. The transparent areas preferably have the same width as a single barcode bar. Alternatively, the width of any of the transparent areas 508, 509 and 510 is different from the width of a single barcode bar. Additionally, the width of the portion of a transparent area which forms part of one barcode may be different from the width of the portion of the same transparent area which forms part of the other barcode.

Before actuation, the barcode V in the visible state 504 is machine-readable in this embodiment and is typically readable by a barcode reader as 7290003804108 and the visible states 505, 506 and 507 of the respective barcodes VI, VII and VIII are not readable by a barcode reader. Thus, the indicator 500, in its first visible state, presents a single machine-readable barcode typically readable by a barcode reader as 7290003804108.

Disposed behind the barcode defining layer 502 and preferably adhered thereto is a colorable element 515, such as Whatman No. 3 filter paper commercially available from Whatman International [CAT #: 1003917], which until colored is normally white. The colorable element 515 preferably extends behind the transparent areas 509 and 510 but not behind the transparent area 508.

Disposed behind the barcode defining layer 502 and behind the colorable element 515 and preferably adhered thereto is a dissolvable activation delay layer 517 formed, for example from Ethyl Cellulose [CAS #: 9004-57-3]. The activation delay layer 517 is dissolvable by a suitable solvent, as described hereinbelow, and until dissolved prevents the passage therethrough of coloring agents employed in this embodiment of the present invention.

It is appreciated that the dissolvable activation delay layers 517 may provide selectable and possibly different delay durations over any suitable range of durations which may extend from effectively zero to any suitable maximum. Such selectability may be effected, for example, by varying thickness, material, coatings and/or structure.

Disposed behind the activation delay layer 517, the barcode defining layer 502 and the colorable element 515 is a pull strip 520, corresponding to the pull strip 322 in FIG. 3B. The pull strip 520 is preferably white and prevents the passage therethrough of coloring agents employed in this embodiment of the invention. Alternatively, the pull strip is transparent. Preferably, the pull strip 520 is formed of polyester, for example Melinex®401, commercially available from DuPont of Wilmington, Del., and is preferably 75 micrometers thick.

Disposed behind the pull strip 520 is a back layer 521 which is preferably black. Preferably adhered to the back layer 521 rearwardly of the colorable element 515 and of the activation delay layer 517 but not rearwardly of the transparent areas 509 and 510 is a temperature responsive coloring element 522, such as a pad, for example, K-R; 210/34/28, commercially available from Noam-Urim of Kibbutz Urim, Israel, impregnated with a coloring agent, such as Sudan Black, a black color dye [CAS: 4197-25-5], dissolved at a ratio of 1 gram per 1 kg in Coconut oil [CAS: 8001-31-8]. 21 degrees Adjacent the coloring element 522 or combined therewith is a solvent 524, such as Methyl laurate [CAS #: 111-82-0] which, as noted above, is operative to dissolve the dissolvable activation delay layer 517, preferably after a predetermined period of time, which is preferably measured in hours, such as eight hours. The solvent 524 may be temperature-responsive.

Until such time as the pull strip 720 is removed, the quality indicator 700 is nonresponsive to temperature changes.

Turning now to FIG. 5B, once the pull strip 520 is removed, the solvent 524 begins to dissolve the dissolvable activation delay layer 517. Prior to the dissolvable activation delay layer 517 becoming permeable to the coloring agent in the temperature responsive coloring element 522, the quality indicator 500 does not provide a readable indication responsive to temperature changes and the portions of the black back layer 521 which are visible through the transparent area 508 appear similar to the bars of barcodes V and VI in the respective visible states 504 and 505. The portion of the back layer 521 which is visible through the part of the transparent area 508 forming part of barcode V renders barcode V unreadable by a conventional barcode reader. The portion of the back layer 521 which is visible through the part of the transparent area 508 forming part of barcode VI in the visible state 505 can be read together therewith as a single barcode in a visible state 530, typically readable by a barcode reader as 7290003804122. Barcodes VII and VIII remain unreadable and the indicator 500 in its second visible state presents a single machine-readable barcode typically readable by a barcode reader as 7290003804122.

It is appreciated that the time needed to achieve dissolution of dissolvable activation delay layer 517 may be determined for example by the thickness thereof.

Turning now to FIG. 5C, once the dissolvable activation delay layer 517 becomes permeable to the coloring agent in the temperature responsive coloring element 522, typically after 8 hours, the quality indicator 500 becomes responsive to temperature changes. As long as the temperature at the quality indicator does not reach a predetermined temperature for example 21 degrees Celsius, for at least a predetermined cumulative amount of time for example for ten minutes, the quality indicator remains in the second visible state.

Turning to FIG. 5D, after the dissolution of the activation delay layer 517, when the temperature at the quality indicator exceeds 21 degrees Celsius, such as when the temperature reaches 25 degrees Celsius, the coloring agent in the coloring element 522 begins to melt and be released from the coloring element 522 and begins to diffuse through the colorable element 515.

It is appreciated that if the temperature thereafter drops below 21 degrees Celsius the coloring agent continues to diffuse through the colorable element 515. If, after the temperature reaches 21 degrees Celsius, the temperature drops below 17 degrees Celsius, then the coloring agent becomes solid and diffusion thereof through the colorable element 515 is suspended until the temperature again reaches 21 degrees Celsius.

It is also appreciated that the elapsed time from the start of diffusion of the coloring agent from the coloring element 522 along the colorable element 515 until portions of the colorable element 515 which are visible through the transparent areas 509 and 510 start to become colored is defined, for example, by the length of the colorable element 515 between the area in front of coloring element 522 and the area underlying the transparent areas 509 and 510. Additionally, this elapsed time is a function of the material from which the colorable element 515 is made and the thickness thereof.

Accordingly, in the illustrated embodiment, the coloring element 522 is positioned such that the elapsed time from the start of diffusion of the coloring agent along the colorable element 515 until portions of the colorable element 515 are visible through the transparent areas 509 and 510 is ten minutes and one hour, respectively.

As seen in FIG. 5E, when the temperature is at least 21 degrees Celsius for at least a predetermined cumulative amount of time, such as 25 degrees Celsius for ten minutes, the coloring agent diffuses through the colorable element 515, such that the portions of the colorable element 515 which are visible through the transparent area 509 become colored and appear similar to the bars of barcode VI in the visible state 530 and to the bars of barcode VII in the visible state 506. The colored portion of the transparent area 509 which forms part of barcode VI, renders barcode VI unreadable. The colored portion of the transparent area 509 which forms part of barcode VII in the visible state 506 can be read together therewith as a single barcode in the visible state 531, which is typically readable by a barcode reader as 7290003804115. Barcodes V and VIII remain unreadable and the indicator 500 thus presents a single machine-readable barcode typically readable by a barcode reader as 7290003804115.

It is appreciated that the portion of the transparent area 509 which forms part of barcode VI may be wider than the portion of the transparent area 509 which forms part of barcode VII. Accordingly, if the temperature is at least 21 degrees Celsius for an additional amount of time, the portion of the transparent area 509 which forms part of barcode VI continues to be colored thereby ensuring the unreadability of barcode VI.

Turning now to FIG. 5F, following the elapse of an additional amount of time at a temperature of at least 21 degrees Celsius, for example 50 additional minutes at 25 degrees Celsius, the coloring agent continues to diffuse through the colorable element 515, such that the portions of the colorable element 515 which are visible through the transparent area 510 become colored and appear similar to the bars of barcode VII in the visible state 531 and to the bars of the barcode VIII in the visible state 507. The colored portion of the transparent area 510 which forms part of barcode VII renders barcode VII unreadable. The colored portion of the transparent area 510 which forms part of barcode VIII in the visible state 507 can be read together therewith as a single barcode in the visible state 532, which is typically readable by a barcode reader as 7290003804139. Barcodes V and VI remain unreadable and the indicator 500 therefore presents a single machine-readable barcode typically readable by a barcode reader as 7290003804139.

It is appreciated that the portion of the transparent area 510 which forms part of barcode VII may be wider than the portion of the transparent area 510 which forms part of barcode VIII. Accordingly, if the temperature is at least 21 degrees Celsius for an additional amount of time, the portion of the transparent area 510 which forms part of barcode VII continues to be colored thereby ensuring the unreadability of barcode VII.

Figure 6A:
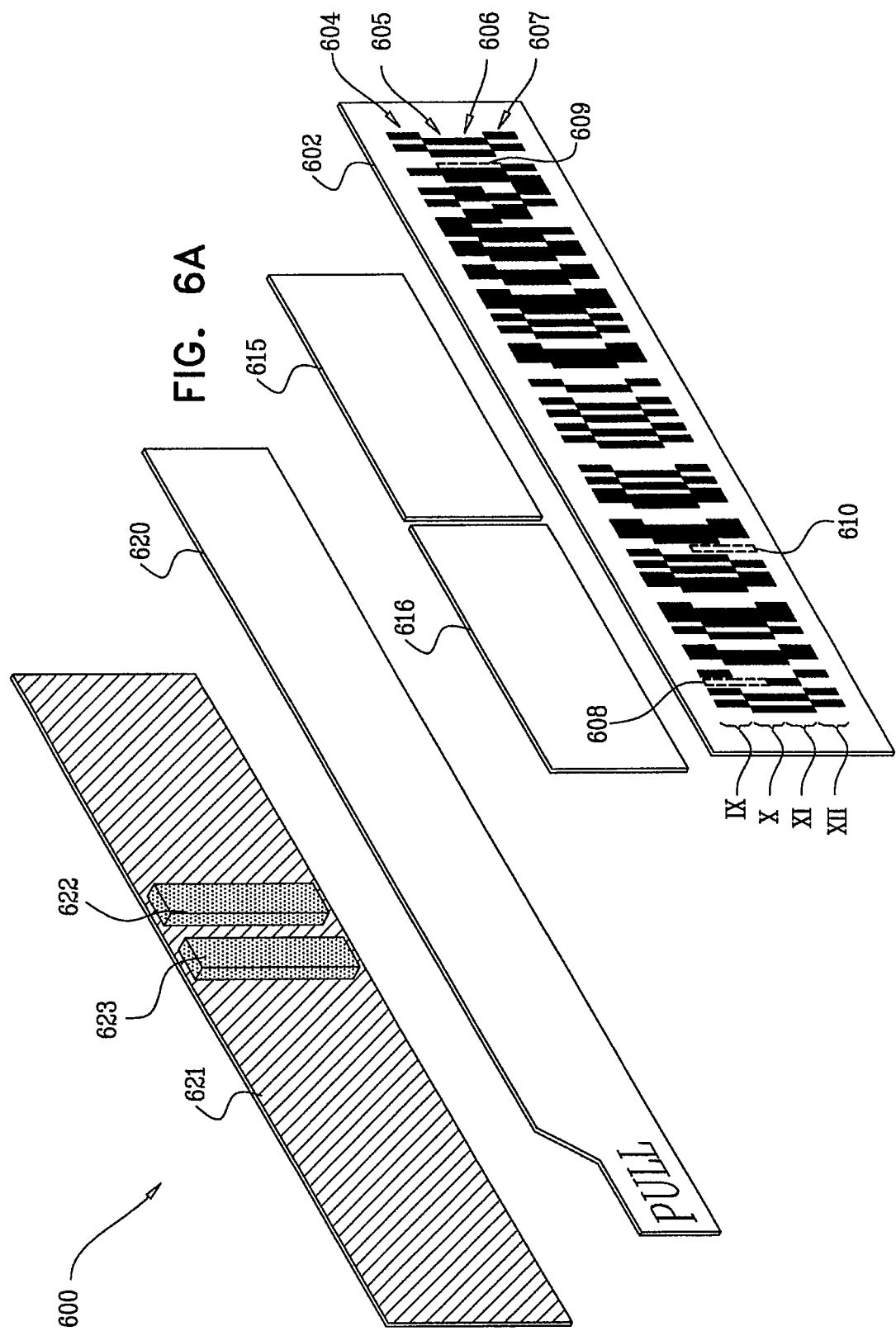

Reference is now made to FIGS. 6A-6F, which together are a simplified illustration of the construction and operation of one embodiment of the quality indicator 341 of FIG. 3C for indicating the exceedance of a combination of time and temperature. As seen in FIG. 6A, the quality indicator, here designated by reference numeral 600, preferably includes a barcode defining layer 602, which is preferably printed on a transparent substrate. The printing on the transparent substrate preferably defines a background area, which is preferably printed with black ink overprinted with white ink, a plurality of bars forming part of barcodes IX, X, XI and XII corresponding to barcodes IX, X, XI and XII of FIG. 3C in visible states 604, 605, 606 and 607, respectively, which are preferably printed with black ink, and a plurality of transparent areas 608, 609 and 610 forming part of the barcodes, which are preferably printed with light blue ink, such as Panton No. 645, which has a visual appearance similar to that of the black ink overprinted with white ink. Alternatively, the background area and the barcode are printed in such colors as to define high contrast therebetween.

The barcodes IX, X, XI and XII are preferably arranged in a stacked arrangement. Preferably, each of the transparent areas 608, 609 and 610 forms part of two barcodes. Accordingly, the transparent area 608 forms part of barcodes IX and X, the transparent area 609 forms part of barcodes X and XI and the transparent area 610 forms part of barcodes XI and XII. The transparent areas preferably have the same width as a single barcode bar. Alternatively, the width of any of the transparent areas 608, 609 and 610 is different from the width of a single barcode bar. Additionally, the width of the portion of a transparent area which forms part of one barcode may be different from the width of the portion of the same transparent area which forms part of the other barcode.

Before actuation, the barcode in the visible state 604 of barcode IX is machine-readable in this embodiment and is typically readable by a barcode reader as 7290003804108 and the visible states 605, 606 and 607 of the respective barcodes X, XI and XII are not readable by a barcode reader. The indicator 600 therefore presents a single machine-readable barcode typically readable by a barcode reader as 7290003804108.

Disposed behind the barcode defining layer 602 and preferably adhered thereto is a colorable element 615, such as Whatman No. 3 filter paper commercially available from Whatman International [CAT #: 1003917], which until colored is normally white. The colorable element 615 preferably extends behind the transparent area 609 but not behind the transparent areas 608 and 610. Also disposed behind the barcode defining layer 602 and preferably adhered thereto is a colorable element 616, such as Whatman No. 3 filter paper commercially available from Whatman International [CAT #: 1003917], which until colored is normally white. The colorable element 616 is preferably adjacent the colorable element 615 and preferably extends behind the transparent area 610 but not behind the transparent areas 608 and 609. Disposed behind the barcode defining layer 602 and behind the colorable elements 615 and 616 is a pull strip 620, corresponding to the pull strip 342 in FIG. 3C. The pull strip 620 is preferably white and prevents the passage therethrough of coloring agents employed in this embodiment of the invention. Alternatively, the pull strip is transparent. Preferably, the pull strip 620 is formed of polyester, for example Melinex®401, commercially available from DuPont of Wilmington, Del., and is preferably 75 micrometers thick.

Disposed behind the pull strip 620 is a back layer 621 which is preferably black. Preferably adhered to back layer 621 rearwardly of colorable element 615 but not rearwardly of transparent area 609 is a temperature responsive coloring element 622, such as a pad, for example, K-R; 210/34/28, commercially available from Noam-Urim of Kibbutz Urim, Israel, impregnated with a coloring agent, such as Sudan Black, a black color dye [CAS: 4197-25-5], dissolved at a ratio of 1 gram per 1 kg in a solution of 74.25% Coconut oil [CAS: 8001-31-8], 24.75% Oleic acid [CAS: 112-80-1] and 1% Hexanoic acid [CAS: 142-62-1]. 12 degrees. Also preferably adhered to the back layer 621 rearwardly of colorable element 616 but not rearwardly of transparent area 610 and preferably adjacent coloring element 622 is a temperature responsive coloring element 623, such as a pad, for example, K-R; 210/34/28, commercially available from Noam-Urim of Kibbutz Urim, Israel, impregnated with a coloring agent, such as Sudan Black, a black color dye [CAS: 4197-25-5], dissolved at a ratio of 1 gram per 1 kg in Coconut oil [CAS: 8001-31-8]. 21 degrees Until such time as the pull strip 620 is removed, the quality indicator 600 is nonresponsive to temperature changes.

Turning to FIG. 6B, once the pull strip 620 is removed, the quality indicator 600 becomes responsive to temperature changes. As long as the temperature at the quality indicator does not exceed a predetermined temperature, for example 12 degrees Celsius, for at least a predetermined cumulative amount of time, typically thirty minutes, the portions of the black back layer 621 which are visible through the transparent area 608 appear similar to the bars of barcodes IX and X in the respective visible states 604 and 605. The portion of the back layer 621 which is visible through the part of the transparent area 608 forming part of barcode IX in visible state 604 renders barcode IX unreadable by a conventional barcode reader. The portion of the back layer 621 which is visible through the part of the transparent area 608 forming part of barcode X in the visible state 605 can be read together therewith as a single barcode in a visible state 630, typically readable by a barcode reader as 7290003804122. Barcodes XI and XII remain unreadable and the indicator 600 therefore presents a single machine-readable barcode typically readable by a barcode reader as 7290003804122.

Turning to FIG. 6C, when the pull strip 620 has been removed and when the temperature at the quality indicator exceeds 12 degrees Celsius, the coloring agent in the coloring element 622 begins to melt and be released from the coloring element 622 and begins to diffuse through the colorable element 615.

It is appreciated that if the temperature thereafter drops below 12 degrees Celsius the coloring agent continues to diffuse through the colorable element 615. If, after the temperature reaches 12 degrees Celsius, the temperature drops below 7 degrees Celsius, the coloring agent becomes solid and diffusion thereof through the colorable element 615 is suspended until the temperature again reaches 12 degrees Celsius.

It is appreciated that the elapsed time from the start of diffusion of the coloring agent from the coloring elements 622 and 623 along the respective colorable elements 615 and 616 until portions of the colorable elements 615 and 616 which are visible through the respective transparent areas 609 and 610 start to become colored is defined for example by the lengths of the colorable elements 615 and 616 between the area in front of coloring elements 622 and 623 and the area underlying the transparent areas 609 and 610. Additionally, this elapsed time is a function of the material from which the colorable elements 615 and 616 are made and the thickness thereof.

Accordingly, in the illustrated embodiment, the coloring elements 622 and 623 are positioned between the transparent areas 609 and 610 such that the elapsed time from the start of diffusion of the coloring agents along the colorable elements 615 and 616 until portions of the colorable elements 615 and 616 are visible through the respective transparent areas 609 and 610 is thirty minutes.

As seen in FIG. 6D, when the temperature is at least 12 degrees Celsius for at least a predetermined cumulative amount of time, for example thirty minutes, the coloring agent diffuses through the colorable element 615, such that the portions of the colorable element 615 which are visible through the transparent area 609 become colored and appear similar to the bars of barcode X in the visible state 630 and to the bars of barcode XI in the visible state 606. The colored portion of the transparent area 609, which forms part of barcode X, renders barcode X unreadable. The colored portion of the transparent area 609, which forms part of barcode XI in the visible state 606, can be read together therewith as a single barcode in the visible state 631, which is typically readable by a barcode reader as 7290003804115. Barcodes IX and XII remain unreadable and the indicator 600 thus presents a single machine-readable barcode typically readable by a barcode reader as 7290003804115.

It is appreciated that the portion of the transparent area 609 which forms part of barcode X may be wider than the portion of the transparent area 609 which forms part of barcode XI. Accordingly, if the temperature is at least 12 degrees Celsius for an additional amount of time, the portion of the transparent area 609 which forms part of barcode X continues to be colored thereby ensuring the unreadability of barcode X.

Turning to FIG. 6E, when the temperature at the quality indicator exceeds 21 degrees Celsius, the coloring agent in the coloring element 623 begins to melt and be released from the coloring element 623 and begins to diffuse through the colorable element 616.

It is appreciated that if the temperature thereafter drops below 21 degrees Celsius the coloring agent continues to diffuse through the colorable element 616. If, after the temperature reaches 21 degrees Celsius, the temperature drops below 17 degrees Celsius, the coloring agent becomes solid and diffusion thereof through the colorable element 616 is suspended until the temperature again reaches 21 degrees Celsius.

As seen in FIG. 6F, when the temperature is at least 21 degrees Celsius for at least a predetermined cumulative amount of time, such as thirty minutes, the coloring agent diffuses through the colorable element 616, such that the portions of the colorable element 616 which are visible through the transparent area 610 become colored and appear similar to the bars of barcode XI in the visible state 631 and to the bars of barcode XII in the visible state 607. The colored portion of the transparent area 610, which forms part of barcode XI, renders barcode XI unreadable. The colored portion of the transparent area 609 which forms part of barcode XII in the visible state 607 can be read together therewith as a single barcode in the visible state 632, which is typically readable by a barcode reader as 7290003804139. Barcodes IX and X remain unreadable and the indicator 600 therefore presents a single machine-readable barcode typically readable by a barcode reader as 7290003804139

It is appreciated that the portion of the transparent area 610 which forms part of barcode XI may be wider than the portion of the transparent area 610 which forms part of barcode XII. Accordingly, if the temperature is at least 21 degrees Celsius for an additional amount of time, the portion of the transparent area 610 which forms part of barcode XI continues to be colored thereby ensuring the unreadability of barcode XI.

Figure 7A:
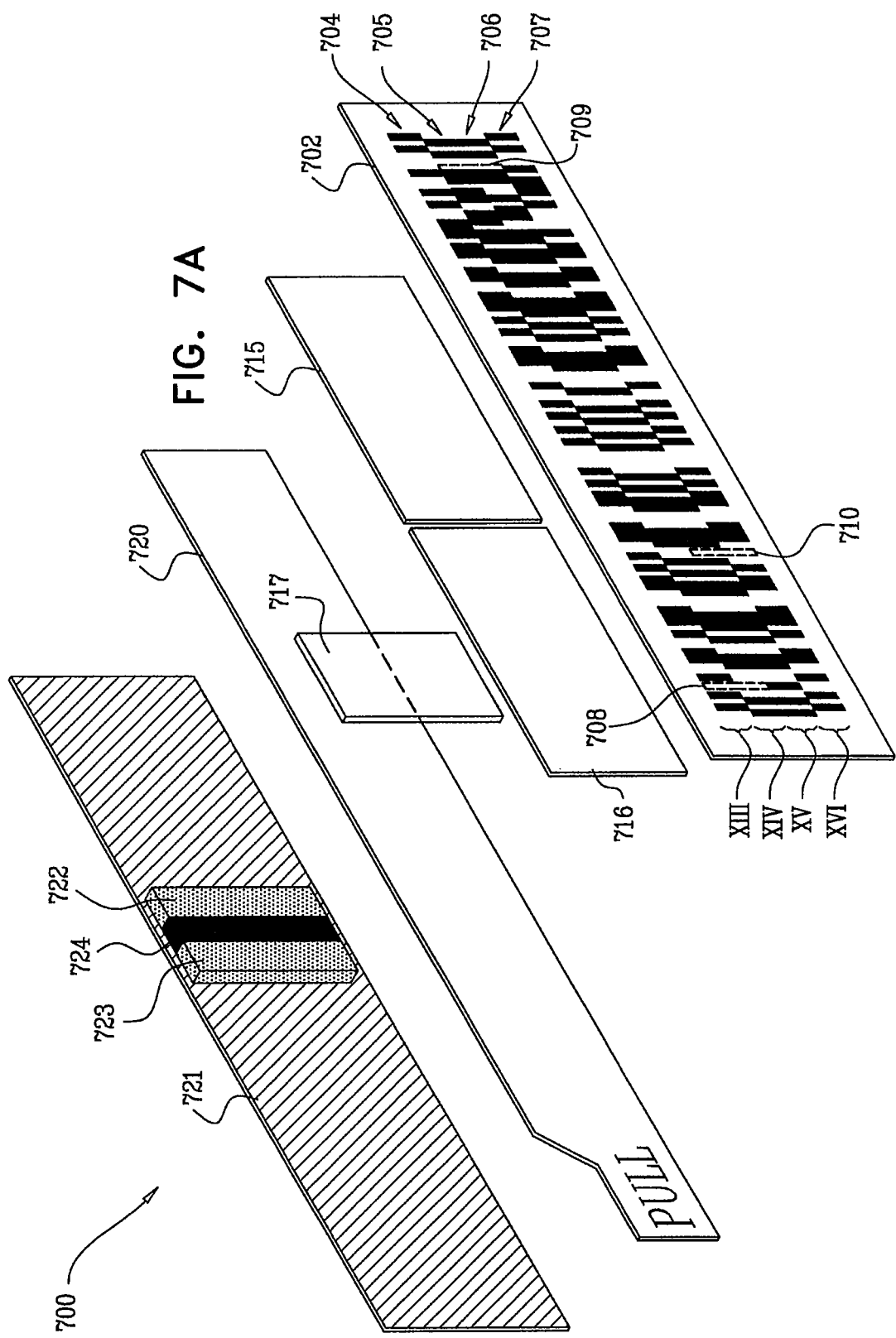

Reference is now made to FIGS. 7A-7G, which together are a simplified illustration of the construction and operation of one embodiment of the quality indicator 361 of FIG. 3D for indicating the exceedance of a combination of time and temperature. As seen in FIG. 7A, the quality indicator, here designated by reference numeral 700, preferably includes a barcode defining layer 702, which is preferably printed on a transparent substrate. The printing on the transparent substrate preferably defines a background area, which is preferably printed with black ink overprinted with white ink, a plurality of bars forming part of barcodes XIII, XIV, XV and XVI corresponding to barcodes XIII, XIV, XV and XVI of FIG. 3D in visible states 704, 705, 706 and 707, respectively, which are preferably printed with black ink, and a plurality of transparent areas 708, 709 and 710 forming part of the barcodes, which are preferably printed with light blue ink, such as Panton No. 645, which has a visual appearance similar to that of the black ink overprinted with white ink. Alternatively, the background area and the barcode are printed in such colors as to define high contrast therebetween.

The barcodes XIII, XIV, XV and XVI are preferably arranged in a stacked arrangement. Preferably, each of the transparent areas 708, 709 and 710 forms part of two barcodes. Accordingly, the transparent area 708 forms part of barcodes XIII and XIV, the transparent area 709 forms part of barcodes XIV and XV and the transparent area 710 forms part of barcodes XV and XVI. The transparent areas preferably have the same width as a single barcode bar. Alternatively, the width of any of the transparent areas 708, 709 and 710 is different from the width of a single barcode bar. Additionally, the width of the portion of a transparent area which forms part of one barcode may be different from the width of the portion of the same transparent area which forms part of the other barcode.

Before actuation, the barcode in the visible state 704 of barcode XIII is machine-readable in this embodiment and is typically readable by a barcode reader as 7290003804108 and the visible states 705, 706 and 707 of the respective barcodes XIV, XV and XVI are not readable by a barcode reader. Thus, the indicator 700 in its first visible state presents a single machine-readable barcode typically readable by a barcode reader as 7290003804108.

Disposed behind the barcode defining layer 702 and preferably adhered thereto is a colorable element 715, such as Whatman No. 3 filter paper commercially available from Whatman International [CAT #: 1003917], which until colored is normally white. The colorable element 715 preferably extends behind the transparent area 709 but not behind the transparent areas 708 and 710. Also disposed behind the barcode defining layer 702 and preferably adhered thereto is a colorable element 716, such as Whatman No. 3 filter paper commercially available from Whatman International [CAT #: 1003917], which until colored is normally white. The colorable element 716 is preferably adjacent the colorable element 715 and preferably extends behind the transparent area 710 but not behind the transparent areas 708 and 709.

Disposed behind the barcode defining layer 702 and behind the colorable elements 715 and 716 and preferably adhered thereto is a dissolvable activation delay layer 717 formed, for example from Ethyl Cellulose [CAS #: 9004-57-3]. The activation delay layer 717 is dissolvable by a suitable solvent, as described hereinbelow, and until dissolved prevents the passage therethrough of coloring agents employed in this embodiment of the present invention.

It is appreciated that the dissolvable activation delay layers 717 may provide selectable and possibly different delay durations over any suitable range of durations which may extend from effectively zero to any suitable maximum. Such selectability may be effected, for example, by varying thickness, material, coatings and/or structure.

Disposed behind the activation delay layer 717, the barcode defining layer 702 and the colorable elements 715 and 716 is a pull strip 720, corresponding to the pull strip 362 in FIG. 3D. The pull strip 720 is preferably white and prevents the passage therethrough of coloring agents employed in this embodiment of the invention. Alternatively, the pull strip is transparent. Preferably, the pull strip 720 is formed of polyester, for example Melinex®401, commercially available from DuPont of Wilmington, Del., and is preferably 75 micrometers thick.

Disposed behind the pull strip 720 is a back layer 721 which is preferably black. Preferably adhered to back layer 721 rearwardly of the colorable element 715 and of the activation delay layer 717 but not rearwardly of transparent area 709 is a temperature responsive coloring element 722, such as a pad, for example, K-R; 210/34/28, commercially available from Noam-Urim of Kibbutz Urim, Israel, impregnated with a coloring agent, such as Sudan Black, a black color dye [CAS: 4197-25-5], dissolved at a ratio of 1 gram per 1 kg in a solution of 74.25% Coconut oil [CAS: 8001-31-8], 24.75% Oleic acid [CAS: 112-80-1] and 1% Hexanoic acid [CAS: 142-62-1]. 12 degrees. Also preferably adhered to the back layer 721 rearwardly of the colorable element 716 and of the activation delay later 717 but not rearwardly of transparent area 710 and preferably adjacent coloring element 722 is a temperature responsive coloring element 723, such as a pad, for example, K-R; 210/34/28, commercially available from Noam-Urim of Kibbutz Urim, Israel, impregnated with a coloring agent, such as Sudan Black, a black color dye [CAS: 4197-25-5], dissolved at a ratio of 1 gram per 1 kg in Coconut oil [CAS: 8001-31-8]. 21 degrees Adjacent the coloring elements 722 and 723 or combined therewith is a solvent 724, such as Methyl laurate [CAS #: 111-82-0] which, as noted above, is operative to dissolve the dissolvable activation delay layer 717, preferably after a predetermined period of time, which is preferably measured in hours, such as eight hours. The solvent 724 may be temperature-responsive.

Until such time as the pull strip 720 is removed, the quality indicator 700 is nonresponsive to temperature changes.

Figure 7B:
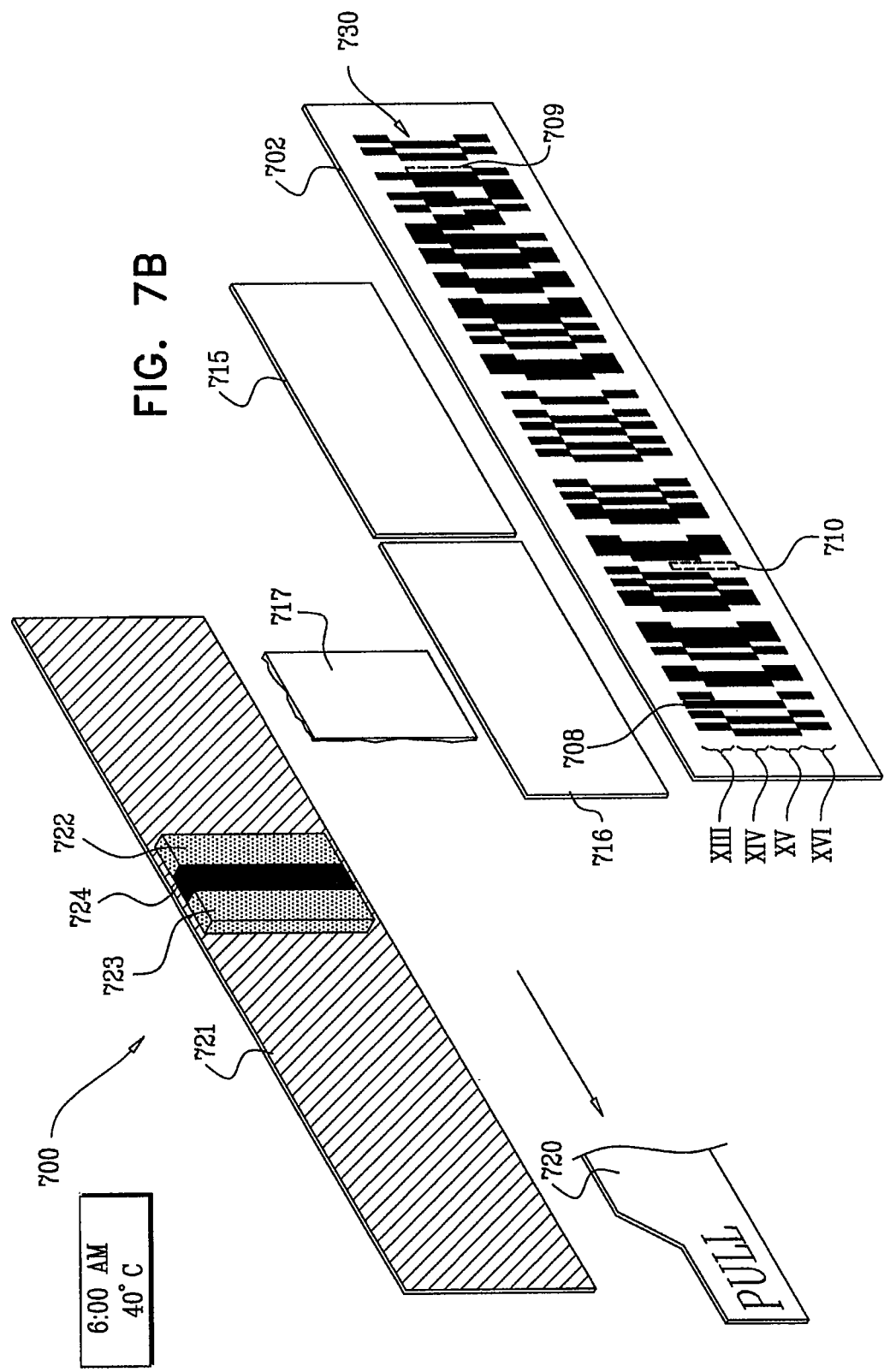

Turning now to FIG. 7B, once the pull strip 720 is removed, the solvent 724 begins to dissolve the dissolvable activation delay layer 717. Prior to the dissolvable activation delay layer 717 becoming permeable to the coloring agents in the temperature responsive coloring elements 722 and 723, the quality indicator 700 does not provide a readable indication responsive to temperature changes and the portions of the black back layer 721 which are visible through the transparent area 708 appear similar to the bars of barcodes XIII and XIV in the respective visible states 704 and 705. The portion of the back layer 721 which is visible through the part of the transparent area 708 forming part of barcode XIII renders barcode XIII unreadable by a conventional barcode reader. The portion of the back layer 721 which is visible through the part of the transparent area 708 forming part of barcode XIV in the visible state 705 can be read together therewith as a single barcode in a visible state 730, typically readable by a barcode reader as 7290003804122. Barcodes XV and XVI remain unreadable and the indicator 700 in its second visible state presents a single machine-readable barcode typically readable by a barcode reader as 7290003804122.

It is appreciated that the time needed to achieve dissolution of dissolvable activation delay layer 717 may be determined for example by the thickness thereof.

Figure 7C:
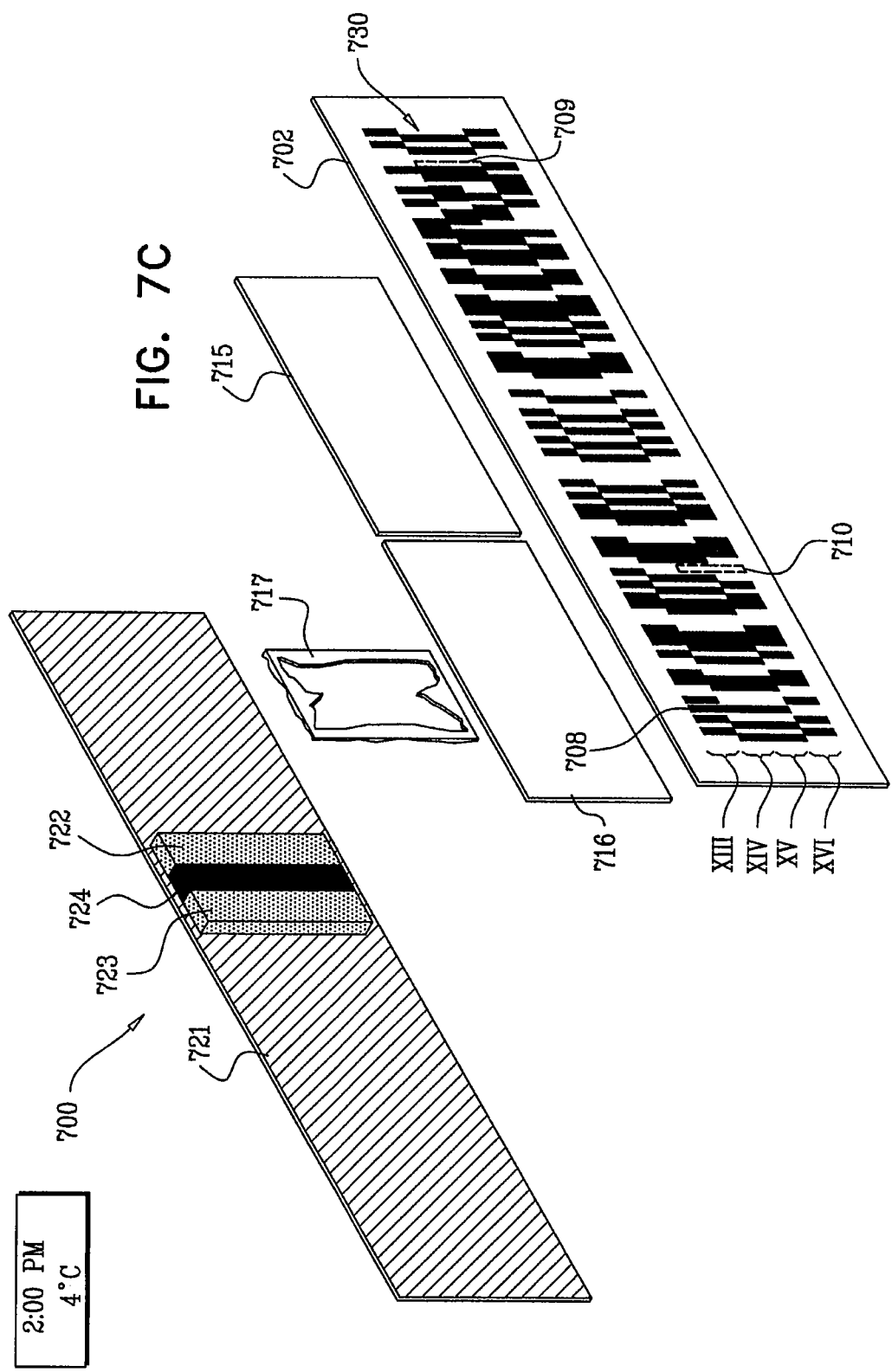

Turning now to FIG. 7C, once the dissolvable activation delay layer 717 becomes permeable to the coloring agents in the temperature responsive coloring elements 722 and 723, typically after 8 hours, the quality indicator 700 becomes responsive to temperature changes. As long as the temperature at the quality indicator does not reach a predetermined temperature for example 12 degrees Celsius, for at least a predetermined cumulative amount of time for example for thirty minutes, the quality indicator remains in the second visible state.

Figure 7D:
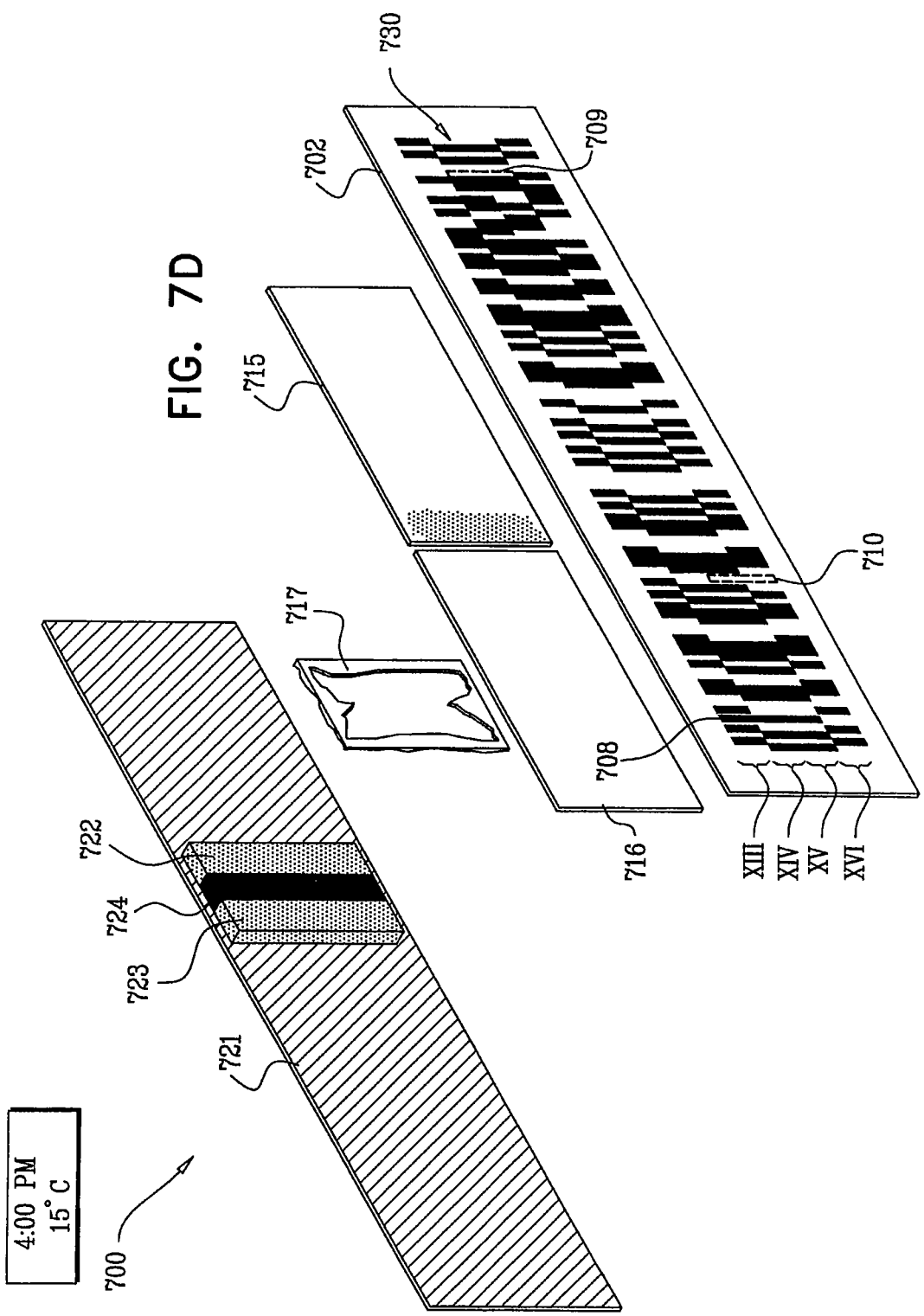

Turning to FIG. 7D, after the dissolution of the activation delay layer 717, when the temperature at the quality indicator exceeds 12 degrees Celsius, the coloring agent in the coloring element 722 begins to melt and be released from the coloring element 722 and begins to diffuse through the colorable element 715.

It is appreciated that if the temperature thereafter drops below 12 degrees Celsius the coloring agent continues to diffuse through the colorable element 715. If, after the temperature reaches 12 degrees Celsius, the temperature drops below 7 degrees Celsius, the coloring agent becomes solid and diffusion thereof through the colorable element 715 is suspended until the temperature again reaches 12 degrees Celsius.

It is appreciated that the elapsed time from the start of diffusion of the coloring agent from the coloring elements 722 and 723 along the respective colorable elements 715 and 716 until portions of the colorable elements 715 and 716 which are visible through the respective transparent areas 709 and 710 start to become colored is defined for example by the lengths of the colorable elements 715 and 716 between the area in front of coloring elements 722 and 723 and the area underlying the transparent areas 709 and 710. Additionally, this elapsed time is a function of the material from which the colorable elements 715 and 716 are made and the thickness thereof.

Accordingly, in the illustrated embodiment, the coloring elements 722 and 723 are positioned between the transparent areas 709 and 710 such that the elapsed time from the start of diffusion of the coloring agents along the colorable elements 715 and 716 until portions of the colorable elements 715 and 716 are visible through the respective transparent areas 709 and 710 is thirty minutes.

Figure 7E:
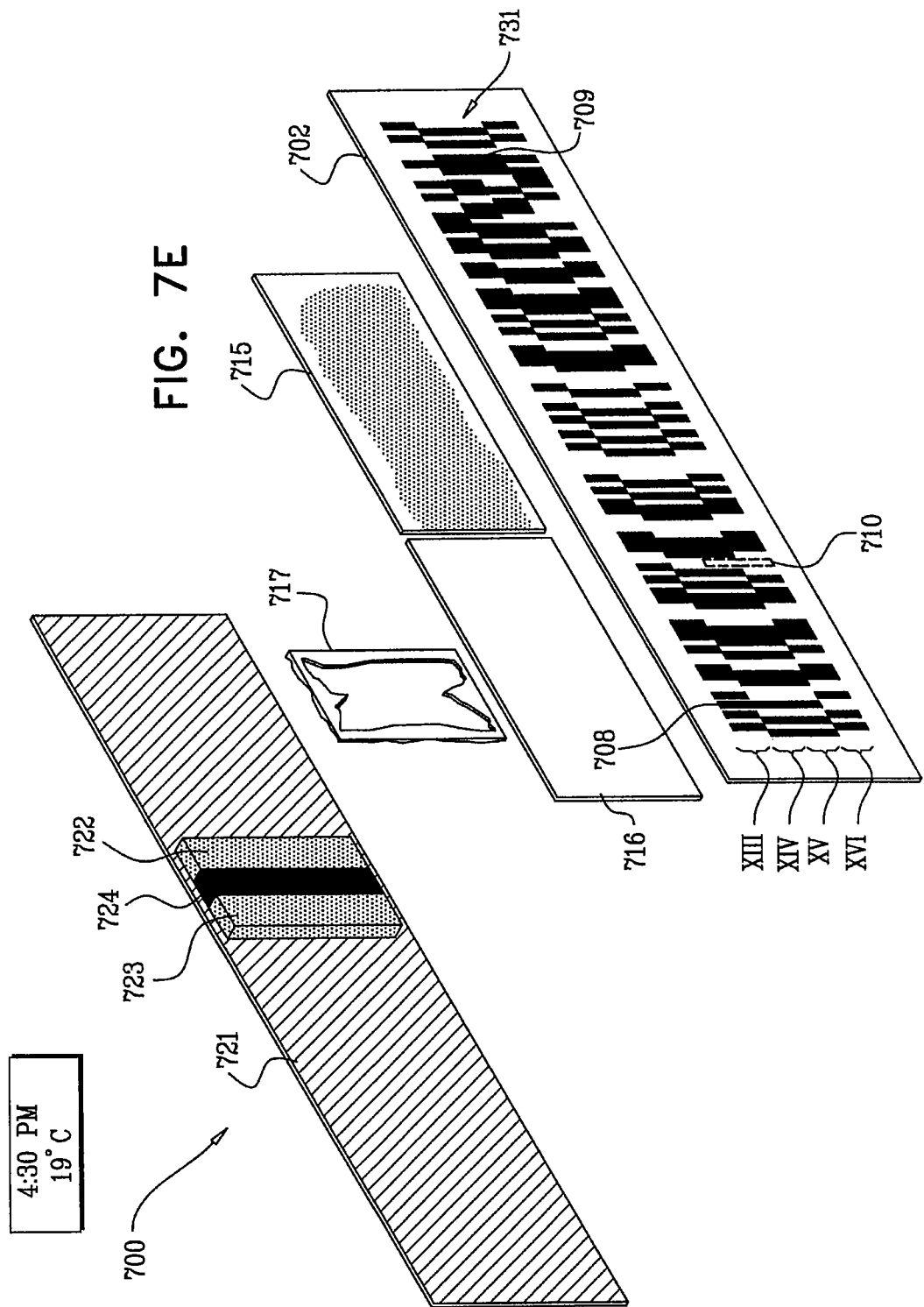

As seen in FIG. 7E, when the temperature is at least 12 degrees Celsius for at least a predetermined cumulative amount of time, for example thirty minutes, the coloring agent diffuses through the colorable element 715, such that the portions of the colorable element 715 which are visible through the transparent area 709 become colored and appear similar to the bars of barcode XIV in the visible state 730 and to the bars of barcode XV in the visible state 706. The colored portion of the transparent area 709 which forms part of barcode XIV, renders barcode XIV unreadable. The colored portion of the transparent area 709 which forms part of barcode XV in the visible state 706, can be read together therewith as a single barcode in the visible state 731, which is typically readable by a barcode reader as 7290003804115. Barcodes XIII and XVI remain unreadable and the indicator 700 thus presents a single machine-readable barcode typically readable by a barcode reader as 7290003804115.

It is appreciated that the portion of the transparent area 709 which forms part of barcode XIV may be wider than the portion of the transparent area 709 which forms part of barcode XV. Accordingly, if the temperature is at least 12 degrees Celsius for an additional amount of time, the portion of the transparent area 709 which forms part of barcode XIV continues to be colored thereby ensuring the unreadability of barcode XIV.

Figure 7F:
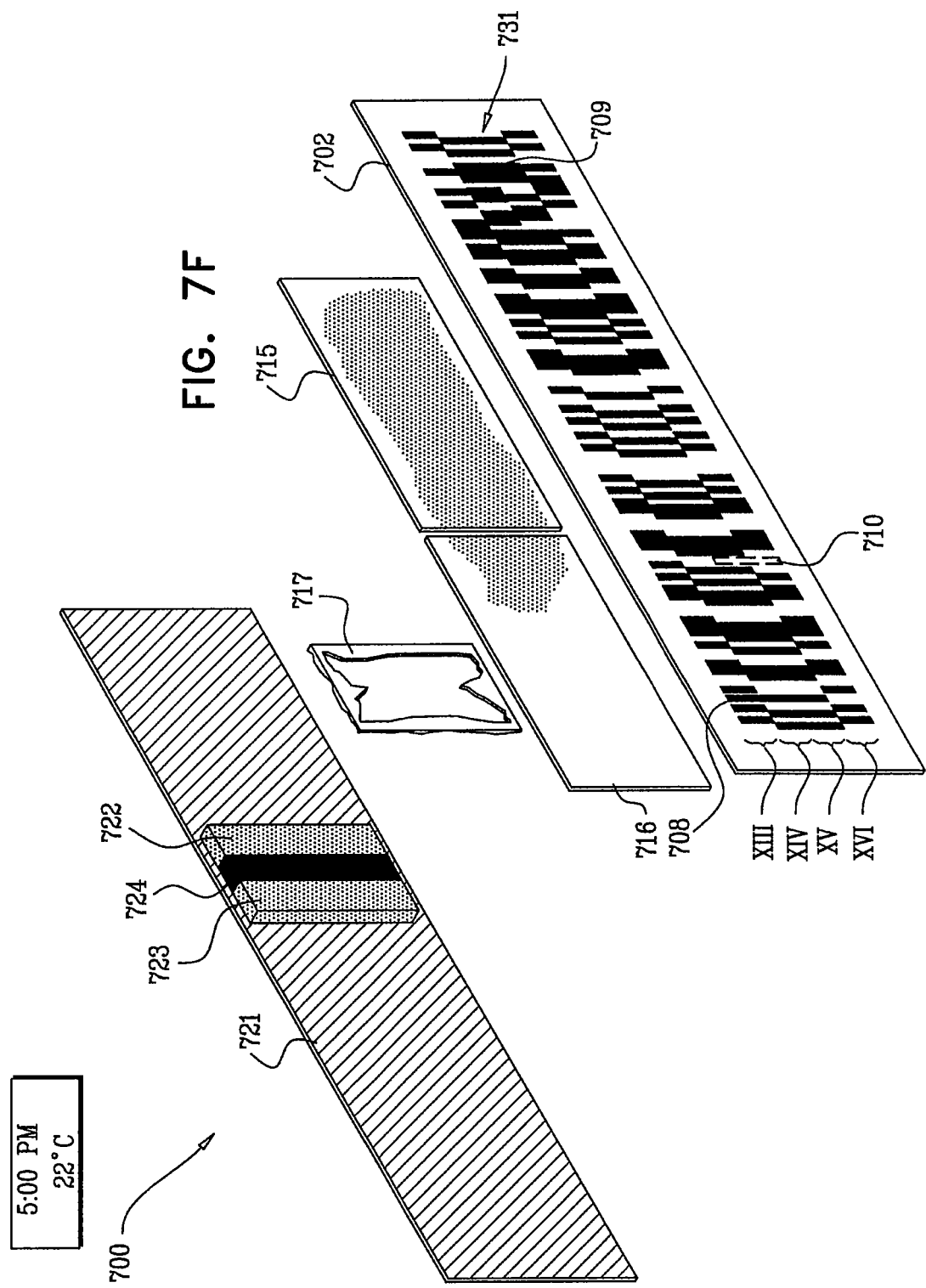

Turning to FIG. 7F, when the temperature at the quality indicator exceeds 21 degrees Celsius, the coloring agent in the coloring element 723 begins to melt and be released from the coloring element 723 and begins to diffuse through the colorable element 716.

It is appreciated that if the temperature thereafter drops below 21 degrees Celsius the coloring agent continues to diffuse through the colorable element 716. If, after the temperature reaches 21 degrees Celsius, the temperature drops below 17 degrees Celsius, the coloring agent becomes solid and diffusion thereof through the colorable element 716 is suspended until the temperature again reaches 21 degrees Celsius.

As seen in FIG. 7G, when the temperature is at least 21 degrees Celsius for at least a predetermined cumulative amount of time, such as thirty minutes, the coloring agent diffuses through the colorable element 716, such that the portions of the colorable element 716 which are visible through the transparent area 710 become colored and appear similar to the bars of barcode XV in the visible state 731 and to the bars of barcode XVI in the visible state 707. The colored portion of the transparent area 710, which forms part of barcode XV, renders barcode XV unreadable. The colored portion of the transparent area 709 which forms part of barcode XVI in the visible state 707 can be read together therewith as a single barcode in the visible state 732, which is typically readable by a barcode reader as 7290003804139. Barcodes XIII and XIV remain unreadable and the indicator 700 therefore presents a single machine-readable barcode typically readable by a barcode reader as 7290003804139

It is appreciated that the portion of the transparent area 710 which forms part of barcode XV may be wider than the portion of the transparent area 710 which forms part of barcode XVI. Accordingly, if the temperature is at least 21 degrees Celsius for an additional amount of time, the portion of the transparent area 710 which forms part of barcode XV continues to be colored thereby ensuring the unreadability of barcode XV.

It is appreciated that instead of using a separate barcode for indicating different events, one or more barcodes may each be used for indicating multiple events. For example, if the addition of a first barcode bar causes a barcode in a first machine-readable state to assume an unreadable state and the addition of a second barcode bar causes the same barcode in the unreadable state to assume a second machine-readable state then the first machine-readable state may be used for indicating one event and the second machine-readable state may be used for indicating a different event.

It is also appreciated that the background of the barcode defining layer of the indicator may be printed in a dark color and the bars of the barcode may be printed in a light color.

It is further appreciated that coloring of a colorable area forming part of a barcode in a quality indicator may add or delete bars relative to the barcode before coloring of the colorable area.

It is appreciated that an indicator may include one coloring element which is located intermediate the ends of the barcodes forming part of the indicator and the coloring agent therein moves in more than one direction following melting thereof. It is also appreciated that an indicator may include more than one coloring element arranged such that the coloring agents in the separate coloring elements move towards each other following melting thereof. It is further appreciated that an indicator may include more than one coloring element arranged such that the coloring agents in the separate coloring elements melt and start moving in response to exceedance of the same threshold.

It is appreciated that the melting of the coloring agent may be caused by a change in ambient parameters other than temperature, such as pH, humidity or the presence of certain chemicals, thereby enabling the use of the indicators described in the present invention for indicating exceedance of thresholds relating to such parameters.

Figure 8:
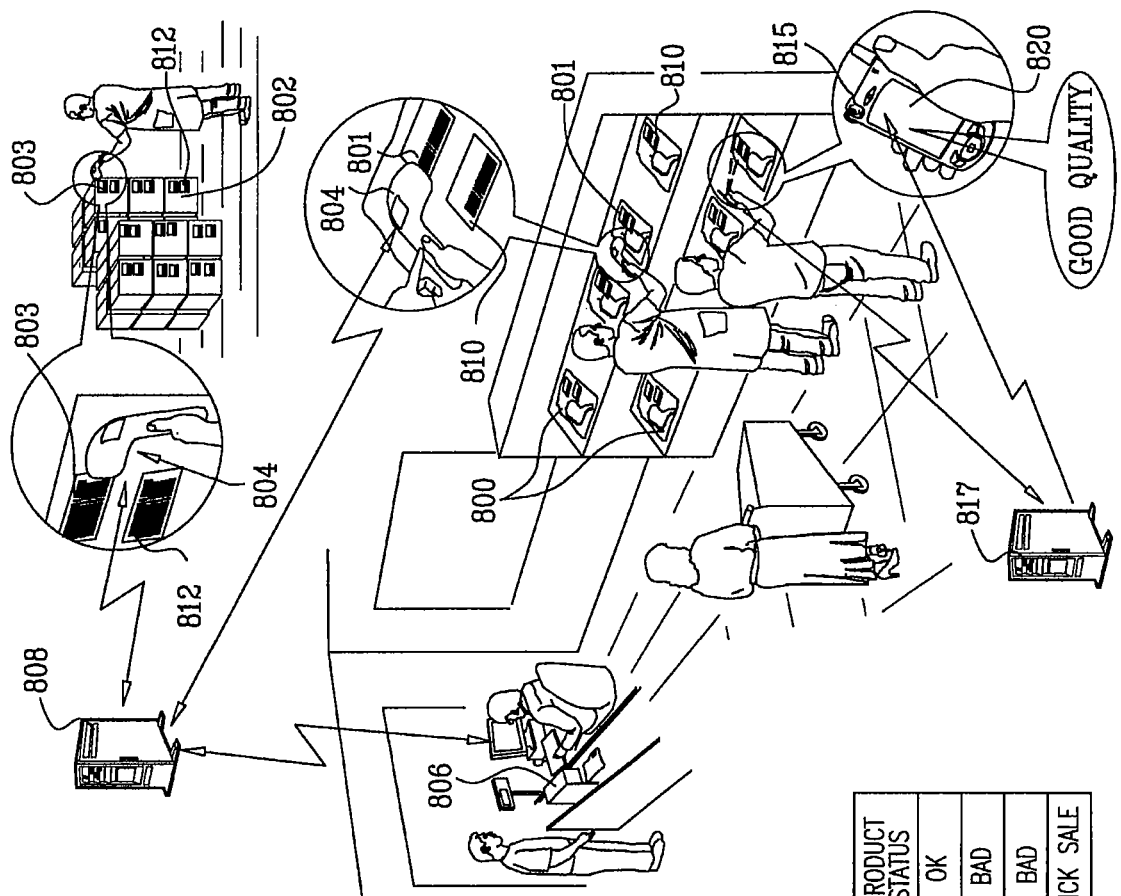
FIG. 8 is a simplified illustration of the structure and operation of a quality management system constructed and operative in accordance with a preferred embodiment of the present invention in the context of a supermarket.

Reference is now made to FIG. 8, which illustrates the structure and operation of a quality management system constructed and operative in accordance with a preferred embodiment of the present invention in the context of a supermarket. In the embodiment of FIG. 8, packaged products 800 each bear a barcoded quality indicator 801 of the general type described hereinabove and illustrated in FIGS. 1A-7G and including one or more of the operational and structural features described hereinabove. As seen in FIG. 8, cartons 802 including packages 800 bearing quality indicators 801, bear barcoded quality indicators 803 of the general type described hereinabove and illustrated in FIGS. 1A-7G and including one or more of the operational and structural features described hereinabove. Preferably, the barcoded quality indicators 803 are different from the barcoded quality indicators 801.

As described hereinabove with reference to FIGS. 1A and 2A, it is a particular feature of the present invention that the time and temperature thresholds of the quality indicators 801 and 803, placed on the individual packages and the cartons containing them respectively, are preferably related in order to provide highly effective cold chain management.

In the illustrated embodiment, the quality indicators 801 and 803 preferably include an EAN (European Article Number) barcode complying with GS1 standards, as detailed above with relation to FIGS. 1A-1C. When read by a conventional-barcode reader 804 or by a conventional checkout scanner 806, quality indicators 801 and 803 provide barcode reader readable indications of exceedance of one or more thresholds of product quality affecting parameters, such as temperature and/or elapsed time and/or a combination of elapsed time and temperature to an indication interpreter which preferably forms part of or is otherwise connected to a quality indication computer 808. The quality indication computer 808 may be remote from the indicator reader.

As indicated above with reference to FIGS. 1A-7G, the quality indicator 801 preferably includes a first visible state, typically readable by a barcode reader as 7290003804108, a second visible state, typically readable by a barcode reader as 7290003804122, and a third visible state, typically readable by a barcode reader as 7290003804115.

As indicated above with reference to FIGS. 1A-2C, the quality indicator 803 preferably includes a first visible state, typically readable by a barcode reader as 7290003804146, a second visible state, typically readable by a barcode reader as 7290003804153, and a third visible state, typically readable by a barcode reader as 7290003804160.

The quality indicators 801 and 803 may differ in that they have different effective temperature and/or time thresholds and may also indicate exceedance of different quality affecting parameters.

It is further seen in FIG. 8 that in addition to receiving the output indications provided by the indicator reader the quality indication computer 808 also receives product-related parameters such as product type, manufacturing date and package type, as shown in Table I. Additionally or alternatively, the quality indication computer 808 may also receive other parameters, for example information relating to the quality indicator, such as the range of parameters sensed by the quality indicator, when the quality indicator was actuated, and whether the quality indicator includes a delayed activation feature.

In the illustrated embodiment, product identification information is entered by scanning additional indicators 810 and 812, including, for example, a UPC code, which are attached to packages 800 and to cartons 802, respectively. Alternatively, the product-related parameters and the other parameters, such as those relating to the quality indicator may be provided by the quality indicators 801 and 803 themselves. As a further alternative, these parameters may be provided by sensors, a priori information otherwise available to the indication interpreter or by manual entry.

TABLE I

| PRODUCT CODE | PRODUCT DESCRIPTION | MANUFACTURING DATE | PACKAGE TYPE |
| --- | --- | --- | --- |
| 6789 | FRESH RIB STEAK | MAY 8, 2008 | INDIVIDUAL |

As seen in the illustrated embodiment, the quality indication computer 808 maintains a database which preferably includes at least an event description table, such as Table II, and a product status table, such as Table III.

TABLE II

| EVENT BARCODE | INDICATOR IDENTIFIER | EVENT DESCRIPTION |
|---|---|---|
| 7290003804108 | 801 | INDICATOR WAS NOT ACTUATED |
| 7290003804146 | 803 | INDICATOR WAS NOT ACTUATED |
| 7290003804122 | 801 | INDICATOR WAS NOT EXPOSED TO ≥21 DEGREES CELSIUS FOR ≥ TEN MINUTES |
| 7290003804153 | 803 | INDICATOR WAS NOT EXPOSED TO ≥12 DEGREES CELSIUS FOR ≥ ONE HOUR |
| 7290003804115 | 801 | INDICATOR WAS EXPOSED TO ≥21 DEGREES CELSIUS FOR ≥ TEN MINUTES |
| 7290003804160 | 803 | INDICATOR WAS EXPOSED TO ≥12 DEGREES CELSIUS FOR ≥ ONE HOUR |

Upon receipt of inputs identifying a product as shown in Table I and output indications provided by a quality indicator reader indicating an event described in Table II corresponding to the same product the quality indication computer 808 is operative to provide product quality status outputs. In order to provide product quality status outputs the quality indication computer 808 is operative to employ a product status table, such as Table III, typically including product description data such as product description, package type and indicator identifier, an event barcode and a product status as follows:

TABLE III

| PRODUCT CODE | EVENT BARCODE | PRODUCT DESCR. | PACKAGE | INDICATOR IDENTIFIER | PRODUCT STATUS |
|---|---|---|---|---|---|
| 6789 | 7290003804122 | FRESH RIB STEAK | INDIVIDUAL | 801 | OK |
| 6789 | 7290003804115 | FRESH RIB STEAK | INDIVIDUAL | 801 | BAD |
| 5689 | 7290003804160 | FRESH RIB STEAK | CARTON | 803 | BAD |
| 4321 | 7290003804115 | ORANGES | INDIVIDUAL | 801 | QUICK SALE |

As seen in the second and the third rows of Table III, time and temperature thresholds of indicators 801 and 803, placed on the individual packages 800 of a fresh rib steak and the cartons 802 containing them respectively, are preferably related and calibrated with respect to each other based, inter alia, on empirical data. This feature allows for the evaluation of quality of individually packaged products even when it is not possible to open the cartons and examine individual packages, such as for example, during transport.

As further seen in Table III, there may be a great variation in the effect of a given event depending on the type of product. Thus, for example, exposure to 21 degrees Celsius for a short period of time may cause fresh meat to be rendered unfit for sale but may only mildly affect the quality or oranges.

In accordance with an additional feature of the present invention, the barcode may be read by a consumer employing an imager-equipped telephone or other suitable mobile communicator 815 which may be identical to mobile communicator 128 in FIG. 1C or 228 in FIG. 2C. The communicator 815 may image the quality indicators 801 or 803 and communicate the image information to a suitably programmed quality indication computer 817, which may be identical to computer 130 in FIG. 1C or 230 in FIG. 2C, and to the computer 808, and which is capable of reading the barcode from the image information. The quality indication computer 817 provides to the user, via SMS or any other suitable communication methodology, an immediate indication of a quality status, such as a GOOD QUALITY indication 820. This quality status indicates that the product is safe for use. Alternatively, if the user employs a barcode reader-equipped communicator, the communicator can provide to the quality indication computer 817 an output resulting from reading the barcode. Additionally or alternatively, the quality indication computer 817 may provide coupons to the user corresponding to the state of the quality indicator.

Based on the scanned barcode and identification of the caller, the quality indication computer 817 provides product status information both to quality assurance inspectors and to consumers. Additionally or alternatively, the quality indication computer 817 may send messages to the supermarket management regarding remedial steps to be taken, such as refrigeration maintenance instructions.

It will be appreciated by persons skilled in the art that the present invention is not limited by what has been particularly shown and described hereinabove. Rather the scope of the present invention includes both combinations and sub-combinations of various features of the invention and modifications thereof which may occur to persons skilled in the art upon reading the foregoing description and which are not in the prior art.

The invention claimed is:

1. A barcoded quality indicator operative to provide a machine-readable indication of exceedance of at least two different thresholds, the barcoded quality indicator comprising:
    a first barcode, said first barcode being machine-readable prior to actuation of said barcoded quality indicator and not being machine-readable following actuation of said barcoded quality indicator;

a second barcode, said second barcode not being machine-readable prior to actuation of said barcoded quality indicator and being machine-readable following actuation of said barcoded quality indicator and prior to exceedance of at least one of said at least two different thresholds;

a third barcode, said third barcode not being machine-readable before actuation of said barcoded quality indicator and exceedance of a first one of said at least two different thresholds and being machine-readable following actuation of said barcoded quality indicator and exceedance of said first one of said at least two different thresholds; and a fourth barcode, said fourth barcode not being machine-readable before actuation of said barcoded quality indicator and exceedance of a second one of said at least two different thresholds and being machine-readable following actuation of said barcoded quality indicator and exceedance of said second one of said at least two different thresholds.

2. A barcoded quality indicator according to claim 1 and wherein:

said quality indicator further comprises a pull strip; and
removal of said pull strip actuates said indicator.

3. A barcoded quality indicator according to claim 1 and wherein:

said quality indicator further comprises an actuation delay layer; and
said quality indicator is not actuated until dissolution of said actuation delay layer.

4. A quality management system for products comprising:

a multiplicity of barcoded quality indicators each operative to provide a machine-readable indication of exceedance of at least two different thresholds, each of said indicators comprising:
  a first barcode, said first barcode being machine-readable prior to actuation of said barcoded quality indicator and not being machine-readable following actuation of said barcoded quality indicator;
  a second barcode, said second barcode not being machine-readable prior to actuation of said barcoded quality indicator and being machine-readable following actuation of said barcoded quality indicator and prior to exceedance of at least one of said at least two different thresholds;
  a third barcode, said third barcode not being machine-readable before actuation of said barcoded quality indicator and exceedance of a first one of said at least two different thresholds and being machine-readable following actuation of said barcoded quality indicator and exceedance of said first one of said at least two different thresholds; and
  a fourth barcode, said fourth barcode not being machine-readable before actuation of said barcoded quality indicator and exceedance of a second one of said at least two different thresholds and being machine-readable following actuation of said barcoded quality indicator and exceedance of said second one of said at least two different thresholds;

a barcode indicator reader operative to read said barcoded quality indicators and to provide output indications; and a product type responsive indication interpreter operative to receive said output indications and to provide human sensible, product quality status outputs.

5. A quality management system for products according to claim 4 and wherein:

at least one of said quality indicators further comprises a pull strip; and
removal of said pull strip actuates said quality indicator.

6. A quality management system for products according to claim 4 and wherein:

at least one of said quality indicators further comprises an actuation delay layer; and
said at least one of said quality indicators is not actuated until dissolution of said actuation delay layer.

7. A method for providing quality management for products comprising:

employing a multiplicity of barcoded quality indicators each operative to provide a machine-readable indication of exceedance of at least one threshold, each of said indicators comprising:
  a first barcode, said first barcode being machine-readable prior to actuation of said barcoded quality indicator and not being machine-readable following actuation of said barcoded quality indicator;
  a second barcode, said second barcode not being machine-readable prior to actuation of said barcoded quality indicator and being machine-readable following actuation of said barcoded quality indicator and prior to exceedance of at least one of said at least two different thresholds;
  a third barcode, said third barcode not being machine-readable before actuation of said barcoded quality indicator and exceedance of a first one of said at least two different thresholds and being machine-readable following actuation of said barcoded quality indicator and exceedance of said first one of said at least two different thresholds; and
  a fourth barcode, said fourth barcode not being machine-readable before actuation of said barcoded quality indicator and exceedance of a second one of said at least two different thresholds and being machine-readable following actuation of said barcoded quality indicator and exceedance of said second one of said at least two different thresholds;

reading said barcoded quality indicators to provide output indications;
receiving said output indications; and
interpreting said output indications to provide human sensible, product quality status outputs.

8. A method for providing quality management for products according to claim 7 and wherein said quality indicators include a pull strip actuator and said method also comprises actuating said quality indicators by removing said pull strip actuator.

* * * * *

UNITED STATES PATENT AND TRADEMARK OFFICE
CERTIFICATE OF CORRECTION

| | |
|---|---|
| PATENT NO. | : 11,238,323 B2 |
| APPLICATION NO. | : 17/000078 |
| DATED | : February 1, 2022 |
| INVENTOR(S) | : Yaron Nemet, Ephraim Brand and Ahmed M. Tafesh |

It is certified that error appears in the above-identified patent and that said Letters Patent is hereby corrected as shown below:

On the Title Page

On page 2, item [63] after the heading "Related U.S. Application Data", Line 13, after "Nov. 13, 2008,", replace "which" with --and--.

Signed and Sealed this
Twenty-first Day of March, 2023

Katherine Kelly Vidal
*Director of the United States Patent and Trademark Office*